United States Patent [19]
Azami

[11] Patent Number: 6,020,895
[45] Date of Patent: Feb. 1, 2000

[54] OBJECT EDITING METHOD, OBJECT EDITING SYSTEM AND COMPUTER MEMORY PRODUCT

[75] Inventor: Toshihiro Azami, Kawasaki, Japan

[73] Assignee: Fujitsu Limited, Kawasaki, Japan

[21] Appl. No.: 08/872,877

[22] Filed: Jun. 10, 1997

[30] Foreign Application Priority Data

| May 28, 1996 | [JP] | Japan | 8-188519 |
| Jun. 25, 1996 | [JP] | Japan | 8-164859 |
| Apr. 3, 1997 | [JP] | Japan | 9-085418 |

[51] Int. Cl.[7] ................... G06F 15/00
[52] U.S. Cl. ............ 345/433; 345/358; 345/964
[58] Field of Search .................. 345/448, 358, 345/433, 964

[56] References Cited

U.S. PATENT DOCUMENTS 5,574,843  11/1996  Gerlach ............... 345/448

FOREIGN PATENT DOCUMENTS

| 02170266 | 7/1990 | Japan . |
| 04051337 | 2/1992 | Japan . |
| 6-44006 | 2/1994 | Japan . |
| 6-44021 | 2/1994 | Japan . |

OTHER PUBLICATIONS

Tim Dudley, "A Visual Interface to a Conceptual Data Modelling Tool", Cognos Inc., Ottawa, Canada, 1989.

*Primary Examiner*—Mark K. Zimmerman
*Assistant Examiner*—Chante' E. Harrison
*Attorney, Agent, or Firm*—Staas & Halsey

[57] ABSTRACT

An object editing system has an object display unit for displaying objects, an object executive table for registering the display position and the display contents of the object to be displayed, an interface unit for detecting the instruction of an input apparatus of the user with respect to the displayed object, and an object operation executive unit for managing the display, edition of the objects by controlling these units. The object editing system conducts, by the direct operation of the user based on the human natural consciousness with respect to the displayed object, the editing process such as associating, connecting, displaying, erasing and so on in accordance with the contents of the operation by the input apparatus of the user.

46 Claims, 98 Drawing Sheets

FIG. 25

| OBJECT ID | RECTANGULAR AREA X0 | RECTANGULAR AREA X1 | RECTANGULAR AREA Y0 | RECTANGULAR AREA Y1 | ASSOCIATED OBJECT |
|---|---|---|---|---|---|
| A | 10 | 20 | 15 | 35 | B |
| B | 25 | 40 | 15 | 30 | A |
| C | 30 | 40 | 40 | 50 | NONE |
| D | 100 | 120 | 200 | 230 | E,F |
| E | 110 | 115 | 240 | 260 | D,F |
| F | 140 | 170 | 220 | 250 | D,E |

FIG. 30

| OBJECT ID | DISPLAY POSITION | ATTRIBUTE | CONTENTS | CONDITION | TIME STAMP |
|---|---|---|---|---|---|
| A | (Xa, Ya) | DRAWING | line(Xa1,Ya1-Xa2,Ya2), line(Xa3,Ya3-Xa4,Ya4) | SELECTION | Ta |
| M | (Xm, Ym) | CHARACTER | NEWS, WEATHER FORECAST | NON-SELECTION | Tm |
| N | (Xn, Yn) | CHARACTER | TRAFFIC INFORMATION, TICKET RESERVATION | NON-SELECTION | Tn |
| O | (Xo, Yo) | CHARACTER, DRAWING | NEW SERVICE line(Xo1,Yo1-Xo2,Yo2) | NON-SELECTION | To |
| | | | | | |

FIG. 32

| OBJECT ID | DISPLAY POSITION | ATTRIBUTE | CONTENTS | CONDITION |
|---|---|---|---|---|
| A | (Xa,Ya) | DRAWING | line(Xa1,Ya1-Xa2,Ya2), line(Xa3,Ya3-Xa4,Ya4) | NON-SELECTION |
| M | (Xm,Ym) | CHARACTER | NEWS, WEATHER FORECAST | CONNECTED |
| N | (Xn,Yn) | CHARACTER | TRAFFIC INFORMATION, TICKET RESERVATION | CONNECTED |
| O | (Xo,Yo) | CHARACTER, DRAWING | NEW SERVICE line(Xo1,Yo1-Xo2,Yo2) | NON-SELECTION |
| P | (Xp,Yp) | CONNECTION | M,N | NON-SELECTION |

| OBJECT N  OBJECT M |

| OBJECT M  OBJECT N |

OBJECT N

FIG. 44A
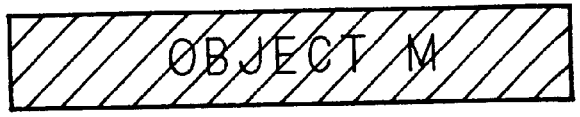
OBJECT N
FIG. 44B
FIG. 44C
FIG. 44D
OBJECT M  OBJECT N

FIG. 54A (CHARACTER STRING OBJECT N)

RESULT OF　　PLAN OF
THIS YEAR,　NEXT YEAR

FIG. 54B

RESULT OF　　PLAN OF
THIS YEAR,　NEXT YEAR

RESULT OF　　PLAN OF
THIS YEAR,　NEXT YEAR

FIG. 54D

RESULT OF
THIS YEAR,

PLAN OF
NEXT YEAR

FIG. 56A (CHARACTER STRING OBJECT N)

```
NEWS,WEATHER FORECAST,
TOKYO MARKET,TRAFFIC INFORMATION,
TICKET RESERVATION, EVENT
```

FIG. 56B

```
NEWS,WEATHER FORECAST,
TOKYO MARKET,TRAFFIC INFORMATION,
TICKET RESERVATION, EVENT
```

FIG. 56C

```
NEWS,WEATHER FORECAST,
TOKYO MARKET,TRAFFIC INFORMATION,
TICKET RESERVATION, EVENT
```

FIG. 56D

```
NEWS,WEATHER FORECAST,
TOKYO MARKET,TRAFFIC INFORMATION,
TICKET RESERVATION, EVENT
```

FIG. 56E

```
NEWS,WEATHER FORECAST,
TOKYO MARKET,
```

```
TRAFFIC INFORMATION,
TICKET RESERVATION, EVENT
```

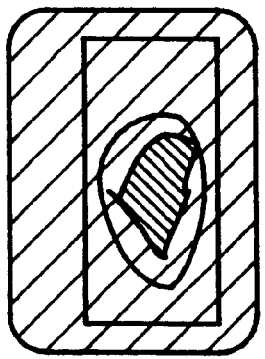
FIG. 58A
(DRAWING OBJECT N)
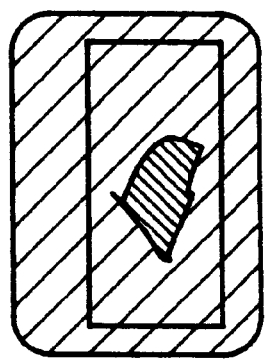
FIG. 58B
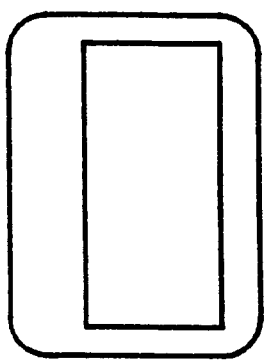
FIG. 58C
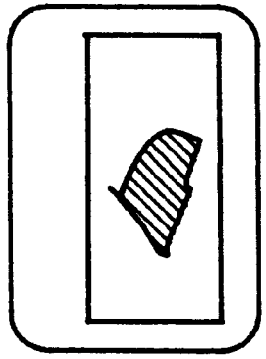
FIG. 58D
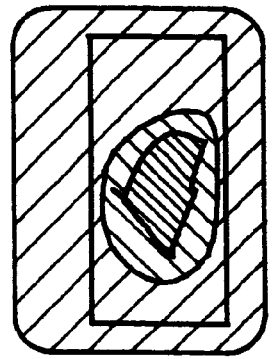
FIG. 58E

FIG. 60A
(CHARACTER STRING OBJECT N)

NEWS,WEATHER FORECAST,
TOKYO MARKET,TRAFFIC INFORMATION,

FIG. 60B

NEWS,WEATHER FORECAST,
TOKYO MARKET,TRAFFIC INFORMATION,

FIG. 60C

NEWS,WEATHER FORECAST,
TOKYO MARKET,TRAFFIC INFORMATION,

FIG. 60D

NEWS,WEATHER FORECAST,
TOKYO MARKET,TRAFFIC INFORMATION,

FIG. 60E

NEWS,WEATHER FORECAST,
TOKYO MARKET,TRAFFIC INFORMATION,

FIG. 60F

NEWS,WEATHER FORECAST,
TRAFFIC INFORMATION,

TOKYO MARKET, (DRAWING OBJECT N)

FIG. 64A (CHARACTER STRING OBJECT P)

NEWS, WEATHER FORECAST,
TOKYO MARKET, TRAFFIC INFORMATION,
TICKET RESERVATION, EVENT

FIG. 64B

NEWS, WEATHER FORECAST,
TOKYO MARKET, TRAFFIC INFORMATION,
TICKET RESERVATION, EVENT

FIG. 64C

NEWS, WEATHER FORECAST,
TOKYO MARKET, TRAFFIC INFORMATION,
TICKET RESERVATION, EVENT

FIG. 64D

NEWS, WEATHER FORECAST,
TOKYO MARKET, TRAFFIC INFORMATION,
TICKET RESERVATION, EVENT

FIG. 64E

NEWS, WEATHER FORECAST,
TOKYO MARKET,

TRAFFIC INFORMATION,
TICKET RESERVATION, EVENT

FIG. 66A (CHARACTER STRING OBJECT P)

(CHARACTER STRING OBJECT O)

| NEWS,WEATHER FORECAST, TOKYO MARKET,TRAFFIC INFORMATION, TICKET RESERVATION, EVENT |

| NEW SERVICE USING MULTIMEDIA |

FIG. 66B

| NEWS,WEATHER FORECAST, TOKYO MARKET,TRAFFIC INFORMATION, TICKET RESERVATION, EVENT |

| NEW SERVICE USING MULTIMEDIA |

FIG. 66C

| NEWS,WEATHER FORECAST, TOKYO MARKET,TRAFFIC INFORMATION, TICKET RESERVATION, EVENT |

| NEW SERVICE USING MULTIMEDIA |

FIG. 66D

| NEWS,WEATHER FORECAST, TOKYO MARKET,TRAFFIC INFORMATION, TICKET RESERVATION, EVENT |

| NEW SERVICE USING MULTIMEDIA |

FIG. 66E

| NEWS,WEATHER FORECAST, TOKYO MARKET, |

| TRAFFIC INFORMATION, TICKET RESERVATION, EVENT |

| NEW SERVICE USING MULTIMEDIA |

FIG. 67A (DRAWING OBJECT N)
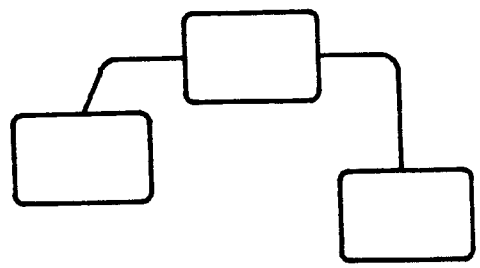
FIG. 67B
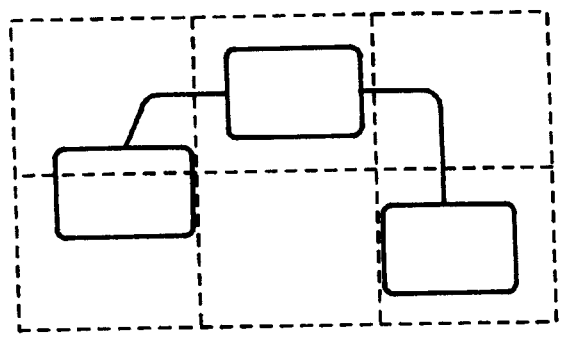
FIG. 67C
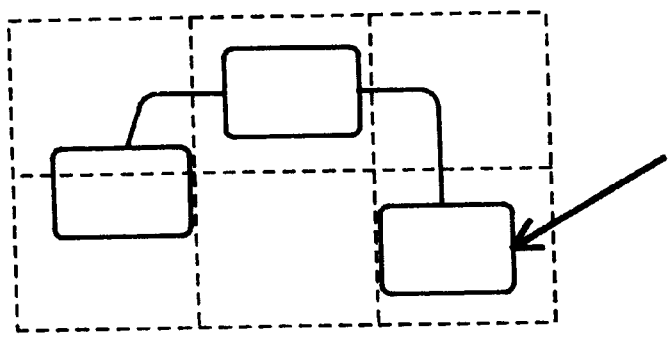
FIG. 67D
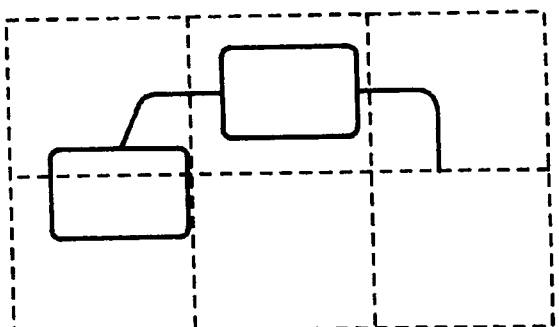

FIG. 73

| OBJECT ID | DISPLAY POSITION | ATTRIBUTE | CONTENTS | CONDITION | NON-DISPLAY STARTING TIME |
|---|---|---|---|---|---|
| A | (Xa,Ya) | DRAWING | line(Xa1,Ya1)-(Xa2,Ya2)-(Xa3,Ya3)-(Xa4,Ya4)<br>line(Xa5,Ya5)-(Xa6,Ya6)<br>line(Xa7,Ya7)-(Xa8,Ya8)-(Xa9,Ya9) | NON-DISPLAY | 13:53:23 |
| B | (Xb,Yb) | DRAWING | line(Xb1,Yb1)-(Xb2,Yb2)-(Xb3,Yb3)-(Xb4,Yb4) | DISPLAY | ――― |
| C | (Xc,Yc) | DRAWING | line(Xc1,Yc1)-(Xc2,Yc2)<br>line(Xc1,Yc1)-(Xc2,Yc2)-(Xc3,Yc3)-(Xc4,Yc4) | NON-DISPLAY | 13:55:51 |

FIG. 78

| OBJECT ID | DISPLAY POSITION | ATTRIBUTE | CONTENTS | CONDITION | NON-DISPLAY STARTING TIME |
|---|---|---|---|---|---|
| A | $(X_a, Y_a)$ | DRAWING | line$(X_{a1}, Y_{a1})$-$(X_{a2}, Y_{a2})$-$(X_{a3}, Y_{a3})$-$(X_{a4}, Y_{a4})$ | DISPLAY | --- |
|  |  |  | line$(X_{a5}, Y_{a5})$-$(X_{a6}, Y_{a6})$ | DISPLAY | --- |
|  |  |  | line$(X_{a7}, Y_{a7})$-$(X_{a8}, Y_{a8})$-$(X_{a9}, Y_{a9})$ | NON-DISPLAY | 13:53:23 |
| B | $(X_b, Y_b)$ | DRAWING | line$(X_{b1}, Y_{b1})$-$(X_{b2}, Y_{b2})$-$(X_{b3}, Y_{b3})$-$(X_{b4}, Y_{b4})$ | DISPLAY | --- |
| C | $(X_c, Y_c)$ | DRAWING | line$(X_{c1}, Y_{c1})$-$(X_{c2}, Y_{c2})$ | NON-DISPLAY | 13:55:51 |
|  |  |  | line$(X_{c1}, Y_{c1})$-$(X_{c2}, Y_{c2})$-$(X_{c3}, Y_{c3})$-$(X_{c4}, Y_{c4})$ | DISPLAY | --- |

FIG. 81

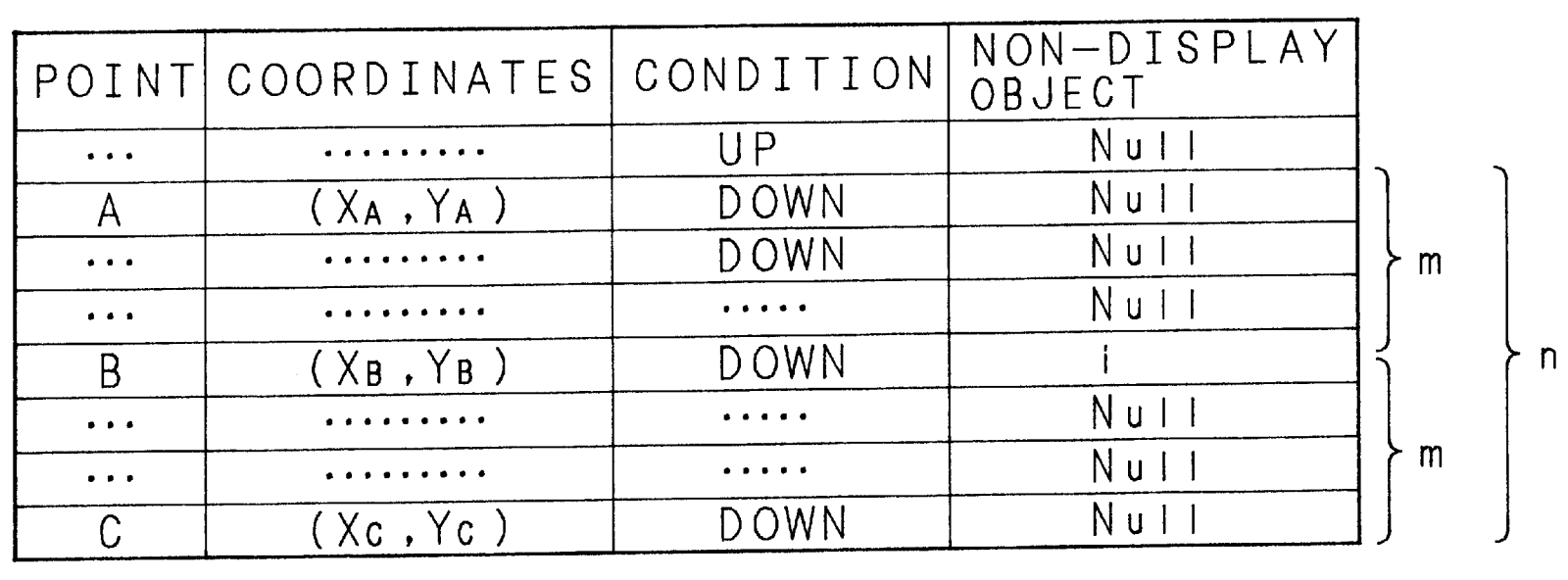

| POINT | COORDINATES | CONDITION | NON-DISPLAY OBJECT |
|---|---|---|---|
| ... | ......... | UP | Null |
| A | $(X_A, Y_A)$ | DOWN | Null |
| ... | ......... | DOWN | Null |
| ... | ......... | ... | Null |
| B | $(X_B, Y_B)$ | DOWN | i |
| ... | ......... | ... | Null |
| ... | ......... | ... | Null |
| C | $(X_C, Y_C)$ | DOWN | Null |

FIG. 88

| POINT | COORDINATES | CONDITION | |
|---|---|---|---|
| ... | ......... | DOWN | |
| A | $(X_A, Y_A)$ | DOWN | ⎫ |
| ... | ......... | DOWN | ⎬ m |
| ... | ......... | ..... | ⎭ |
| B | $(X_B, Y_B)$ | DOWN | |
| B+1 | $(X_B, Y_B)$ | UP | ⎫ n |
| C | $(X_C, Y_C)$ | DOWN | ⎫ |
| ... | ......... | ..... | ⎬ m |
| ... | ......... | ..... | |
| D | $(X_D, Y_D)$ | DOWN | ⎭ |

OBJECT EDITING METHOD, OBJECT EDITING SYSTEM AND COMPUTER MEMORY PRODUCT

BACKGROUND OF THE INVENTION

1. Field of the Invention

The present invention relates to an object editing method, an object editing system for conducting an editing process including associating, connecting, erasing, separating with respect to an object displayed on the display apparatus, and a computer memory product in which a computer program is recorded for operating the system.

2. Description of the Prior Art

A system is developed which can display on a display apparatus components of image information as objects, including drawing graphics of handwriting inputs, character strings of keyboard inputting, and so on, and can conduct an editing process such as moving, connecting, separating and erasing operations with respect to these objects on the display apparatus with the use of an input apparatus such as a mouse or the like by the user. This system is effective for progressing the proceedings in, for example, meetings. Each attendants' opinions and materials can be displayed on the display apparatus so that each participant can read commonly as information objects. The editing processes such as moving, combining, separating, and erasing can be conducted with respect to these objects, while discussing the displayed objects.

In the object editing system, a plurality of objects can be associated with each other. The collection of the objects related to the association can be handled similarly as one object so that the processes such as moving and erasing can be conducted. The conventional procedures of the associating operation (hereinafter referred to as grouping) among the objects are as follows.

The operation mode is set into a grouping mode, the object for grouping is selected, inputted one by one by the user, or the objects overlapped with a rectangular area inputted by the user are detected and selected by the software. Then, the grouping operation of the selected objects can be conducted by receiving the instructions of the selecting completion from the user.

Therefore, to move collectively one group of objects A, B and C, first, the objects A, B and C are grouped in the aforementioned procedure. Then, the operating mode is moved into a moving mode and the moving operation of the group composed of objects A, B and C are effected. But there is a case where objects which should have been collected into groups are not grouped in an actual operation immediately after the moving operation of the group of the objects. The group is necessary to be corrected after the moving operation. Although the moving operation of the group of, for example, the above described objects A, B and C meant to be effected, the objects C is not effected into the grouping actually, and the moving process is not effected with respect to the object C. In this case, the user should subsequently conduct the moving operation of the object C which should have effected and the object C is newly grouped. Or the processing results are restored into the condition before the moving operation of the group of the objects. The object C is grouped and the moving operation is newly conducted to obtain the desired processing results.

However, to effect the moving operation of the objects which should have grouped after the moving operation, the correct positioning operation is required for making the moving vector the same as that of the other objects already grouped, making the operation complicated to effect. Also, to effect the grouping operation after the undoing operation and effect the moving operation again, a moving vector similar to the moving operation before the undoing operation must be specified, thus making the operation complicated. Therefore, the grouping operation of the objects are desired to be simplified. Likewise, an operation of canceling the grouping operation of the objects and an operation of renewing the relative positional relation among the objects belonging to the groups are desired to be made simpler.

Also, in the object editing system, in the conventional combining process of the objects, a much more complicated procedure is generally required. For example in the Microsoft Word, the general literature editing application, there is a function of a text box for handing character strings as the objects. The following procedures (1) through (5) are conducted in the combination of the objects.

(1) A user selects a first object to be combined.
(2) A user selects a "Copy" from among the function menu.
(3) A user specifies a position for connecting the first object in a second object to be connected.
(4) A user selects the "Paste" from the function menu.
(5) The system connects the first object with the second object and conducts a displaying operation.

Considering the user's operationality, it is desired to effect a connecting operation of the objects by the direct operation of the displayed objects without effecting the aforementioned menu operations. The present applicant proposes a new connecting operation of the objects. The connecting operation in this case includes the procedures of (1) and (2) as shown in FIG. 1.

(1) A user drags and drops (FIGS. 1A and 1B) with a mouse an object M to be moved for connection onto an object N to receive the connection.
(2) The system connects the object M after the object N and displays them (FIG. 1C).

In the connecting operation, it is only required to directly superpose an object on an object to be connected, in accordance with an operation suitable for the human sense. But the order in connecting the objects is fixed and the usefulness is insufficient.

The conventional example where the displayed object is separated is not known in the object editing system.

In the object editing system, the erasing operation of the displayed objects is conventionally effected with procedures of the following (1) through (3) in, for example, the aforementioned Microsoft Word.

(1) The user selects an object to be erased.
(2) The user selects the "clear" from among the function menu.
(3) The system erases the object.

Since even in the example of erasing operation, the menu operation is effected as in the above described connection operation, the operability for the user is not good. In the Japanese Patent Application Laid-Open No. 6-44006 discloses an example where the direct operation is conducted more effective than in the Microsoft Word. In the operating example, the user selects the area of the "erasing" function displayed on the screen with a pointing device to cause the pointing device to have an erasing function. When the pointing device sweeps the screen, an object involved in the sweeping operation is erased.

In the example, when an object is involved in the sweeping operation of the pointing device where the erasing function is assigned to the object disappears at a time. This is convenient for erasing an object. However, imagine that there are a user A effecting an erasing operation, and another user B looking at the erasing operation, and the user A is erasing the object as in the general blackboard erasing operation. To the user B, an object to be erased disappears at a time in the erasing manner shown by the system. The recognition of the user B cannot catch up with the erasing operation of the objects, thus giving the user B an unsatisfactory feeling.

In the general drawing process, a picture can be drawn while correcting it slightly. In this case, the user is used to the motion of erasing operation by scrubbing a desired area of the picture. However, in the object system, the erasing operation can be effected only in the unit of object, and the erasing operation often goes beyond the expected range. Further, objects once erased cannot be restored to the original objects. The redrawing operation is necessary to be effected again. The object system becomes worse in efficiency than the drawing process using paper and pencils.

BRIEF SUMMARY OF THE INVENTION

An object of the invention is to provide an object editing method which simplifies the operations such as grouping the objects, erasing the grouping of the objects, and renewing the positions of the objects belonging to the groups, and an object editing system of carrying out the method.

Another object of the invention is to provide an object editing method capable of, with human natural consciousness, conducting the editing processes such as object connecting, object separating, object erasing, and so on, and an object editing system for carrying out the method.

Still another object of the invention is to provide an object editing method wherein the system can judge user's intention based on the user's direct operation with respect to the displayed object, and decide the connecting order of the objects, and an object editing system for carrying out the method.

A further object of the invention is to provide an object editing method wherein the user can change the connecting order into the correct order through a simple, and direct operation even when the objects are likely to be connected in a wrong order, and an object editing system for carrying out the object editing method.

A still further object of the invention is to provide an object editing method wherein the objects can easily be separated by a direct operation by the user of directly cutting off the displayed objects, and an object editing system for carrying out the object editing method.

Another object of the invention is to provide an object editing method wherein an object can be erased in a manner more similar to the actual erasing state using an blackboard eraser, and an object editing system for carrying out the object editing method.

An additional object of this invention is to provide an object editing method capable of suggesting the user the operating method of the various editing processes, and also, simplifying the setting of the operating method in the various editing processes, and an object editing system for carrying out the method.

An even further object of the invention is to provide an object editing method capable of easily and quickly restoring the object which is once erased from the screen, and an object editing system for carrying out the object editing method.

Another object of the invention is to provide an object editing method capable of displaying again immediately without re-making the objects once erased from the screen, and an object editing system for carrying out the object editing method.

Another object of the invention is to provide an objecting editing method capable of reducing the memory capacity required for storing the contents of the erased object, and an object editing system for carrying out the object editing method.

Another object of the invention is to provide a computer memory product wherein the computer program capable of realizing the aforementioned object editing method is recorded.

The above and further objects and features of the invention will more fully be apparent from the following detailed description with accompanying drawings.

BRIEF DESCRIPTION OF THE SEVERAL VIEWS OF THE DRAWINGS

FIG. 25 is a diagram showing one example of an executive table for managing an association among objects;

FIG. 30 is a diagram showing one example of an object executive table;

FIG. 32 is a diagram showing one example of the object executive table;

FIGS. 44A through 44D are explanatory diagrams showing examples of displaying and operating of objects in an object connecting process (embodiment 19);

FIGS. 54A through 54D are explanatory diagrams showing examples of displaying and operating of objects in an object separating process (embodiment 24);

FIGS. 56A through 56E is an explanatory diagram showing examples of displaying and operating of objects in an object separating process (embodiment 25);

FIGS. 58A through 58E are explanatory diagrams showing examples of displaying and operating of objects in an object separating process (embodiment 26);

FIGS. 60A through 60F are explanatory diagrams showing examples of displaying and operating of objects in an object separating process (embodiment 27);

FIGS. 64A through 64E are explanatory diagrams showing examples of displaying and operating of objects in an object separating process (embodiment 29);

FIGS. 66A through 66E are explanatory diagrams showing examples of displaying and operating of objects in an object separating process (embodiment 30);

FIGS. 67A through 67D are explanatory diagrams showing examples of displaying and operating of objects in an object erasing process (embodiment 31);

FIG. 73 is a diagram showing one example of the object executive table;

FIG. 78 is a diagram showing one example of an object executive table;

FIG. 81 is a diagram showing one example of the registration contents of a pointer information table;

FIG. 88 is a diagram showing one example of the registration contents of a pointer information table;

DETAILED DESCRIPTION OF THE INVENTION

Figure 1A:
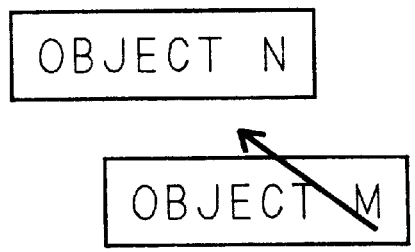
FIGS. 1A through 1C are explanatory diagrams showing examples of displaying and operating of objects in a conventional object connecting process.
Figure 1B:
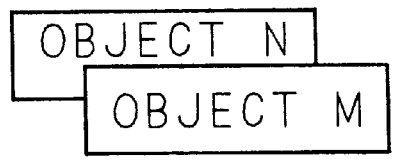
Figure 1C:
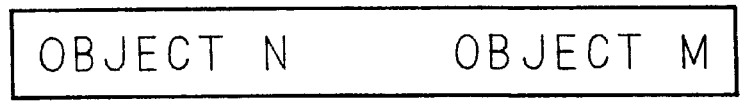
Figure 2:
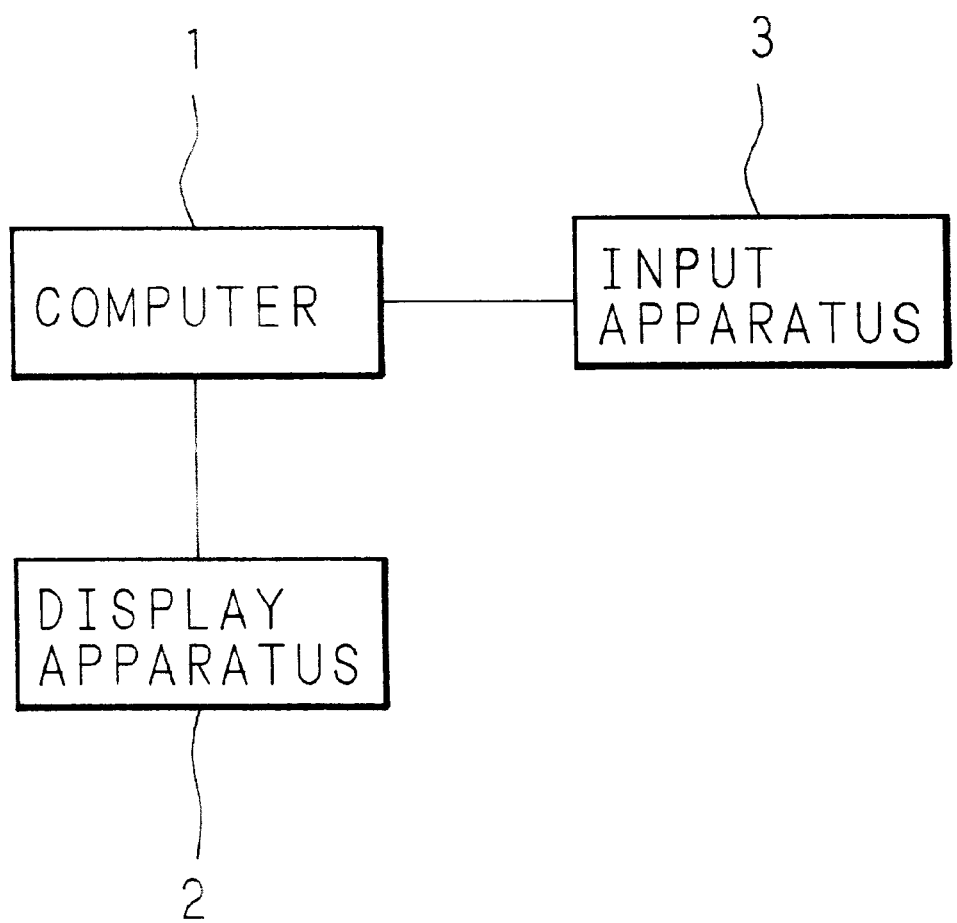
FIG. 2 is a diagram showing the configuration of an object editing system of the invention.

FIG. 2 is a block diagram showing the configuration of the object editing system of the invention. Referring now to the drawing, reference numeral 1 denotes a computer for operating an application software on an editing process such as associating, connecting, separating, erasing operations with respect to objects. A display apparatus 2 for displaying the display information is connected with the computer 1. Also, the computer 1 has an input apparatus 3, such as mouse or the like, connected with it.

The associating (grouping) operation of objects (first through fourth inventions), the canceling operation of the association (fifth through ninth inventions) among objects, and the renewing operation (tenth through twelfth inventions) of the positions of the objects belonging to the group will be described hereinafter.

In a grouping process of objects of the first invention, first and second objects are displayed on the display apparatus. When a selecting operation of the second object is received from the input apparatus 3 within a predetermined time period from the end of the moving operation with respect to the first object through the input apparatus 3, the second object is moved with the vector in the moving operation of the first object being made the same as the moving vector, so as to associate the first object with the second object.

In the first invention, when a user assume that the first object and the second object are associated with each other, the first object is moved for movement of the first object and the second object. As a result, the second object, which has not actually been associated, cannot be moved. In such a case, the invention is capable of associating the first and second objects with a simple operation of selecting the second object within a predetermined time period from the completion of the moving operation of the first object. Furthermore, the results of the moving processing, where the first object and the second object are associated, can be obtained.

In a grouping process of objects of the second invention, first and second objects are displayed on the display apparatus 2. The first object and the second object are associated with each other by receiving the moving operation of the second object from the input apparatus 3, within a predetermined time period from the completion of the moving operation with respect to the first object from the input apparatus 3, so as to associate the first object with the second object.

In the second invention, for associating objects, the first object and the second object can be associated with each other by a simple operation of moving the second object within the predetermined time period after the moving operation of the first object.

In a grouping process of objects of the third invention, first and second objects are displayed on the display apparatus 2. After the receiving the selecting operation with respect to the first object from the input apparatus 3, a selecting operation of the second object is received from the input apparatus 3 within a predetermined time period, so as to associate the first object with the second object.

In the third invention, the first object is selected in the associating operation of the objects. The first object and the second object can be associated with each other by a simple operation of selecting the second object within the predetermined time period.

In a grouping process of objects of the fourth invention, first and second objects are displayed on the display apparatus 2. After the receiving of the selecting operation with respect to the first object from the input apparatus 3, a moving operation of the second object is received from the input apparatus 3 within a predetermined time period, so as to associate the first object with the second object.

In the fourth invention, the first object is selected in the associating operation of the objects. The first object and the second object can be associated with each other by a simple operation of moving the second object within a predetermined time period.

In a canceling process of the association between objects of the fifth invention, a segment for connecting the objects to show the association when the objects have been associated are displayed on the display apparatus 2. The association between the objects are canceled by receiving from the input apparatus 3 an operation of crossing the segment with a predetermined time period after the association.

In the fifth invention, the association can be canceled by a simple operation of crossing the segment showing the association between the objects within the predetermined time period after the associating operation between the objects.

In a canceling process of the association between objects of the sixth invention, a segment connecting a first object with a second object for showing the relationship thereof is displayed on the display apparatus 2 when a selecting operation of the second object having the association with the first object is received from the input apparatus 3. After the selecting operation of the second object, an operation for crossing the segment is received from the input apparatus 3 within a predetermined time period is received from the input apparatus 3, so as to cancel the association between the objects.

In the sixth invention, the association can be canceled by a simple operation of crossing the segment showing the association between the objects within the predetermined time period after the selecting operation of the object having been associated with the other object.

In a canceling process of the association between objects of the seventh invention, a segment connecting a first object with a second object for showing the relationship thereof is displayed on the display apparatus 2 after the first object is moved with the vector in the moving operation of the second object being made the same as the moving vector when a moving operation of the second object associated with the first object is received from the input apparatus 3. After the moving process of the first object, an operation for crossing the segment is received from the input apparatus 3 within a predetermined time period for restoring the position of the first object, so as to cancel the association between the first and second objects.

In the seventh invention, in the canceling process of the association between the objects, the association can be canceled by a simple operation of crossing the segment showing the association between the objects within the predetermined time period after the moving operation of the object having association with the other object, and the results of the moving process caused by the moving operation can be restored.

In a canceling process of the association between objects of the eighth invention, which is a modification of the fifth to seventh inventions, instead of drawing a segment showing the association between the objects, the area of each object is colored, and a selecting operation of a desired object is used, instead of the crossing operation of the segment.

In the eighth invention, the visual recognition property can be improved by coloring the area of the object to show the association between the objects.

In a canceling process of the association between objects of the ninth invention, which is a modification of the fifth to seventh inventions, a frame surrounding the area of each object is displayed instead of segment showing the association between the objects, and a selecting operation of a desired object, instead of the operation for crossing the segments, is used.

In the ninth invention, the visual recognition property can be improved by surrounding the area of each object with a frame to show the association between the objects.

In a renewing process of the associating information between objects of the tenth invention, a selecting operation of a second object having association with a first object is received from the input apparatus 3. After the selecting operation thereof, the associating information between the first and second objects is renewed by receiving a moving operation of the second object from the input apparatus 3 within a predetermined time period.

In the tenth invention, in the changing operation of the existing associating information between objects, the associating information can be renewed by a simple operation of moving the object within the predetermined time period from the selecting operation of the object having association with the other object.

In a renewing process of the associating information between objects of the eleventh invention, a selecting operation of a second object having association with a first object is received, and a moving operation of the first object is received from the input apparatus 3 within a predetermined time period after the selecting operation, so as to renew the associating information between the first and second objects.

In the eleventh invention, in the changing of the associating information between the objects already existing, the associating information can be renewed by a simple operation of moving the other object within the predetermined time period after the selecting operation of the object having association with the other object.

In a renewing process of the associating information between objects of the twelfth invention, a moving operation of a second object having association with a first object is received from the input apparatus 3, and the first object is moved with the vector in the moving operation of the second object being made the same as the moving vector. After the moving operation thereof, the associating information between the first and second objects is renewed by receiving the moving operation of the first object from the input apparatus 3 within a predetermined time period.

In the twelfth invention, in the changing of the associating information between the objects already existing, the associating information can be renewed by a simple operation of moving the other object within the predetermined time period after the moving operation of the object having association with the other object.

Then, a connecting operation (thirteenth and fourteenth inventions) of objects, a separating operation (fifteenth and sixteenth inventions) of objects, the erasing operation (seventeenth and nineteenth through twenty-third inventions) of objects, and a general editing operations (eighteenth invention) with respect to the object will be described.

Figure 3:
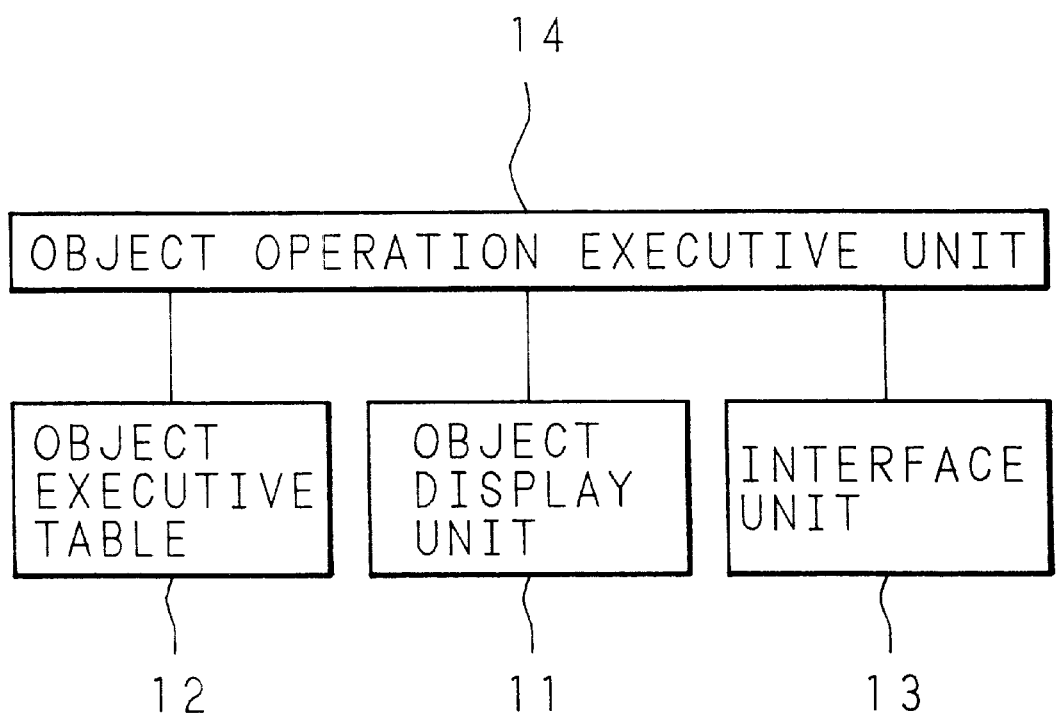
FIG. 3 is a diagram showing the configuration of a software in an object editing system of the invention.

FIG. 3 is a diagram showing the configuration of a software of an object editing system for the editing process of various types. The system of the invention comprises an object display unit 11, an object executive table 12, an interface unit 13, and an object operation executive unit 14. The object display unit 11 displays on the display apparatus such as display, LCD or the like objects such as diagrams, character strings made by a user. The object executive table 12 registers data of each such as the display position, attribute (classification as drawing patterns or character strings), the contents, condition (classification as in the selected or non-selecting as an editing object), time stamp (composing time of the objects) and so on. The interface unit 13 receives an instruction from the user on an operation through the input apparatus 3 with respect to the displayed object. The object operation executive unit 14 controls the object display unit 11, the object executive table 12 and the interface unit 13 for managing the displaying process of the objects and the editing process thereof.

In a connecting process of objects of the thirteenth invention, the interface unit 13 detects an instruction of the input apparatus 3 with respect to a plurality of objects to be connected. According to the detection results or the register contents of the object executive table 12 about a plurality of objects to be connected specified by the input apparatus 3, these objects are connected in a condition where the connecting order are based on the user's intention to make the novel object. The novel object is registered in the object executive table 12 and the novel object is displayed on the object display unit 11.

In the thirteenth invention, the system decides the connecting order through judgment of the user's intention in accordance with the direct operation of the input apparatus 3 by the user, so as to conduct the connecting process of a plurality of objects.

In a connecting process of objects of the fourteenth invention, when a plurality of objects are displayed being combined in a certain order, an instruction of the input apparatus 3 with respect to the objects in the connected condition is detected by the interface unit 13. In accordance with the detection results, it is decided whether the connecting operation is to be completed with the present order being maintained or the connecting operation is to be completed with the present order being changed. After the completion of the connecting operation with the order being decided, a novel object is registered in the object executive table 12 and also, the novel object is displayed by the object display unit 11.

In the fourteenth invention, the system can change the connecting order of the object through the judgment of the user's intention in accordance with the direct operation of the input apparatus 3 by the user. The system can change the wrong order into the correct order by a simple operation even when the objects are likely to be connected in the wrong order.

In a separating process of object of the fifteenth invention, an instruction of the input apparatus 3 with respect to the object to be separated is detected by the interface unit 13. In accordance with the detection results, the object is separated into any numbers of objects to make a plurality of novel objects. The respective novel objects are registered into the object executive table 12 and each novel object is displayed by the object display unit 11.

In the fifteenth invention, the separating process of the object can be easily conducted through judgment of the user's intention by the system in accordance with the direct operation of the input apparatus 3 by the user.

In a separating process of object of the sixteenth invention, in a case where the object to be separated is an object, made by the user through a connecting operation, and the object is selected, the original objects, which are connected to make the object, are displayed in different colors respectively. Thus, the separating operation into the original objects are easily effected.

In an erasing process of an object of the seventeenth invention, a plurality of small areas made by dividing the area of the object to be erased are considered. The interface unit 13 detects an instruction of the input apparatus 3 with respect to each small area. In accordance with the detection results, the existence of the erasing in each small area is decided. A novel object composed of remaining portions is constructed with one portion of the object being removed by the small area unit. The novel object is registered into the object executive table 12 and the novel object is displayed by the object display unit 11.

In the seventeenth invention, the displayed objects can be partially erased by the small area unit, not that all the objects can be erased at a time. In the erasing of the objects, the erasing operation can be made similar to that of the erasing operation with the use of an actual blackboard eraser.

In an editing process of an object of the eighteenth invention, an operation box is also displayed in the object when displaying the object. An instruction of the input apparatus 3 to the operation box is detected by the interface unit 13. In accordance with the detection results, the editing process to the object is carried out and a novel object is made. The novel object is registered in the object executive table 12 and also, the novel object is displayed by the object display unit 11.

In the eighteenth invention, the area to be operated by the user through the input apparatus 3 is limited and displayed in the executing operation of the editing process. The operating method can be suggested even to a user who is not familiar with the operating method of various editing processes. The interfering operations with the operating methods in the various editing processes are reduced, thus making it easier to effect the setting operation with each operating method.

In an erasing process of an object of the nineteenth invention, the interface unit 13 detects an instruction of the input apparatus 3 with respect to the object to be erased. When an object displayed is to be erased, the contents of the object to be erased remain as they are without being erased from the object executive table 12. The object having been displayed disappears, but the contents of the object are not removed.

In the nineteenth invention, the contents of the object once erased are preserved so that they can be easily used when the object once erased is required to be used again.

In an erasing and restoring process of an object of the twentieth invention, the contents preserved in the object executive table 12 are read about the object once erased, so as to display the object again by the object display unit 11.

In the twentieth invention, an object once erased is adapted to be displayed again. In this case, the contents preserved in the object executive table 12 can be used. The object once erased can be restored quickly without re-making the object. The restored object can be used again for an editing process.

In an erasing and restoring process of an object of the twenty-first invention, after a displayed object is erased through the moving operation by the input apparatus 3, when the moving operation is effected by the input apparatus 3 in such a direction that the direction of the moving operation by the input apparatus 3 in the erasing process and the direction of a moving operation by the input apparatus 3 may form an angle equal to or larger than a predetermined value, the erased object is restored and can be displayed again by the object display unit 11.

In the twenty-first invention, the object once erased can be displayed again simply by changing the moving direction of the input apparatus 3. Therefore, an object erased by mistake, for example, can be restored immediately without being rewritten.

In an erasing and restoring process of an object of the twenty-second invention, the contents of the object which is instructed from the input apparatus 3 to be erased remain in the object executive table 12 as they are without being erased. After the lapse of a predetermined period of time since the erasing instruction is received, the contents of the preserved object are completely erased from the object executive table 12, because it is judged that the user does not have an intention to restore the object for displaying it again.

In the twenty-second invention, the contents of the object which is not displayed after the lapse of the predetermined period of time are erased, and the contents thereof are not required to be preserved for an unnecessarily long period of time. The storing capacity in the object executive table 12 can be kept less in waste.

In an erasing and restoring process of an object of the twenty-third invention, the object having received an erasing instruction of the input apparatus 3 is managed in non-displaying condition in the object executive table 12. To inform the user that the contents of the erased object are preserved in the object executive table 12, the object is displayed in a manner different from the normal displaying condition for a predetermined period of time before the contents of the object are erased.

In the twenty-third invention, the object is displayed in a manner different from the normal one within the predetermined period of time after the removing operation, and the displayed object is erased after the lapse of the predetermined period of time. The time period capable of effecting a restoring operation can easily be notified to the user through the displaying condition.

The embodiments of the invention will be described hereinafter.

Figure 4:
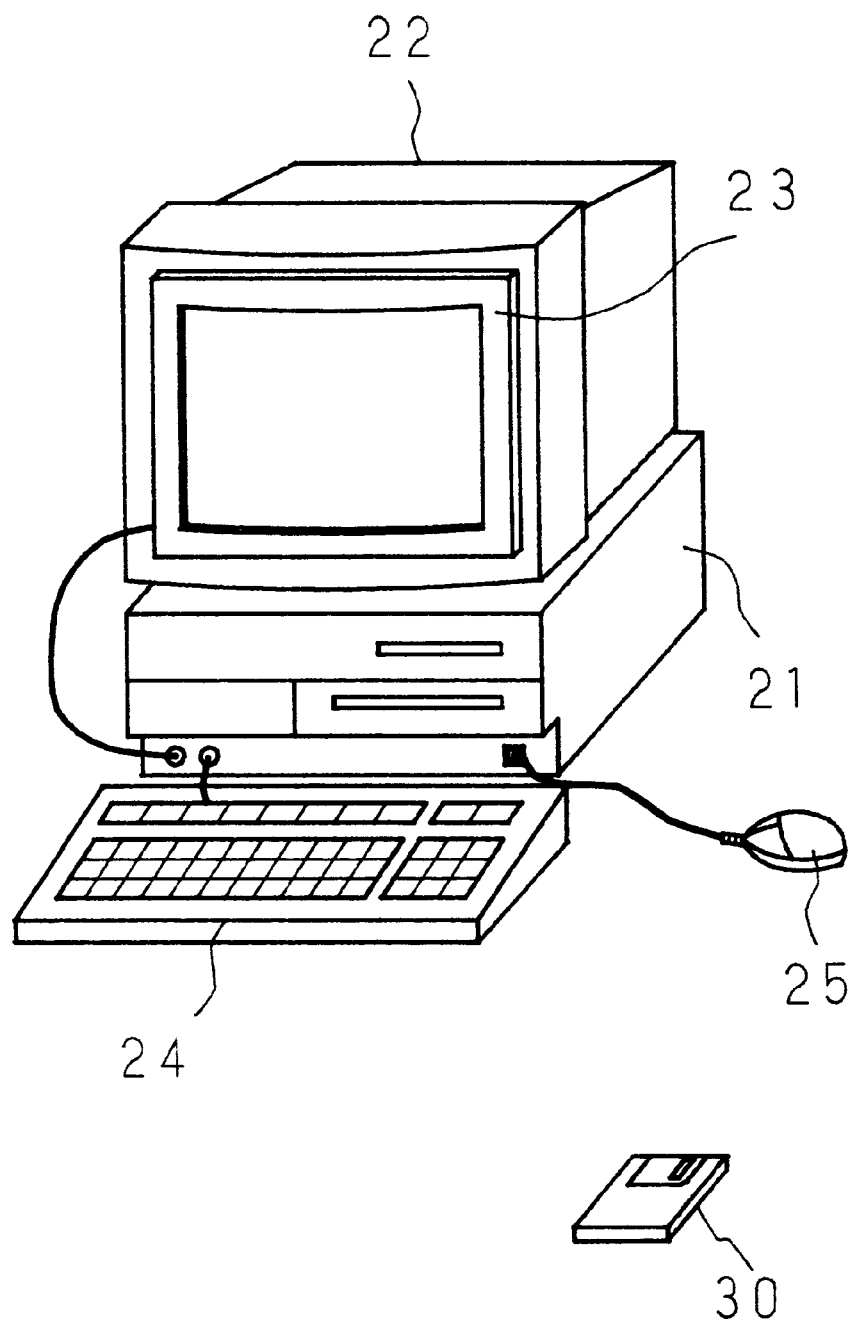
FIG. 4 is a schematic view showing the basic construction of an object editing system of the invention.

FIG. 4 is a schematic view showing the basic construction of the object editing system of the invention. The present system comprises a personal computer 21 as a user terminal, a display 22 for displaying objects such as drawing diagrams, character strings, or the like, a pen coordinates-input-apparatus 23 for conducting various instructing operations with respect to the object mounted on the tube face of the display 22, a key board 24 for inputting character strings. A mouse 25 is also used as an input apparatus for conducting various types of instructing operations with respect to the objects as well as in the pen coordinates-input-apparatus 23. The personal computer 21 loads from the computer memory product 30 such as magnetic disk or the like in which the program is recorded, the program for conducting editing process such as associating of objects, canceling and renewing of association, connecting, separating, erasing or the like.

First, embodiments 1 through 12 showing each process such as associating of a plurality of objects, canceling of the association of objects, renewing of the association of objects.

Embodiment 1

Associating (first invention) Objects

FIGS. 5A through 5D are explanatory diagrams showing examples of displaying and operating of objects in an associating process of the objects of the embodiment 1.

Figure 5A:
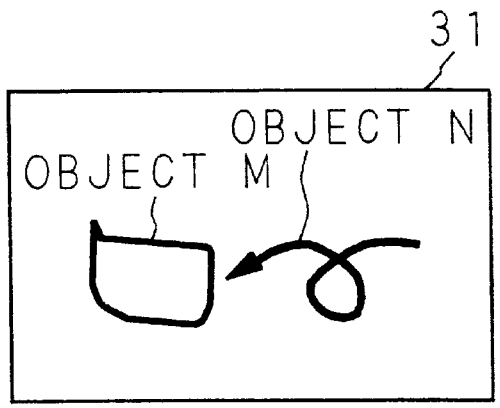
FIGS. 5A through 5D are explanatory diagrams showing examples of displaying and operating of objects in an associating process (embodiment 1) of the objects.
Figure 5B:
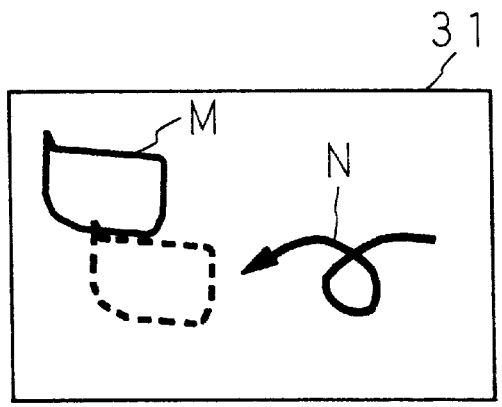
Figure 5C:
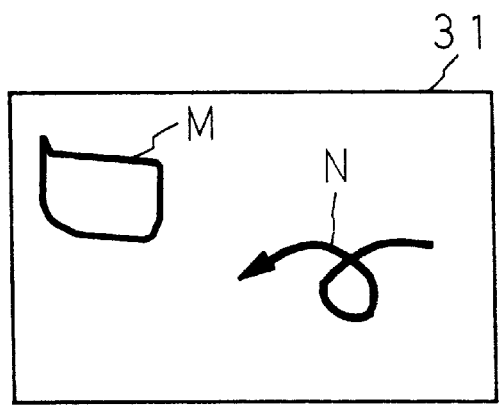
Figure 5D:
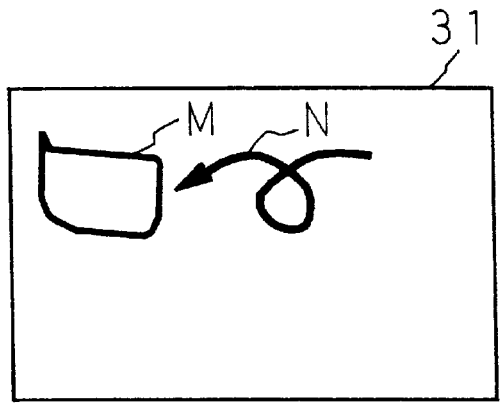

Referring now to FIG. 5A, reference numeral 31 shows the display area of the display 22. Within the display area 31 exist a closed loop-shaped object M and an arrow-shaped object N. The object M and the object N are not associated with each other. Namely, they are not grouped. First, as shown in FIG. 5B, the user moves the object M from the present position into an upper left direction. When the user conducts the selecting operation as shown in FIG. 5C within a predetermined period of time from the completion of the moving operation, the object N moves with the same moving vector as in the moving operation of the object M. He can associate the object M with the object N.

That is, when the object M is moved, to obtain the process results where the object M and the object N have been moved in accordance with the mutual association, but the associating operation has not been conducted between the object M and the object N, and the moving process of the object N has not been conducted, the user can obtain the desired result simply by selecting the object N within a predetermined period of time from the completion of said moving operation.

Figure 6:
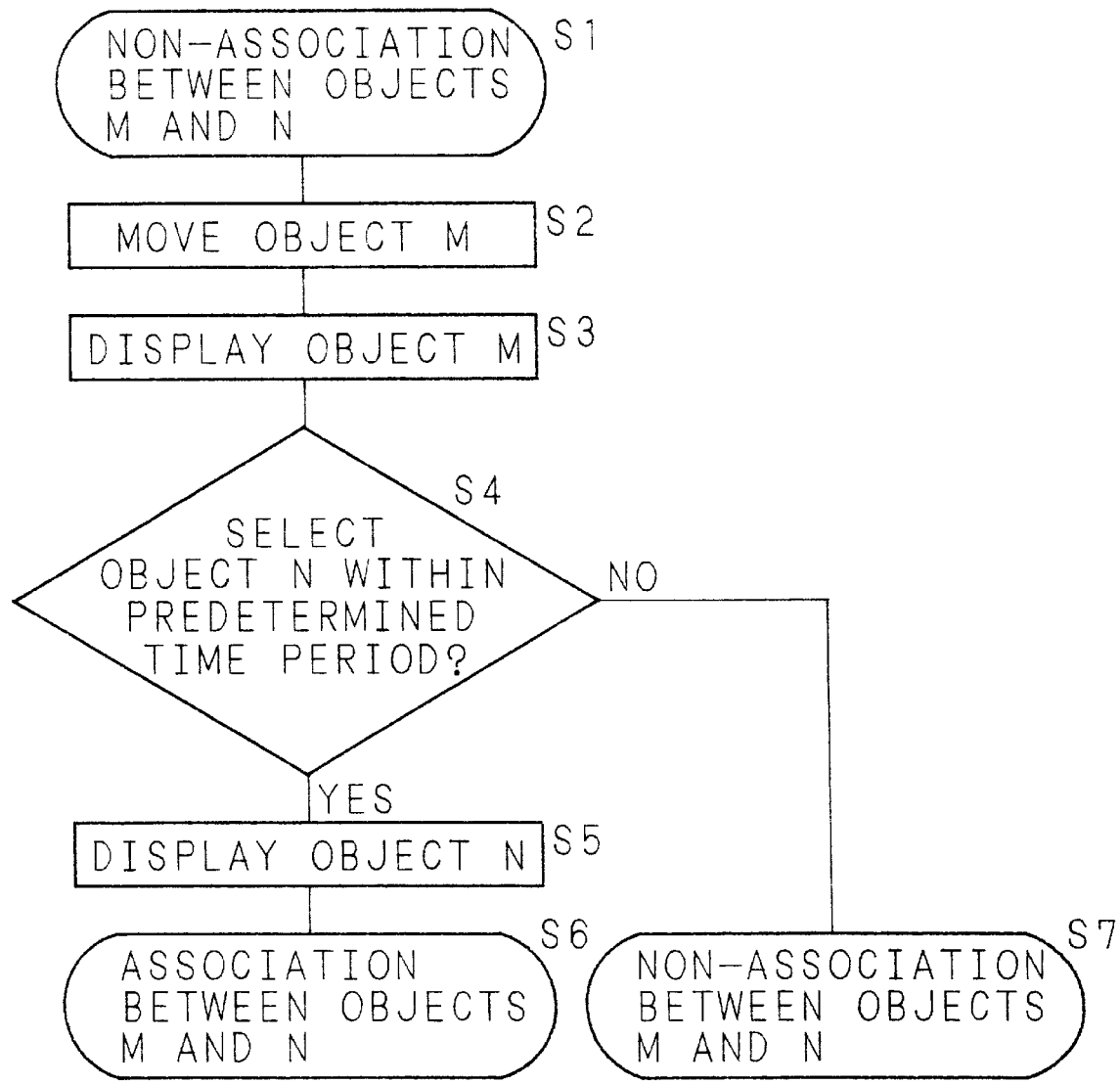
FIG. 6 is a flow chart showing a procedure for the associating process (embodiment 1)

FIG. 6 is a flow chart showing the processing procedure for the embodiment 1. When the user moves the object M (S2) in a condition (S1) where two objects M and N are not associated with each other, the system moves and displays (S3) the object M. Then it is judged whether or not the object N has been selected within a predetermined period of time (S4). When the object N has been selected (at S4, YES), the system moves and displays the object N with the same vector as in the object M (S5). Two objects M and N become associated (S6). When the object N has not been selected (at S4, NO), two objects M and N become non-associated (S7).

Embodiment 2

Associating Objects (second invention)

Figure 7A:
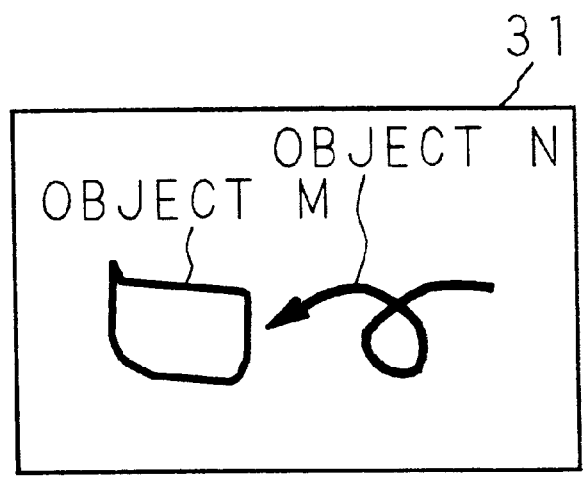
FIGS. 7A through 7C are explanatory diagrams showing examples of displaying and operating of objects in an associating process (embodiment 2) of the objects.
Figure 7B:
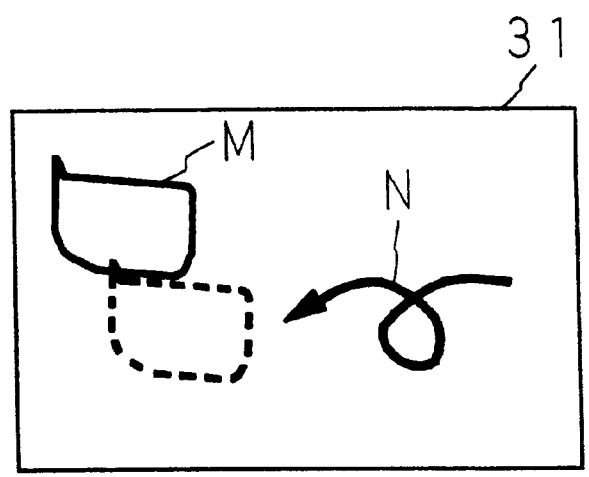
Figure 7C:
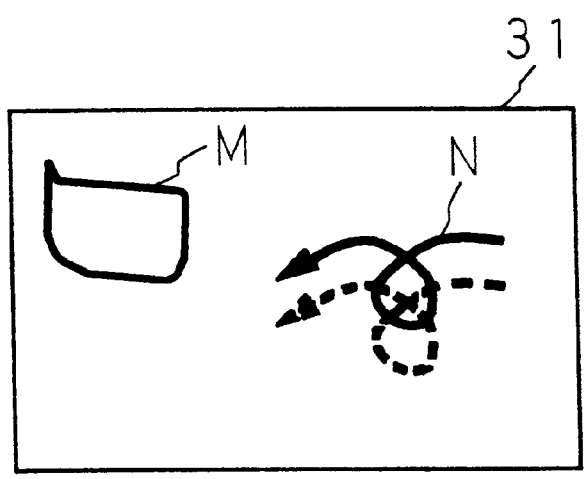

FIGS. 7A through 7C are explanatory diagrams showing examples of displaying and operating of objects in an associating process of the objects in the embodiment 2. In FIG. 7, the object M and the object N are not associated with each other. As shown in FIG. 7B, the user moves the object M from the present position into an upper-left direction. When the user moves the object N upwards from the present position, as shown in FIG. 7C, within a predetermined period of time from the completion of the moving operation, he can conduct an associating operation between the object M and the object N after the moving operation.

That is, when the user wants to conduct the associating operation of the two objects after the present position of the object N has been changed after the moving operation of the object M, the user can obtain the result simply by doing the moving operation of the object N within the predetermined period of time from the completion of the moving operation.

Figure 8:
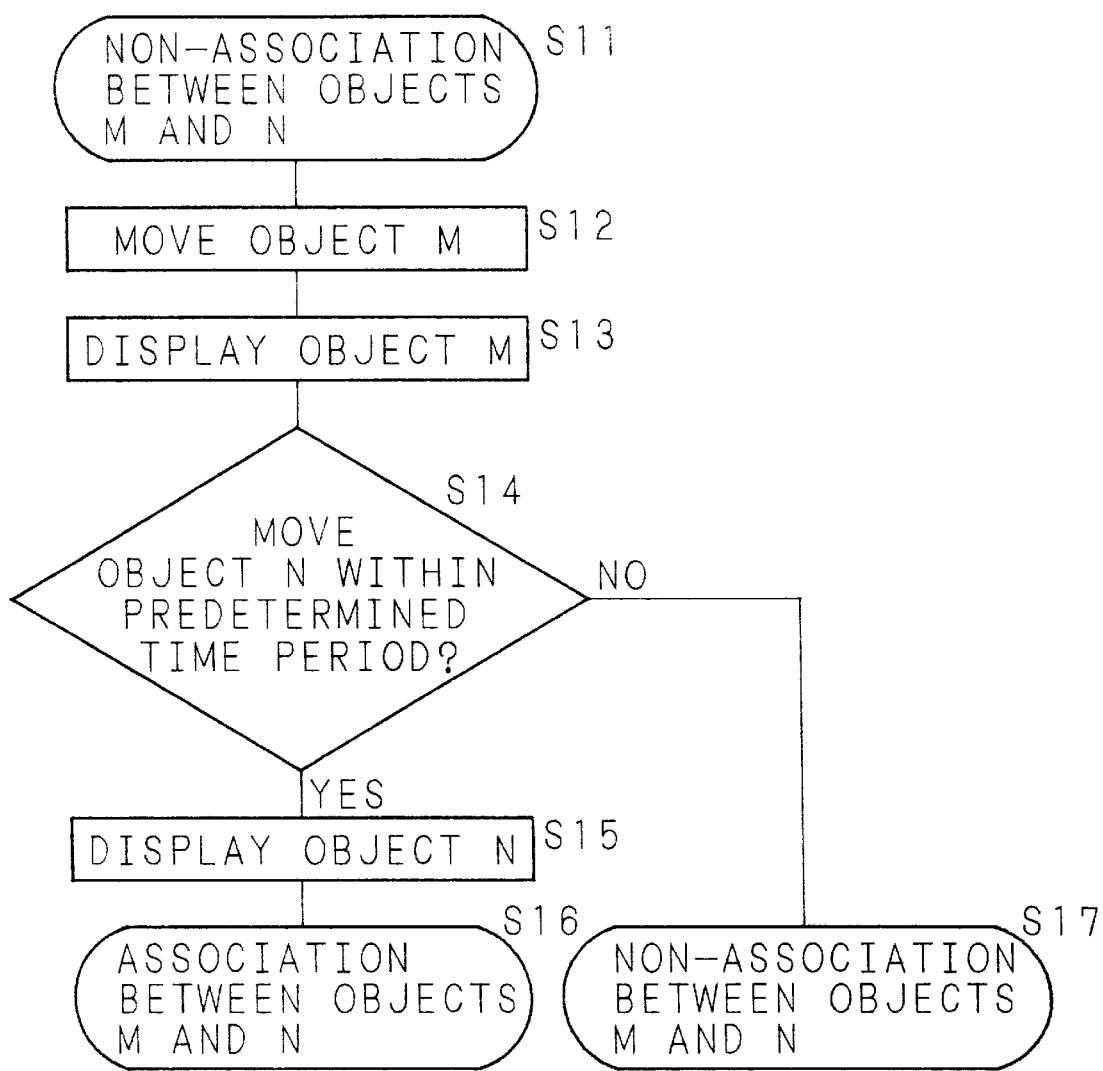
FIG. 8 is a flow chart showing a procedure for the associating process (embodiment 2)

FIG. 8 is a flow chart showing the processing procedure for the embodiment 2. When the user moves the object M (S12) in a condition (S11) where two objects M and N are not associated with each other (S11), the system moves and displays the object M (S13). The user judges whether or not the object N has been moved within the predetermined period of time (S14). When the object N has been moved (at S14, YES), the system moves and displays the object N (S15). Two objects M and N become associated (S16). When the object N has not been selected (at S14, NO), two objects M and N become not-associated (S17).

Embodiment 3

Associating Objects (third invention)

Figure 9A:
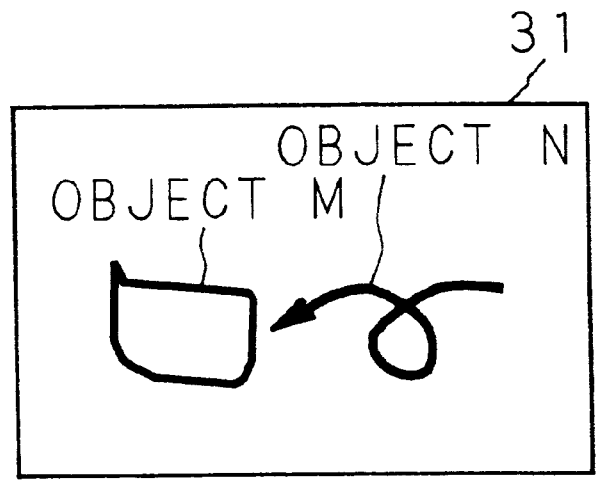
FIGS. 9A through 9C are explanatory diagrams showing examples of displaying and operating of objects in an associating process (embodiment 3) of the objects.
Figure 9B:
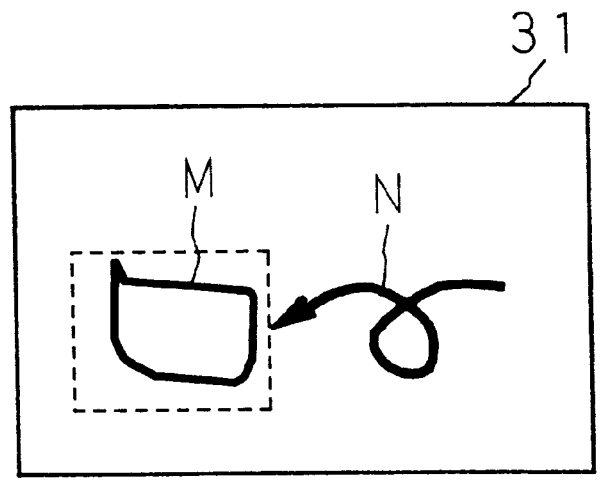
Figure 9C:
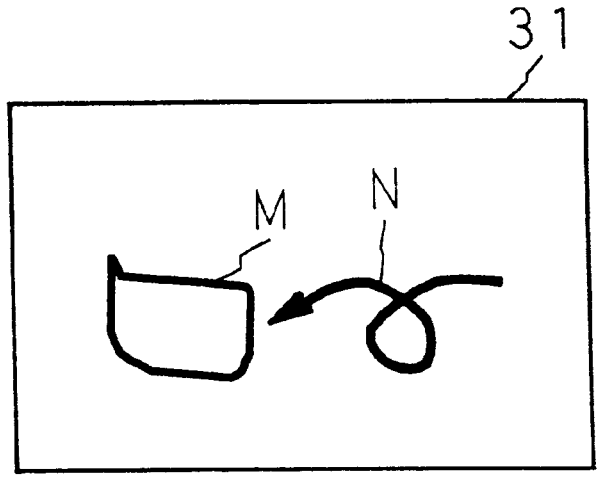

FIGS. 9A through 9C are explanatory diagrams showing examples of displaying and operating of objects in an associating process of the objects of the embodiment 3. In FIG. 9A, the object M and the object N are not associated with each other. At first, as shown in FIG. 9B, the user selects the object M. A rectangular frame is displayed to show the user the object M selected by the selecting operation. Instead of the frame displaying, the area of the object M may be reversed and displayed. When the user selects the object N within a predetermined period of time, as shown in FIG. 9C, the associating operation between the object M and the object N can be conduced.

Figure 10:
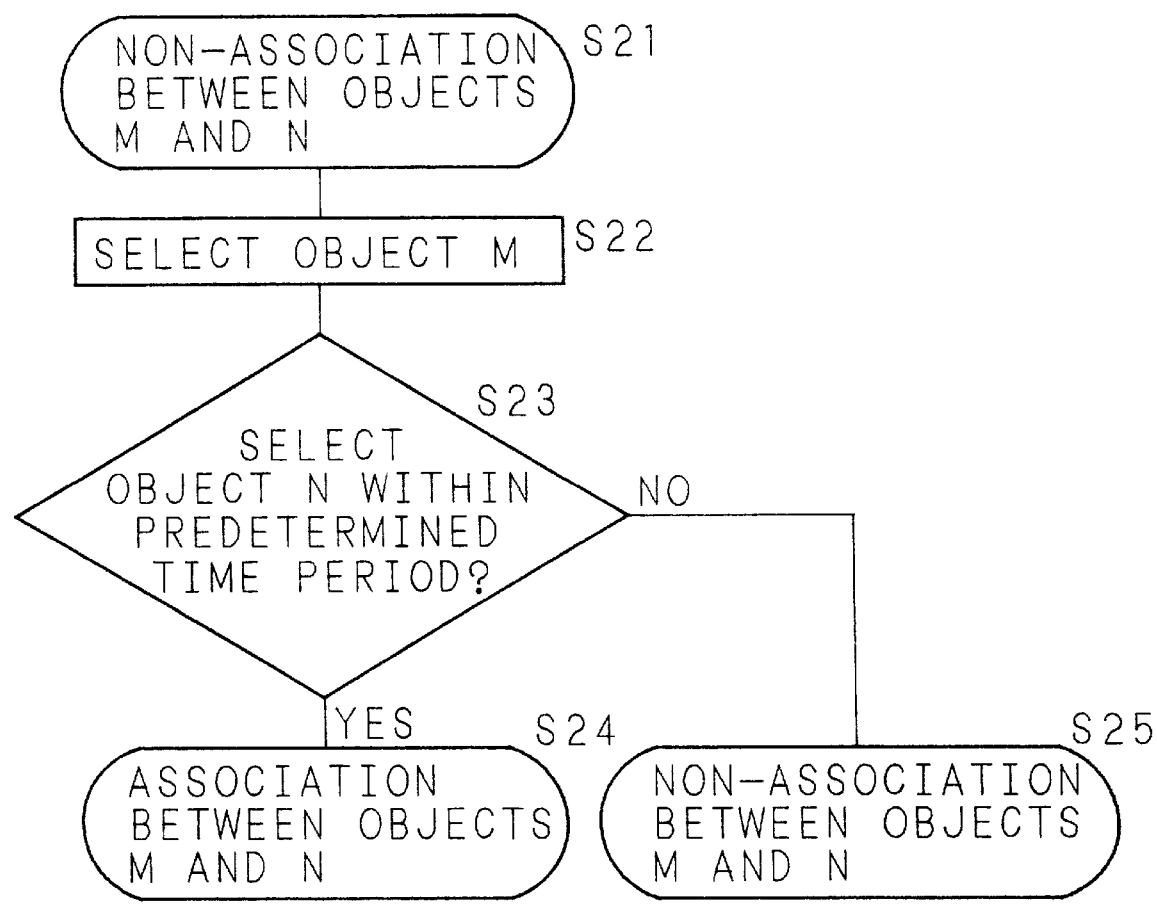
FIG. 10 is a flow chart showing a procedure for the associating process (embodiment 3)

FIG. 10 is a flow chart showing a processing procedure for the embodiment 3. The user selects the object M (S22) in a condition where two objects M and N are not associated with each other (S21). Then it is judged (S23) whether or not the user has selected the object N within the predetermined period of time. When the object N has been selected, (at S23, YES), the two objects M and N become associated with each other (S24). When the object N has not been selected (S23, NO), two objects M and N become non-associated (S25).

Embodiment 4

Associating Objects (fourth invention)

Figure 11A:
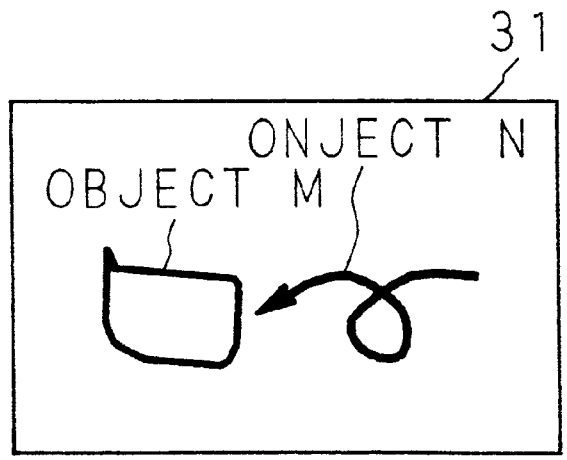
FIGS. 11A through 11C are explanatory diagrams showing examples of displaying and operating of objects in an associating process (embodiment 4) of the objects.
Figure 11B:
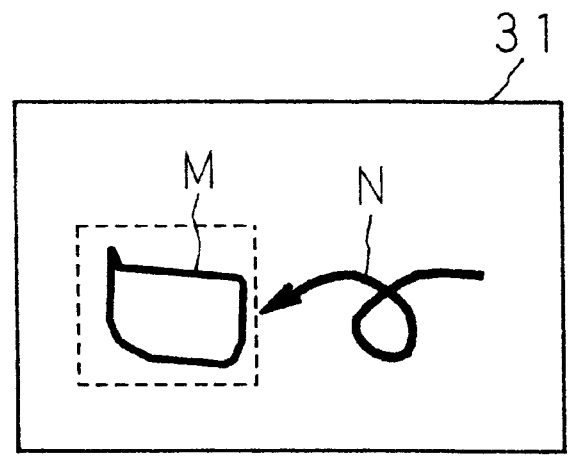
Figure 11C:
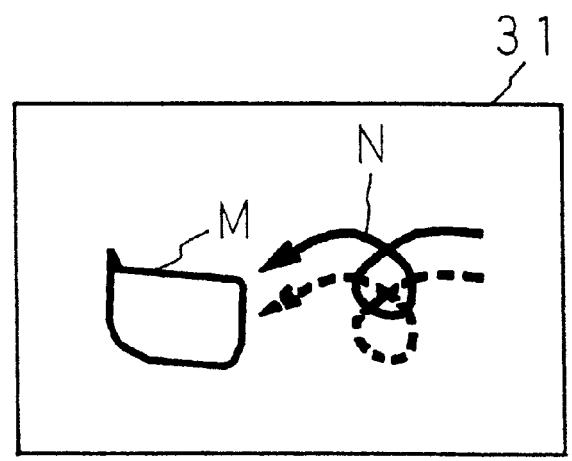

FIGS. 11A through 11C are explanatory diagram showing examples of displaying and operating of objects in an associating process of the objects for the embodiment 4. Referring now to FIG. 11A, the object M and the object N are not associated with each other. First, as shown in FIG. 11B, the user selects the object M. A rectangular frame is displayed to show the user the object M selected by the selecting operation. Instead of displaying the frame, the area of the object M can be reversed and displayed. When the user moves the object N upwards from the present position as shown in FIG. 11C, within a predetermined period of time, the association between the object M and the object N can be conducted.

Figure 12:
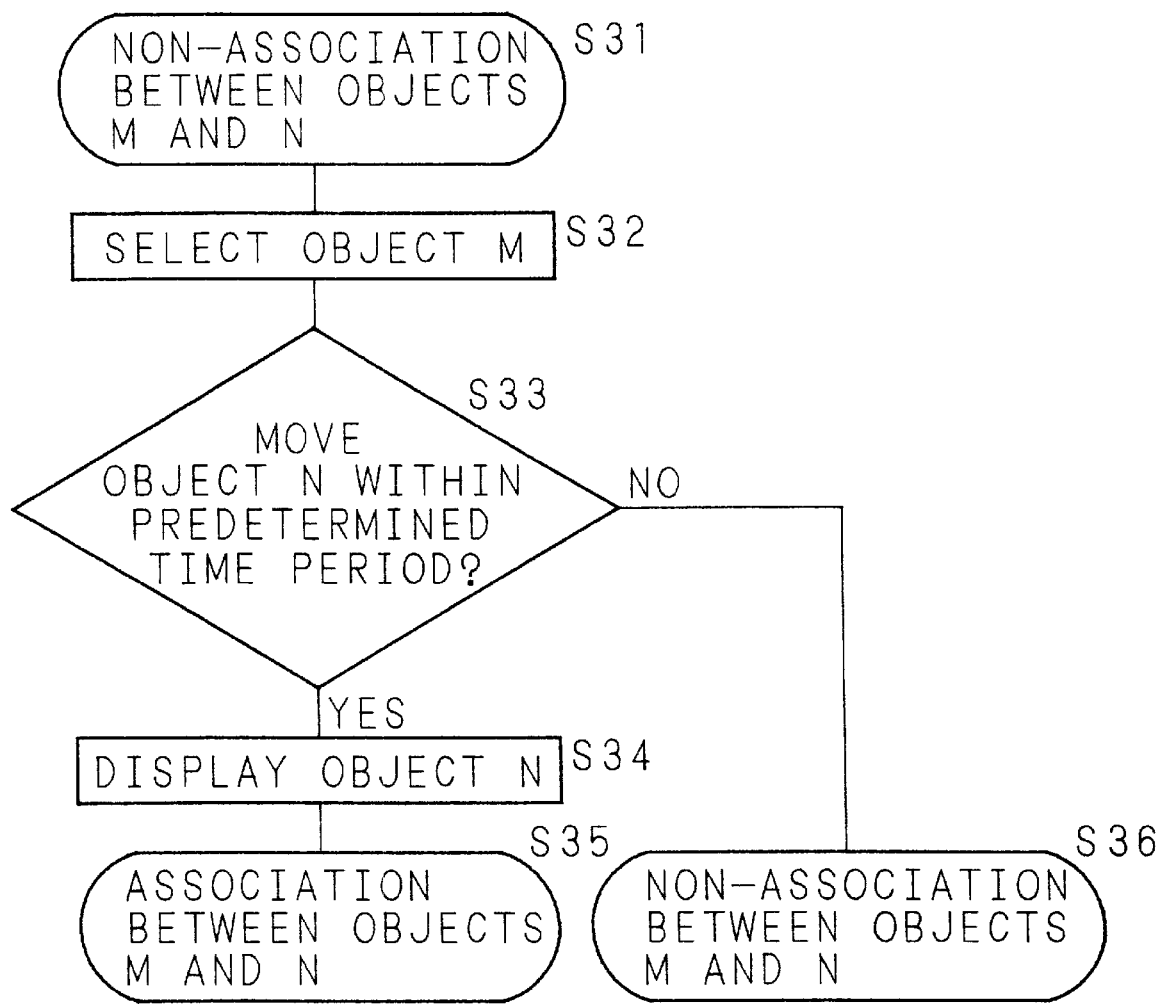
FIG. 12 is a flow chart showing a procedure for the associating process (embodiment 4)

FIG. 12 is a flow chart showing the processing procedure for the embodiment 4. In a condition when two objects M and N are not associated with each other (S31), the user selects the object M (S32). Then it is judged (S33) whether or not the user has moved the object N within the predetermined period of time. When the object N has been moved (at S33, YES), the system moves and displays the object N (S34), and two objects M and N become associated (S35). When the object N has not been moved (at S33, NO), two objects M and N become non-associated (S36).

Embodiment 5

Canceling an Association of Objects (fifth invention)

Figure 13A:
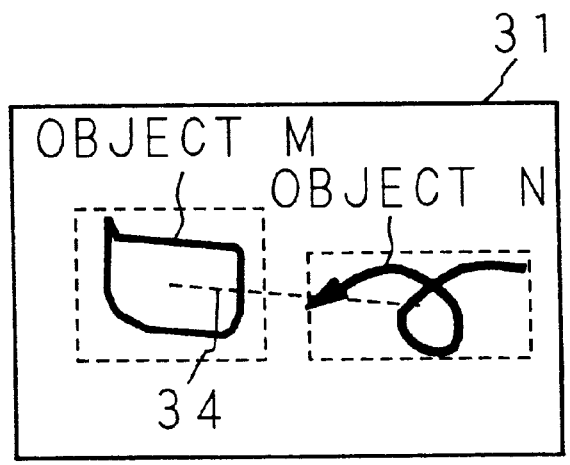
FIGS. 13A through 13C are explanatory diagrams showing examples of displaying and operating of objects in an association canceling process (embodiment 5) of the objects.
Figure 13B:
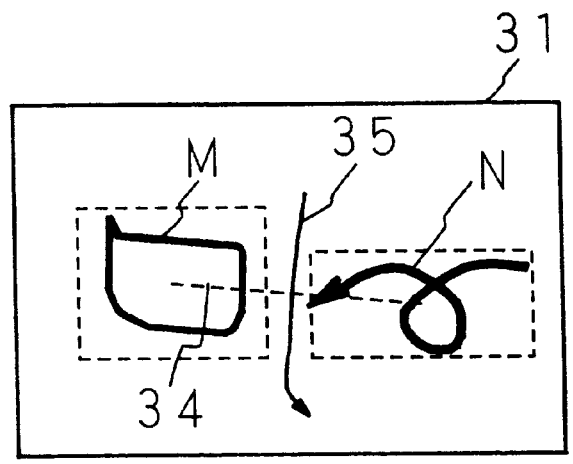
Figure 13C:
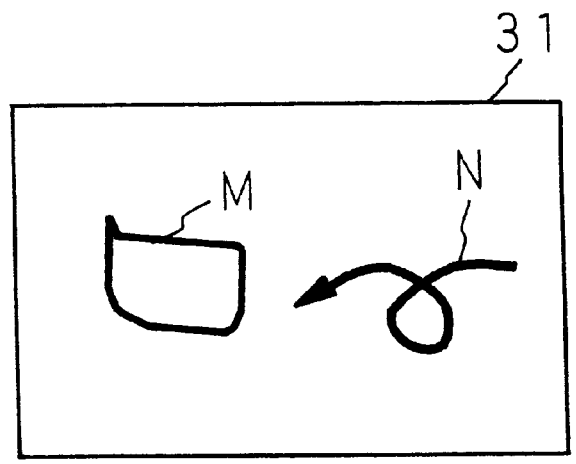

FIGS. 13A through 13C are explanatory diagrams showing examples of displaying and operating of objects in a canceling process of the associated objects for the embodiment 5. When the associating of the object M and the object N is caused, it is displayed as in FIG. 13A. Namely, a rectangular frame for respectively surrounding the object M, and the object N is displayed. Also, to display the association between the object M and the object N, a link line 34 for connecting the centers of the frames is displayed. When the user conducts a crossing operation (hereinafter referred to as crossing operation) of the link line 34 with the tracking 35 of a pen pointer, a mouse pointer or the like for inputting the position on the screen, as shown in FIG. 13B, within a predetermined period of time after the associating operation is effected, the association between the objects M and N is canceled, and the frame and the link line 34 are removed as shown in FIG. 13C.

Figure 14:
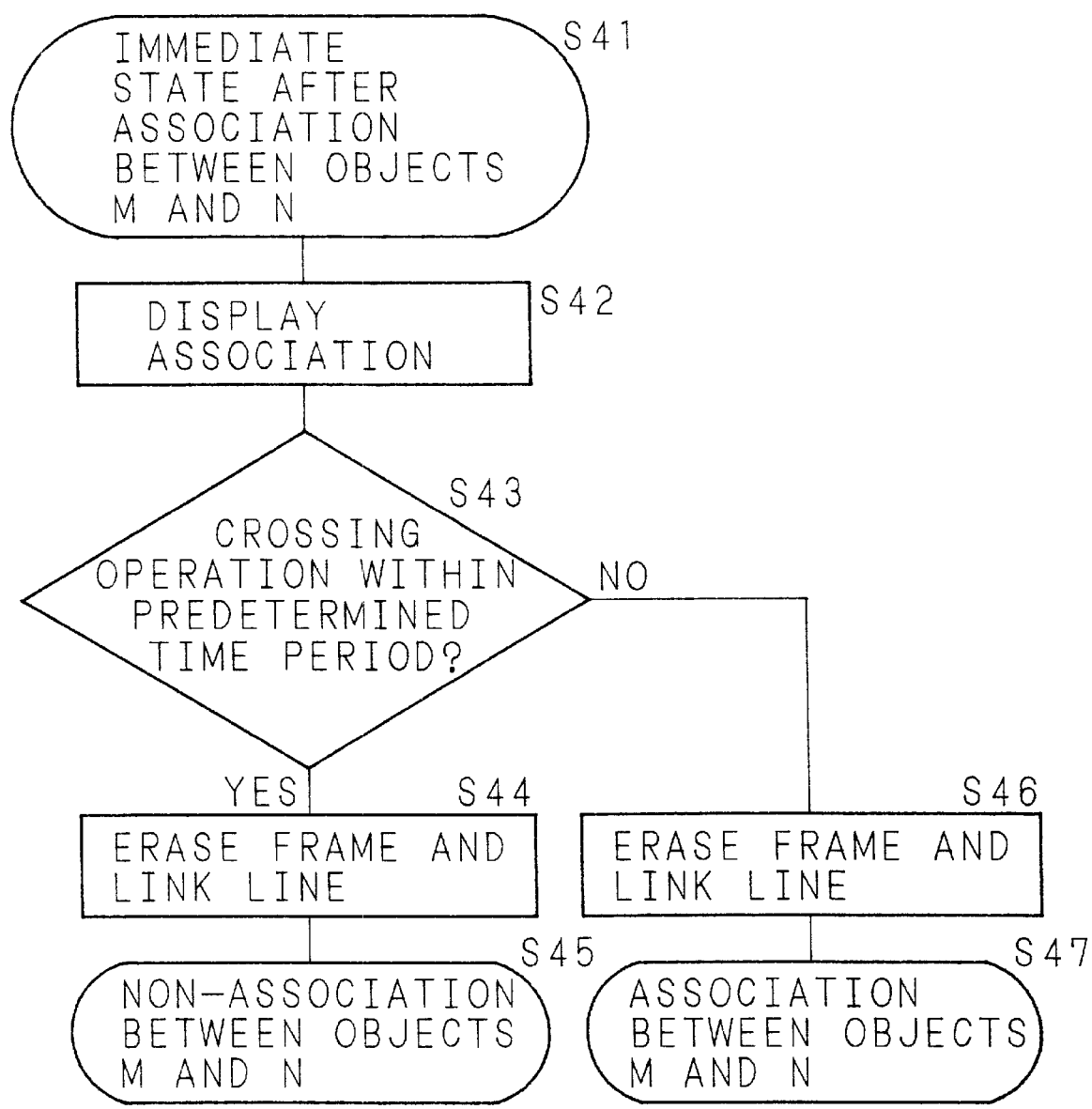
FIG. 14 is a flow chart showing a procedure for the association canceling process (embodiment 5)

FIG. 14 is a flow chart showing the processing procedure for the embodiment 5. The system displays with rectangular frame and the line 34 the association between the objects M and the N in a condition (S41) immediately after the two objects M and N are associated with each other. Then it is judged (S43) whether or not the user has conducted a crossing operation within a predetermined period of time (S43). When the user has conducted the crossing operation (at S43, YES), the system removes the rectangular frame and the link line 34 (S44), and the two objects M and N are brought into a non-associated condition (S45). When the user has not conducted the crossing operation (at S43, NO), the system removes the rectangular frame and the link line 34 (S46) and the two objects M and N become associated (S47).

Embodiment 6

Canceling an Association of Objects (Sixth invention)

Figure 15A:
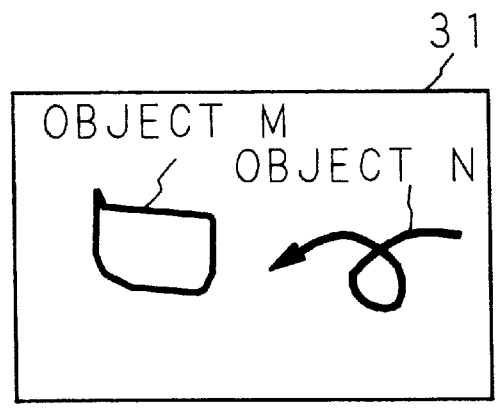
FIGS. 15A through 15D are explanatory diagrams showing examples of displaying and operating of objects in an association canceling process (embodiment 6) of the objects.
Figure 15B:
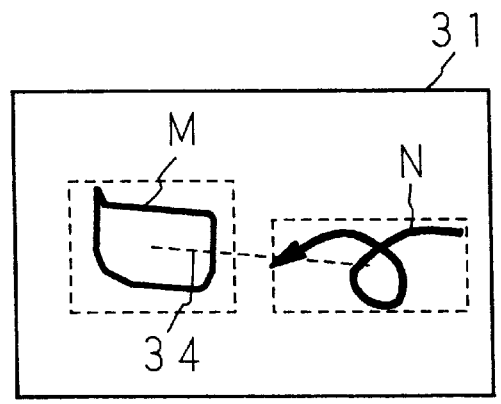
Figure 15C:
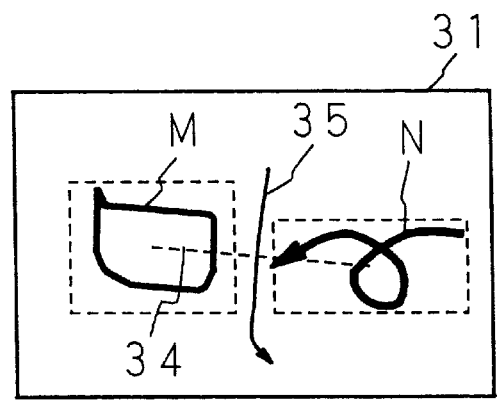
Figure 15D:
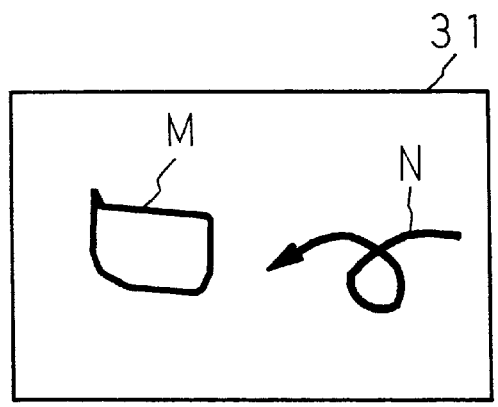

FIGS. 15A through 15D are explanatory diagrams showing examples of displaying and operating of objects in a canceling process of association between objects for the embodiment 6. In FIG. 15A, object M and object N are associated with each other, namely, they are grouped. When the user selects the object M or the object N, the displaying process is effected as in FIG. 15B. Namely, rectangular frames for respectively surrounding the object M and the object N are displayed. Also, to show the association between the object M and the object N, a link line 34 for connecting the centers of the frames is displayed. When the user conducts a crossing operation of the link line 34 with a tracking 35 of the pen pointer, the mouse pointer or the like, as shown in FIG. 15C, within a predetermined period of time after the selecting operation, the association between the objects is canceled and the frame and the link line 34 are removed as shown in FIG. 15D.

Figure 16:
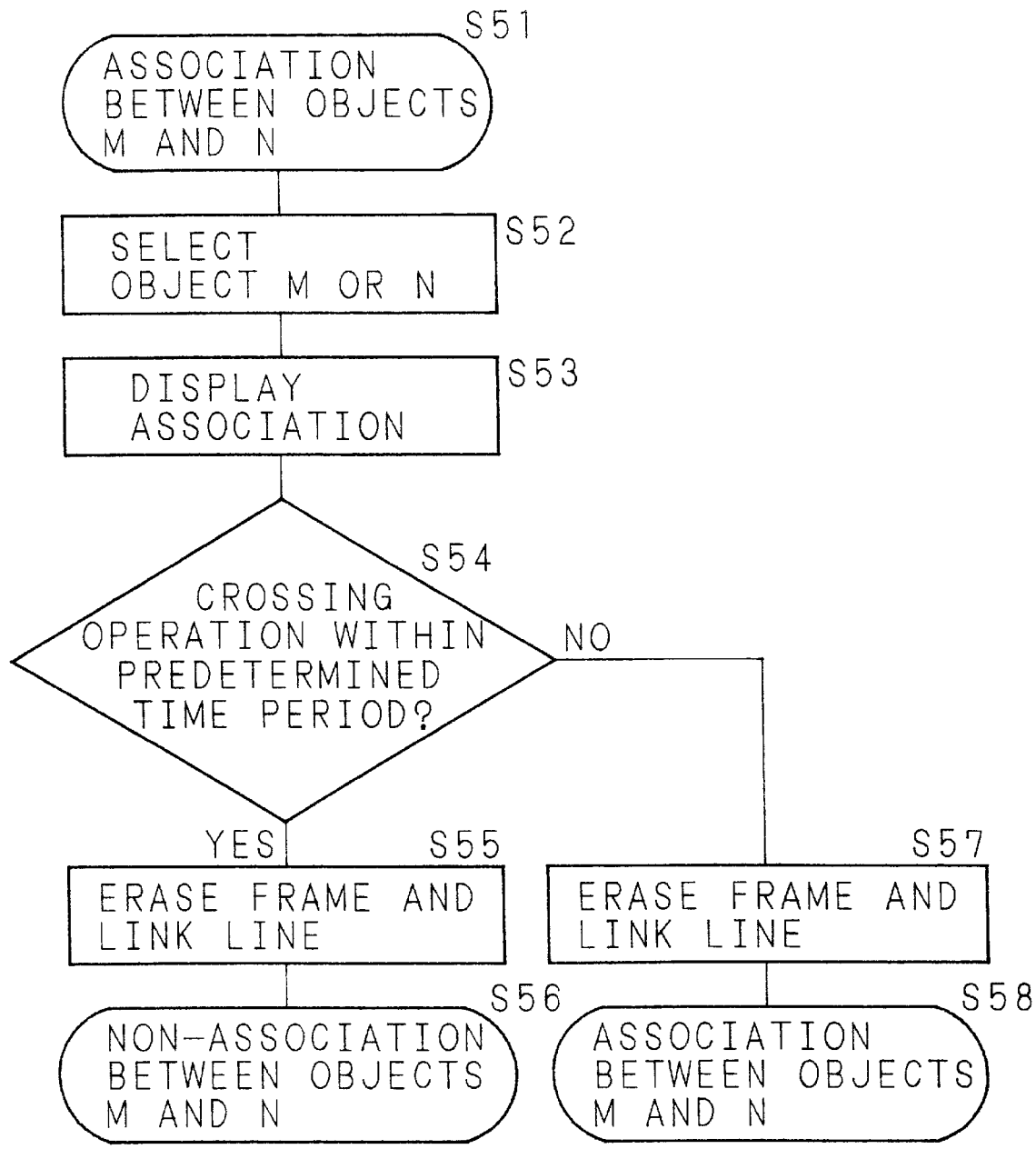
FIG. 16 is a flow chart showing a procedure for the association canceling process (embodiment 6)

FIG. 16 is a flow chart showing the processing procedure for the embodiment 6. When the user selects the object M or the object N (S52) in a condition (S51) where the two objects M and N are associated (S51), the system displays with the rectangular frame and the link line 34 that the association is effected between the objects M and N (S53). It is judged (S54) whether the user has conducted the crossing operation within the predetermined time period. When the crossing operation has been conducted (at S54, YES), the system removes the rectangular frame and the link line 34 (S55), and the two objects M and N are brought into a non-associated condition (S56). When the user has not conducted the crossing operation (at S54, NO), the system removes the rectangular frame and the link line 34 (S57) and the two objects M and N become associated (S58).

Embodiment 7

Canceling an Association of Objects (seventh invention)

Figure 17A:
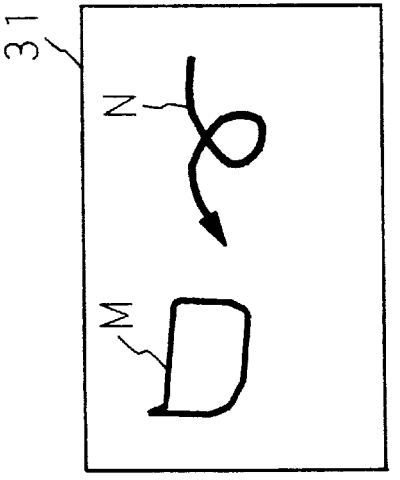
FIGS. 17A through 17F are explanatory diagrams showing examples of displaying and operating of objects in an association canceling process (embodiment 7) of the objects.
Figure 17B:
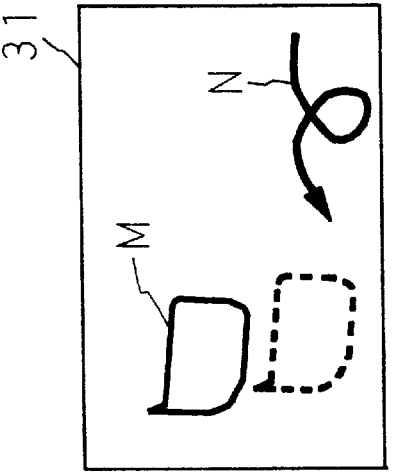
Figure 17C:
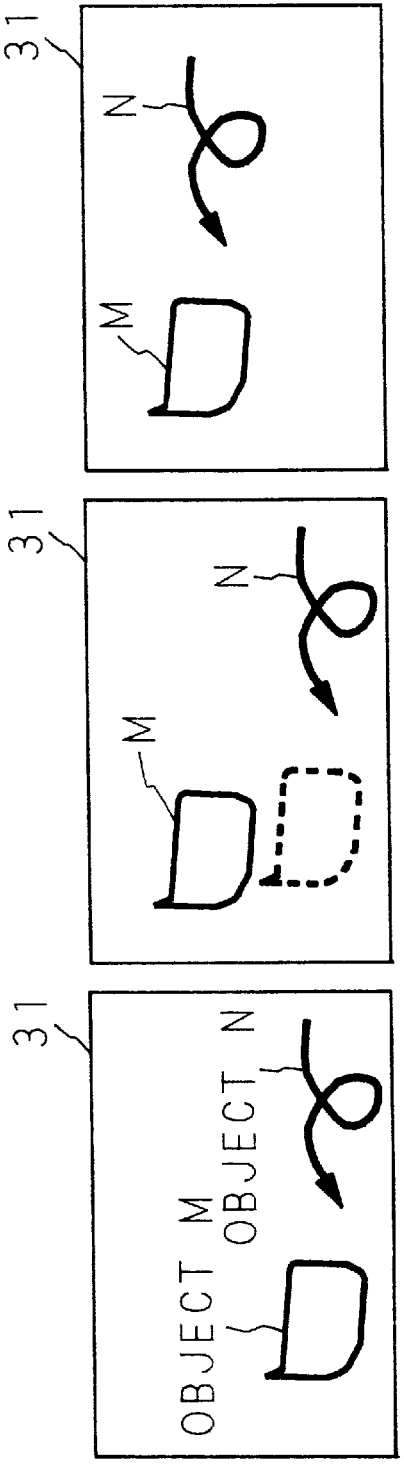
Figure 17D:
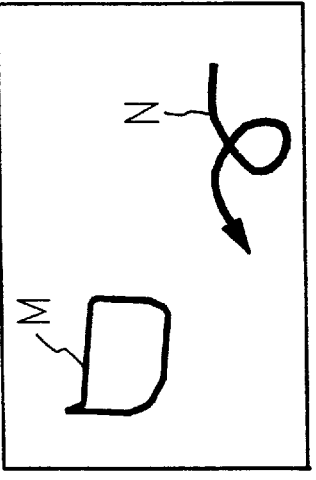
Figure 17E:
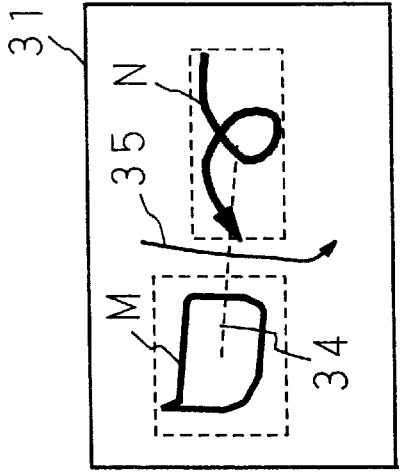
Figure 17F:
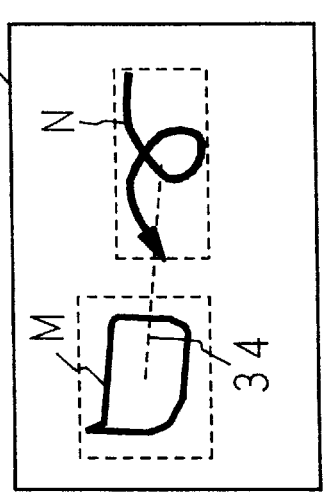

FIGS. 17A through 17F are explanatory diagrams showing examples of displaying and operating of objects in a canceling process of an association of objects for the embodiment 7. In FIG. 17A, object M and object N are associated with each other. First, as shown in FIG. 17B, the user moves the object M from the present position into an upper-left direction. The system judges the moving operation of the object M and moves the object N, with the same moving vector N as that of the moving operation of the object M, based on the association between the object M and the object N as shown in FIG. 17C. As shown in FIG. 17D, the association between the object M and the object N is shown with a link line 34 for connecting the centers of respective frames surrounding each object. When the user conducts a crossing operation of the link line 34 with a tracking 35 of the pen pointer or the mouse pointer or the like within a predetermined period of time as shown in FIG. 17E, after the moving process has been effected, the system removes the association and removes the frame and the link line 34. Further, the system restores the object N to the position before the moving process of the object N.

When the object M has been moved to obtain the processing results where only the object M has been moved, while the object M and the object N are associated actually, and the undesired moving process of the object N is caused by the moving operation of the object M, the user can obtain the desired processing results where the position of the object N is restored to the original position simply by crossing the link line 34 with the tracking 35 of the pen pointer or the mouse pointer or the like within the predetermined period of time from the completion of the moving process.

Figure 18:
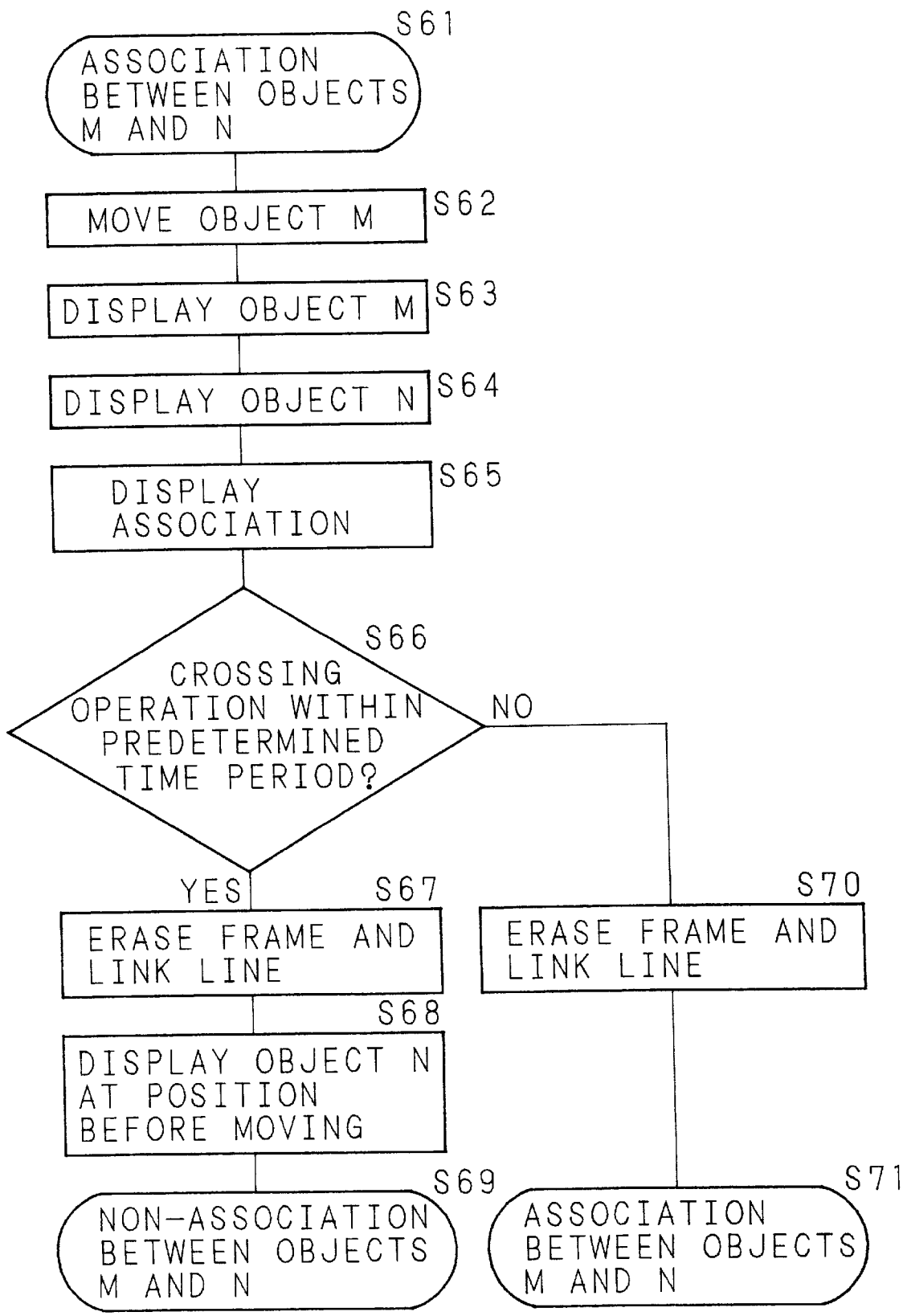
FIG. 18 is a flow chart showing a procedure for the association canceling process (embodiment 7)

FIG. 18 is a flow chart showing the processing procedure for the embodiment 7. When the user moves the object M (S62) in a condition (S61) where two objects M and N are associated with each other, the system moves and displays (S63) the object M and also, the object N is moved with the same moving vector as in the object M (S64), so as to display (S65) with the rectangular frame and the link line 34 that the objects M and N are associated with each other. Then it is judged whether or not the user has conducted the crossing operation within the predetermined period of time (S66). When the crossing operation has been conducted (at S66, YES), the system displays the object N in the position before the object N has been moved (S68) after the rectangular frame and the link line 34 have been removed (S67), so as to make the two objects M and N none-associated (S69). When the crossing operation has not been conducted (at S66, NO), the system removes the rectangular frame and the link line 34 (S70), and the two objects M and N become associated (S71).

Embodiment 8

Canceling an Association of Objects (eighth invention)

In the aforementioned embodiments 5 through 7, instead of the link line 34 showing the association between the objects, the areas are respectively colored and a desired object is selected, instead of the crossing operation of the link line 34.

Embodiment 9

Canceling an Association of Objects (ninth invention)

In the aforementioned embodiments 5 through 7, frames for surrounding the respective areas, instead of the link line 34 showing the association between the objects are displayed, and the selecting operation of the desired object is used instead of crossing the link line 34.

Embodiment 10

Renewing an Association of Objects (tenth invention)

Figure 19A:
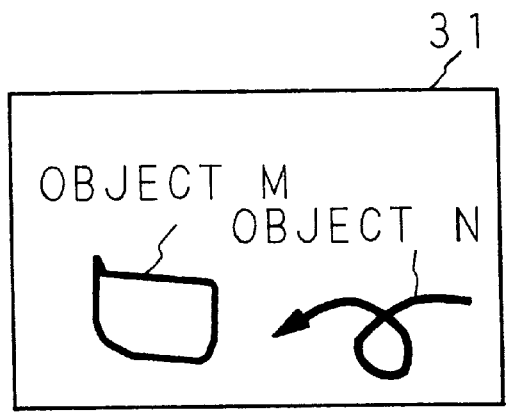
FIGS. 19A through 19D are explanatory diagrams showing examples of displaying and operating of objects in an association renewing process (embodiment 10) of the objects.
Figure 19B:
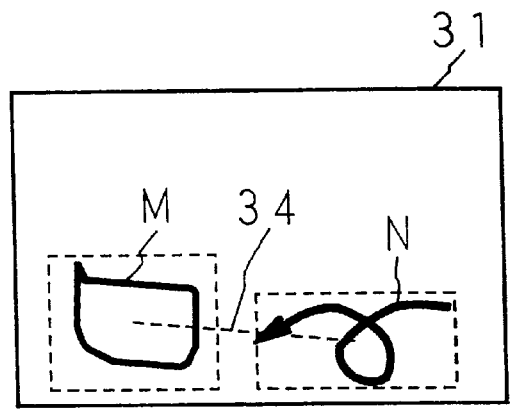
Figure 19C:
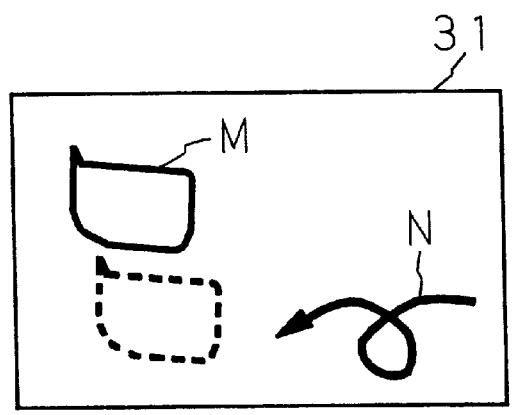
Figure 19D:
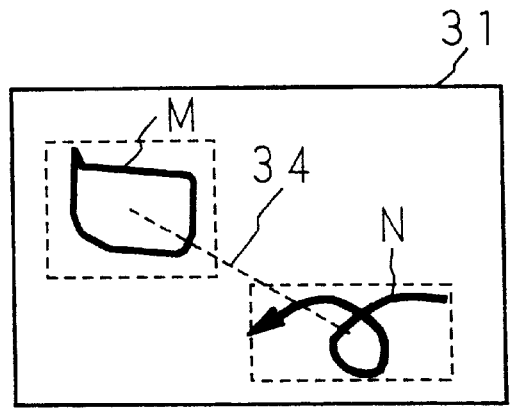

FIGS. 19A through 19D are explanatory diagrams showing examples of displaying and operating of objects in a renewing process of association between objects for the embodiment 10. In FIG. 19A, object M and object N are associated with each other. When the user selects the object M, the displaying process is conducted as in FIG. 19B. Namely, rectangular frames for respectively surrounding the object M and the object N are displayed. To show the association between the object M and the object N, a link line 34 for connecting the centers of the frames is displayed. When the user moves the object M in an upper-left direction from the present position, as shown in FIG. 19C, within a predetermined period of time after the selecting operation, the association between the object M and the object N is renewed as shown in FIG. 19D, and the frames and the link line 34 are displayed.

Figure 20:
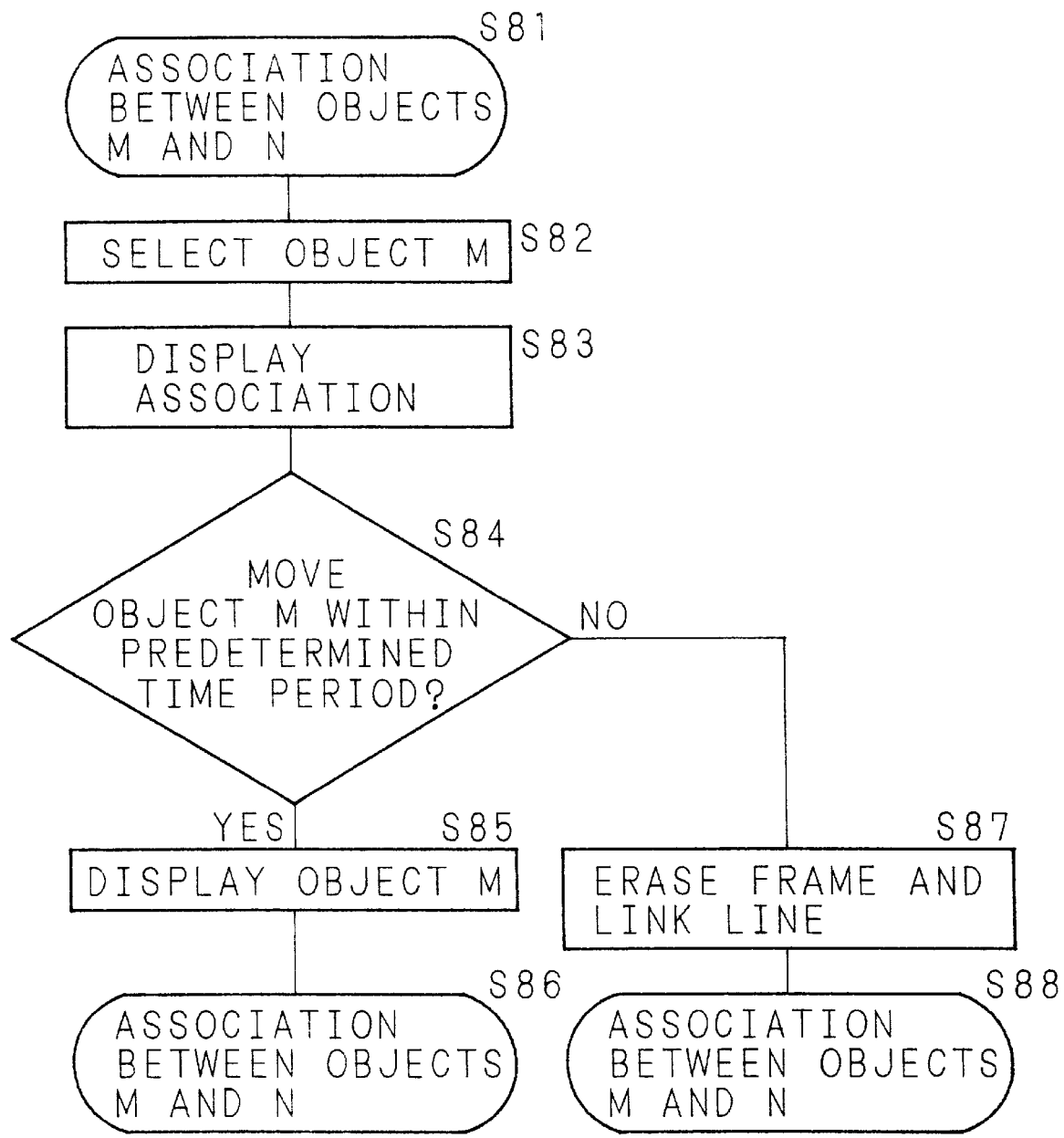
FIG. 20 is a flow chart showing a procedure for the association renewing process (embodiment 10)

FIG. 20 is a flow chart showing a processing procedure for the embodiment 10. When the user selects the object Mi (S82) in a condition (S81) where the two objects Mi and N are associated with each other, the system displays (S83) with the rectangular frame and the link line 34 that the association exists between the objects M and N. Then it is judged whether or not the user has moved the object M within the predetermined period of time (S84). When the moving operation has been conducted (at S84, YES), the system moves and displays (S85) the object M, and the two objects M and N are associated (86). When the moving operation has not been conducted (S84, NO), the system removes the rectangular frame and the link line 34 (S87), and the two objects M and N become associated with each other (S88).

Embodiment 11

Renewing an Association of Objects (eleventh invention)

Figure 21A:
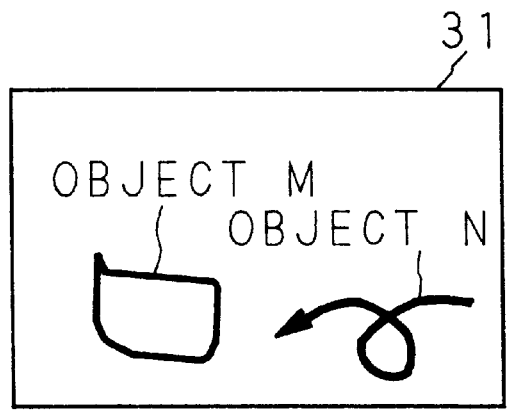
FIG. 21A through 21D are explanatory diagrams showing examples of displaying and operating of objects in an association renewing process (embodiment 11) of the objects.
Figure 21B:
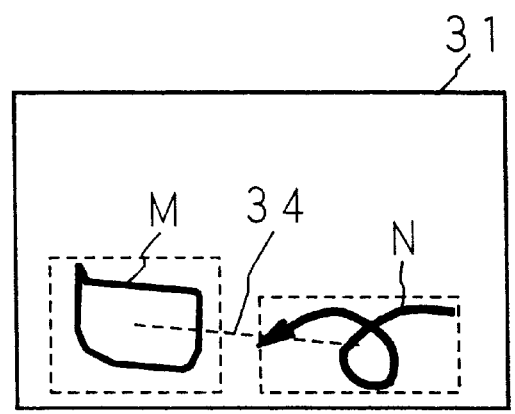
Figure 21C:
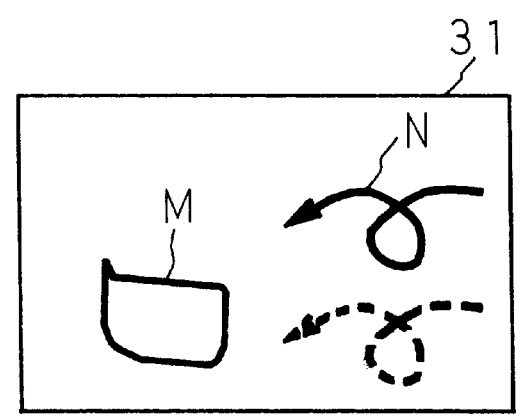
Figure 21D:
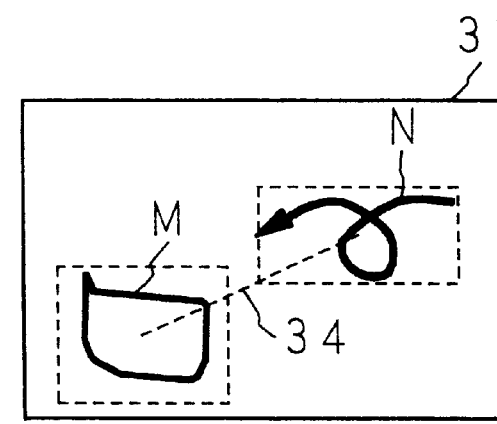

FIGS. 21A through 21D are explanatory diagrams showing examples of displaying and operating of objects in a renewing process of an association between objects for the embodiment 11. In FIG. 21A, object M and object N are associated with each other. When the user selects the object M, the displaying process is conducted as in FIG. 21B. Namely, rectangular frames for respectively surrounding the object M and the object N are shown. Also, to show the association of the object M and the object N, a link line 34 for connecting the centers of the frames is displayed. When the user moves the object N from the present position in an upward direction as show in FIG. 21C, within a predetermined period of time after the selecting operation, the association between the object N and the object M is renewed as shown in FIG. 21D, the frame and the link line 34 are displayed.

Figure 22:
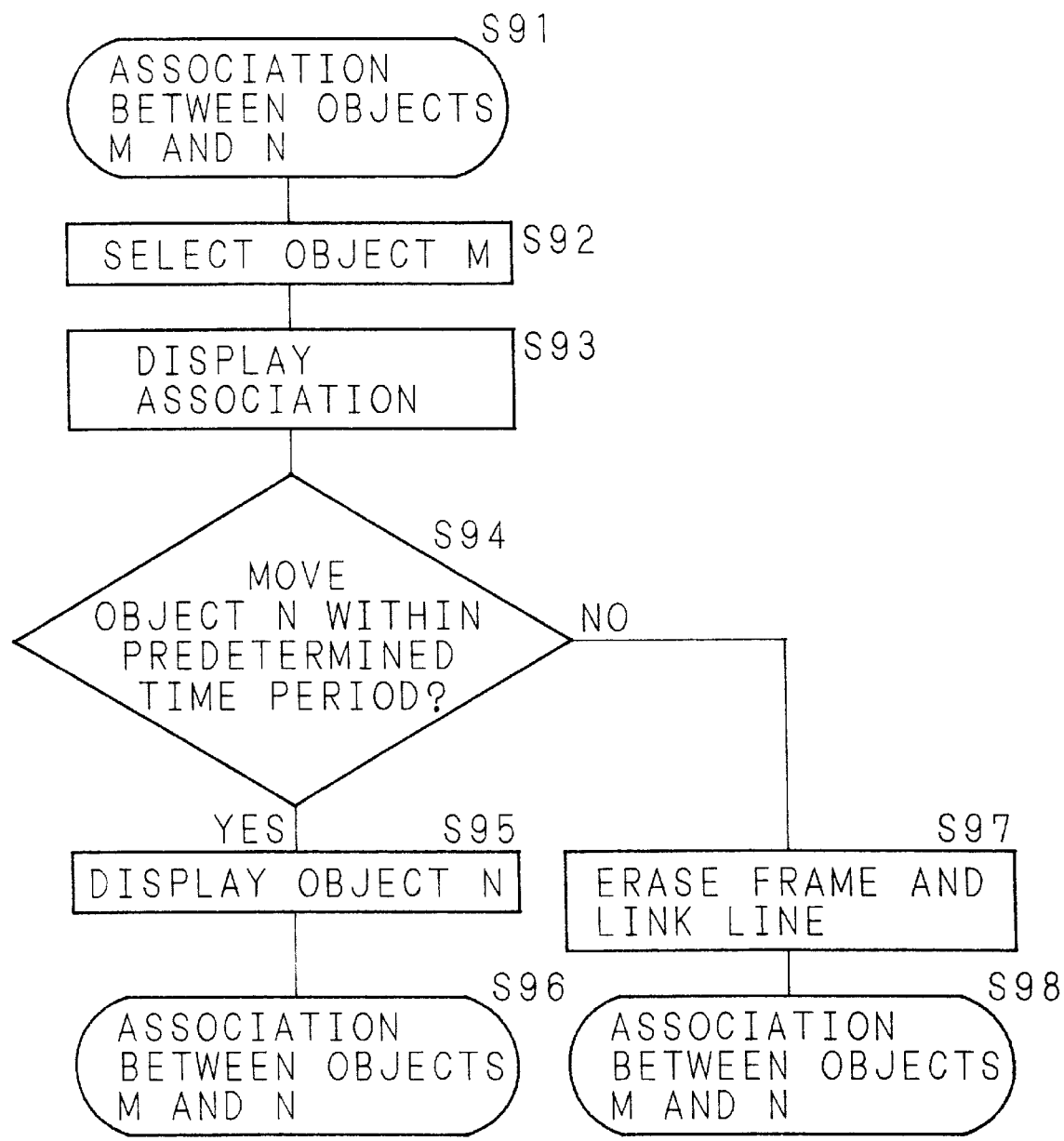
FIG. 22 is a flow chart showing a procedure for the association renewing process (embodiment 11)

FIG. 22 is a flow chart showing the processing procedures for the embodiment 11. When the user selects the object M (S92) in a condition where the two objects M and N are associated with each other (S91), the system displays (S93) with the rectangular frames and the link line 34 the association between the objects M and N. Then it is judged whether or not the user has moved the object N within the predetermined period of time (S94). When the moving operation has been conducted (at S94, YES), the system moves and displays the object N (S95), and the two objects M and N become associated (S96). When the moving operation has not been conducted (at S94, NO), the system removes the rectangular frame and the link line 34 (S97), and the two objects M and N become associated (S98).

Embodiment 12

Renewing an Association of Objects (twelfth invention)

Figure 23A:
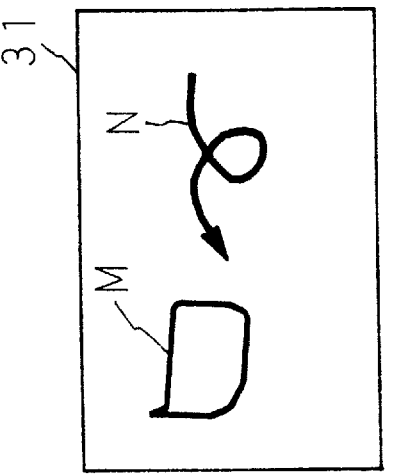
FIGS. 23A through 23F are explanatory diagrams showing examples of displaying and operating of objects in an association renewing process (embodiment 12) of the objects.
Figure 23B:
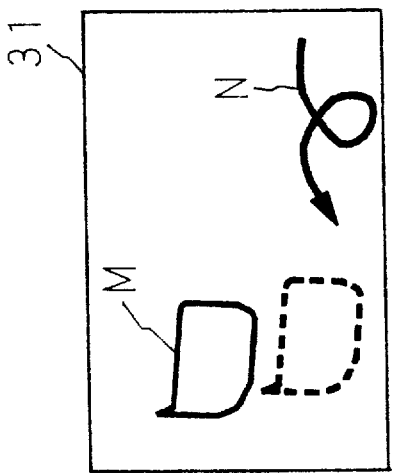
Figure 23C:
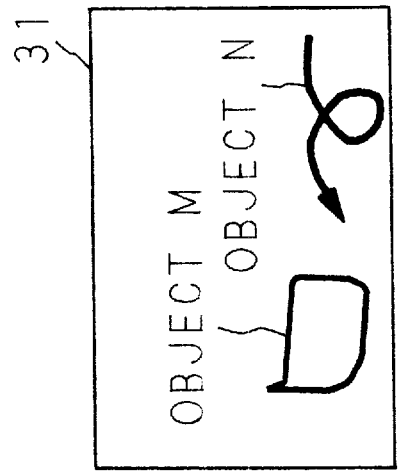
Figure 23D:
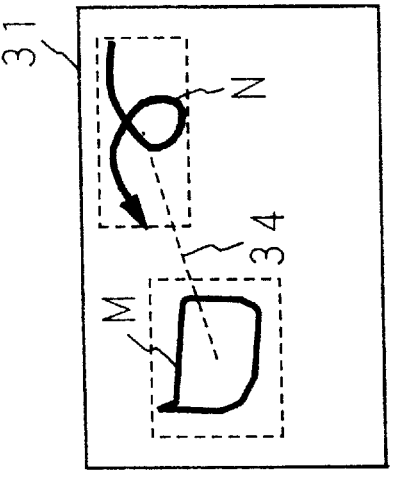
Figure 23E:
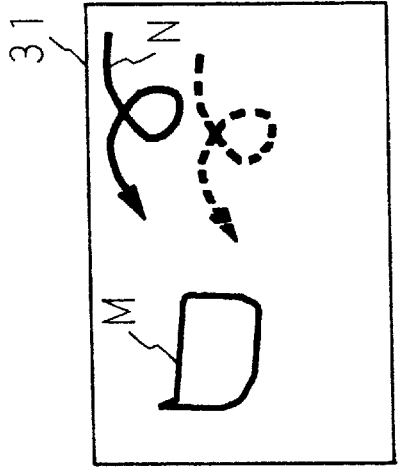
Figure 23F:
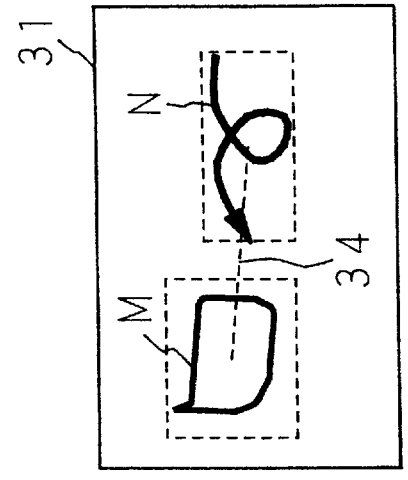

FIGS. 23A through 23F are explanatory diagrams showing examples of displaying and operating of objects in a renewing process of an association between objects for the embodiment 12. In FIG. 23A, object M and object N are associated with each other. First, the user moves the object M from the preset position into an upper-left direction as shown in FIG. 23B. The system judges the moving operation of the object M and moves the object N, with the moving vector as that of the moving operation of the object M, based on the association between the object M and the object N as shown in FIG. 23C. As shown in FIG. 23D, the association between the object M and the object N is indicated by a frame for surrounding each object and a link line 34 for connecting the centers of the respective frames. When the user conducts a moving operation of the object N from the present position into an upward direction within a predetermined time period, as shown in FIG. 23E, after the moving process thereof, the association between the object N and the object M is renewed and the frames and the link line 34 are displayed as shown in FIG. 23F.

Figure 24:
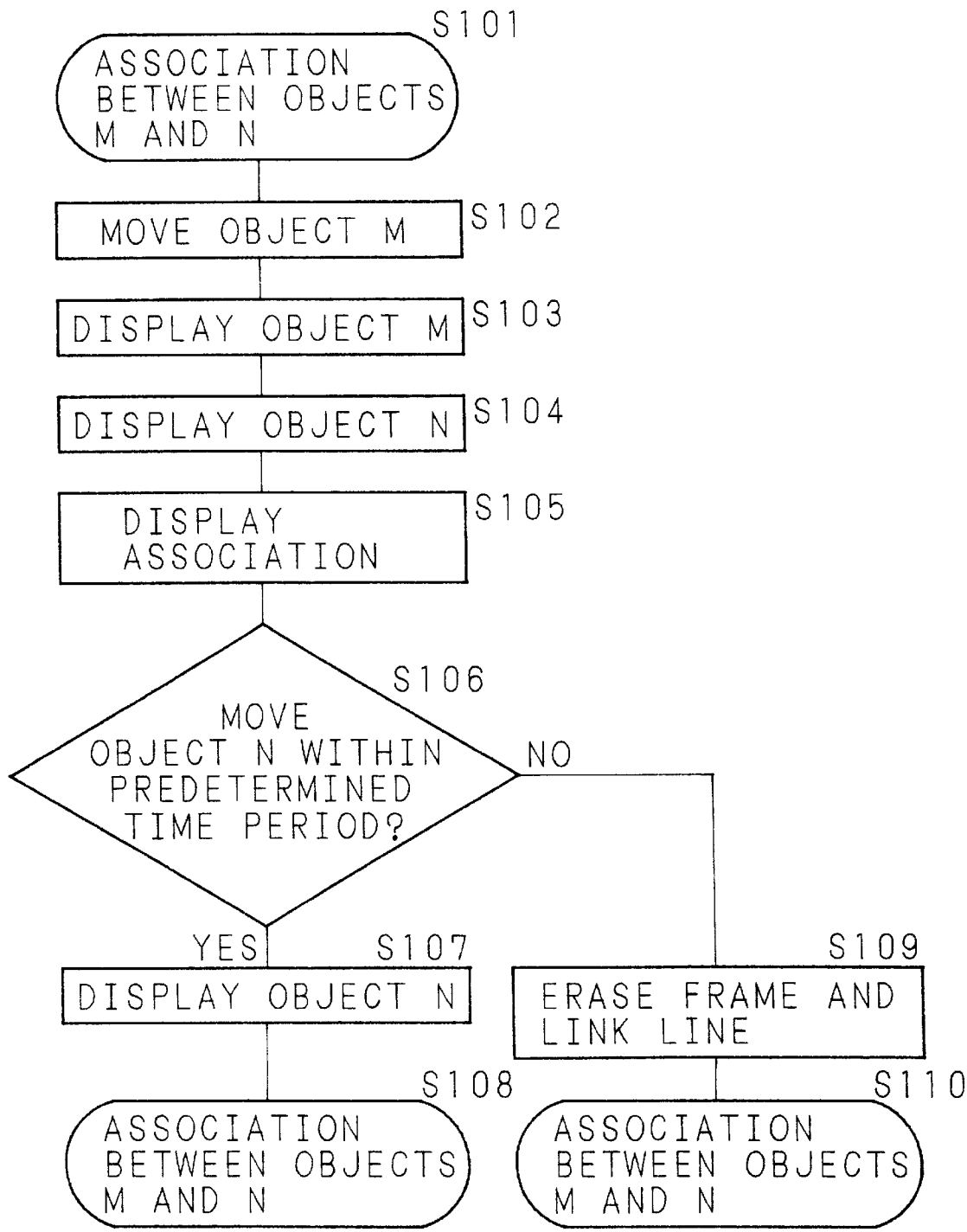
FIG. 24 is a flow chart showing a procedure for the association renewing process (embodiment 12)

FIG. 24 is a flow chart showing the processing procedure for the embodiment 12. When the user selects the object M (S102) in a condition where the two objects M and N are associated with each other (S101), the system moves and displays the object M (S103), and also the object N is moved and displayed (S104) with the moving vector similar to that of the object M, and displays (S105) with the rectangular frames and the link line 34 the association between the objects M and N. Then it is judged whether or not the user has moved the object N within the predetermined period of time (S106). When the moving operation has been conducted (at S106, YES), the system moves and displays the object N (S107), and the two objects M and N become associated (S108). When the moving operation has not been conducted (at S106, NO), the system removes the rectangular frames and the link line 34 (S109), and the two objects M and N become associated (S110).

Then, an example where the aforementioned embodiments of the association of objects are collected will be described hereinafter.

FIG. 25 is a table showing one example of the executive 12 for managing the association among objects. Referring now to the table, an object ID is an identifier for specifying each object on the display area. The management information has items X0, X1, Y0, Y1 showing the XY coordinates of each of the upper-left corner and the lower-right corner of a rectangular area for surrounding the object and the items of the associated objects which shows the association among the objects. The item of the associated objects shows the object name of all the objects associated with the object. The contents of the item of the associated object are renewed each time the association among the objects changes.

Figure 26:
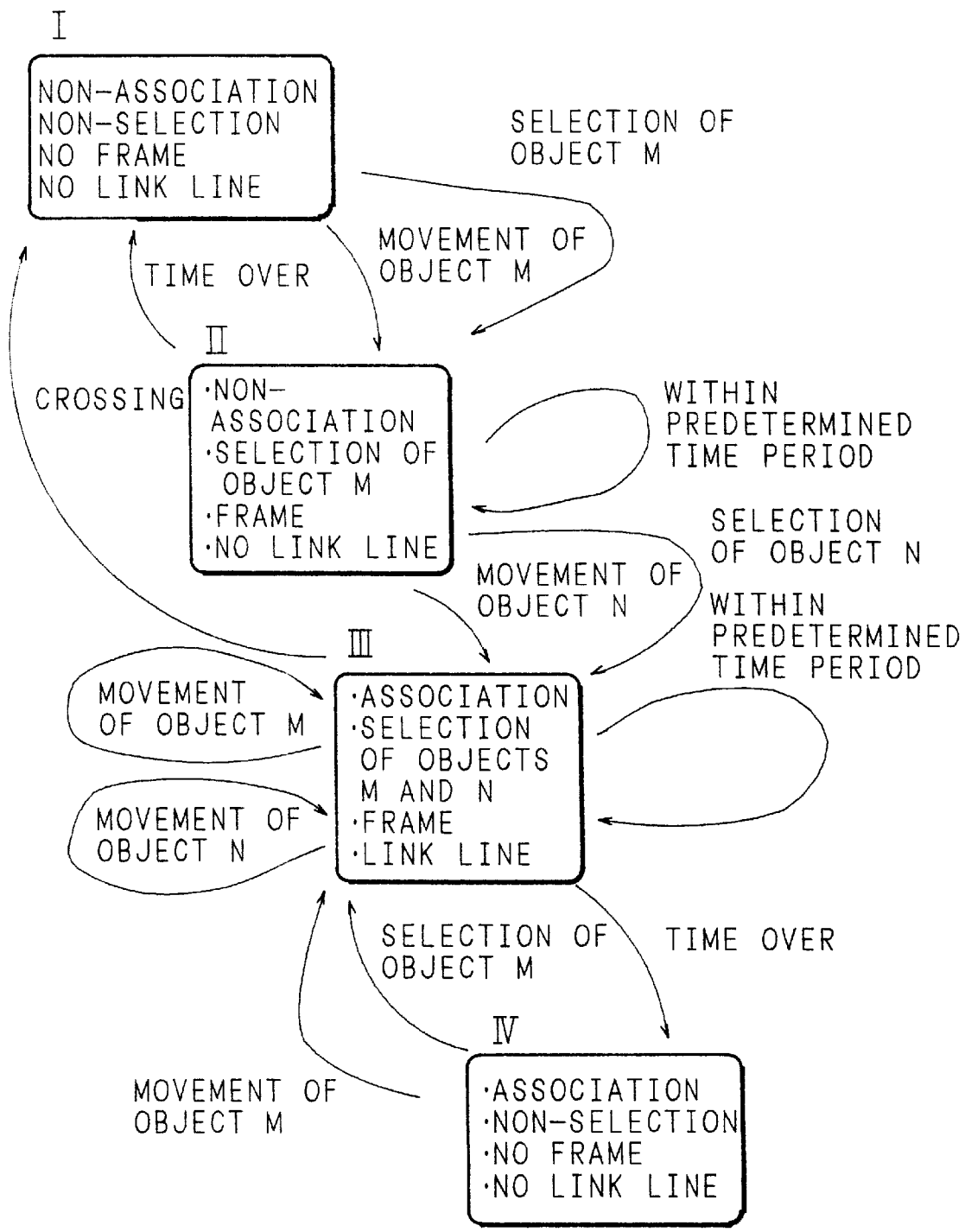
FIG. 26 is a diagram showing changes in the form of association among objects and display.

FIG. 26 is a transmission diagram showing the existence of the association between objects in a software of the object editing system of the invention and the displaying condition thereof. A description will be given in accordance with the aforementioned associating process of the objects, and the canceling and renewing process thereof.

In a condition I in FIG. 26, the object M and the object N are not associated with each other, and further, any object is not selected. Also, at this time, the object M and the object N are displayed in the display area 31. In the condition I, the user moves or selects the object M to shift to the condition II. Namely, in the condition II, the object M and the object N are not associated with each other, and further, the object M is selected. Also, at this time, the display area 31 displays the object M and the object N as in the condition I.

In the condition II, the user moves the condition to the condition III by the moving operation or the selecting operation of the object N. Namely, in the condition III, the object M and the object N are associated with each other, and the object M and the object N are selected. At this time, the display area 31 displays the frames for respectively surrounding the object M and the object N and the link line 34 for connecting the frames surrounding the centers of the frames. In the condition III, the condition moves to the condition IV after a lapse of a predetermined period of time in which no operation is conducted by the user. Namely, in the condition IV, the object M and the object N are associated with each other, and any object is not selected. At this time, the display area 31 displays the object M and the object N as in the condition I.

As shown in FIGS. 5A through 5D, when the condition moves to the condition II from the condition 1 by the moving operation of the object M, and the condition moves to the condition III by the selecting operation of the object N within the predetermined period of time, and the object M and the object N are associated (embodiment 1), if the predetermined period of time lapses without any operation by the user, the condition moves to the condition I without an associating operation being carried out. As shown in FIGS. 7A through 7C, when the condition moves to the condition II from the condition I by the moving operation of the object M, then the condition moves to the condition III by the moving operation of the object N within the predetermined period of time to associate and the object M and the object N (embodiment 2), if the predetermined time lapses without any operation by the user in the condition II, the condition moves to the condition I without effecting the associating operation. As shown in FIGS. 9A through 9C, when the condition moves to the condition II from the condition I by the selecting operation of the object M, and then, the condition moves to the condition III by the selecting operation of the object N within the predetermined period of time to associate the object M and the object N (embodiment 3), if the predetermined time lapses without any operation by the user in the condition II, the condition moves to the condition I, and an associating process is not conducted. As shown in FIGS. 11A through 11C, when the condition moves to the condition II from the condition I by the selection of the object M, and then the condition moves to the condition III by the moving operation of the object N within the predetermined period of time to associate the object M and the object N (embodiment 4), the condition moves to the condition I as the predetermined time passes without any operation by the user, and an associating process is not effected.

As shown in FIGS. 13A through 13C, when the condition moves to the condition III from the condition II, and the condition moves to the condition I by the crossing operation of the link line 34 showing the association thereof within the predetermined time period after the object M and the object N are associated, to cancel the association (embodiment 5), if the predetermined time passes without any operation by the user in the condition III, the condition moves to the condition IV, and the association is not canceled. As shown in FIGS. 15A through 15D, when the condition moves to the condition III from the condition IV by the selecting operation of the object M, and the condition moves to the condition I by the crossing operation of the link line 34 within the predetermined time, to cancel the association (embodiment 6), if the predetermined time passes without any operation by the user in the condition III, the condition moves to the condition IV and the association is not canceled. As shown in FIGS. 17A through 17F, when the condition moves from the condition IV to the condition III by the moving operation of the object M, and then the condition moves to the condition I by the crossing operation of the link line 34 without the predetermined period of time to cancel the association (embodiment 7), if the predetermined period of time passes without the operation by the user in the condition III, the condition moves to the condition IV, and the association is not cancelled.

As shown in FIGS. 19A through 19D, when the condition is moved to the condition III by the selecting operation of the object M from the condition IV, and then, the association is renewed (embodiment 10) by the moving the object M within the predetermined time period, the condition moves to the condition IV as the predetermined time passes without the operation by the user in the condition III, and the association is not renewed. As shown in FIGS. 21A through 21D, when the condition moves to the condition III by the selecting operation of the object M from the condition IV, and then the association is renewed (embodiment 11) by the moving operation of the object N within the predetermined time period, the condition moves to the condition IV as the predetermined time period passes without any operation by the user in the condition III, and the association is not renewed. As shown in FIGS. 23A through 23F, when the condition moves to the condition III by the moving operation of the object M from the condition IV, and then, the association is renewed (embodiment 12) by the moving operation of the object N within the predetermined time period, the condition moves to the condition IV if the predetermined time period passes without any operation by the user in the condition III, the association is not renewed.

When the object area is colored (embodiment 8) instead of drawing the link line 34 showing the association between the objects or when the object area is surrounded (embodiment 9) with a frame, the desired object is selected, instead of crossing the link line 34.

Figure 27:
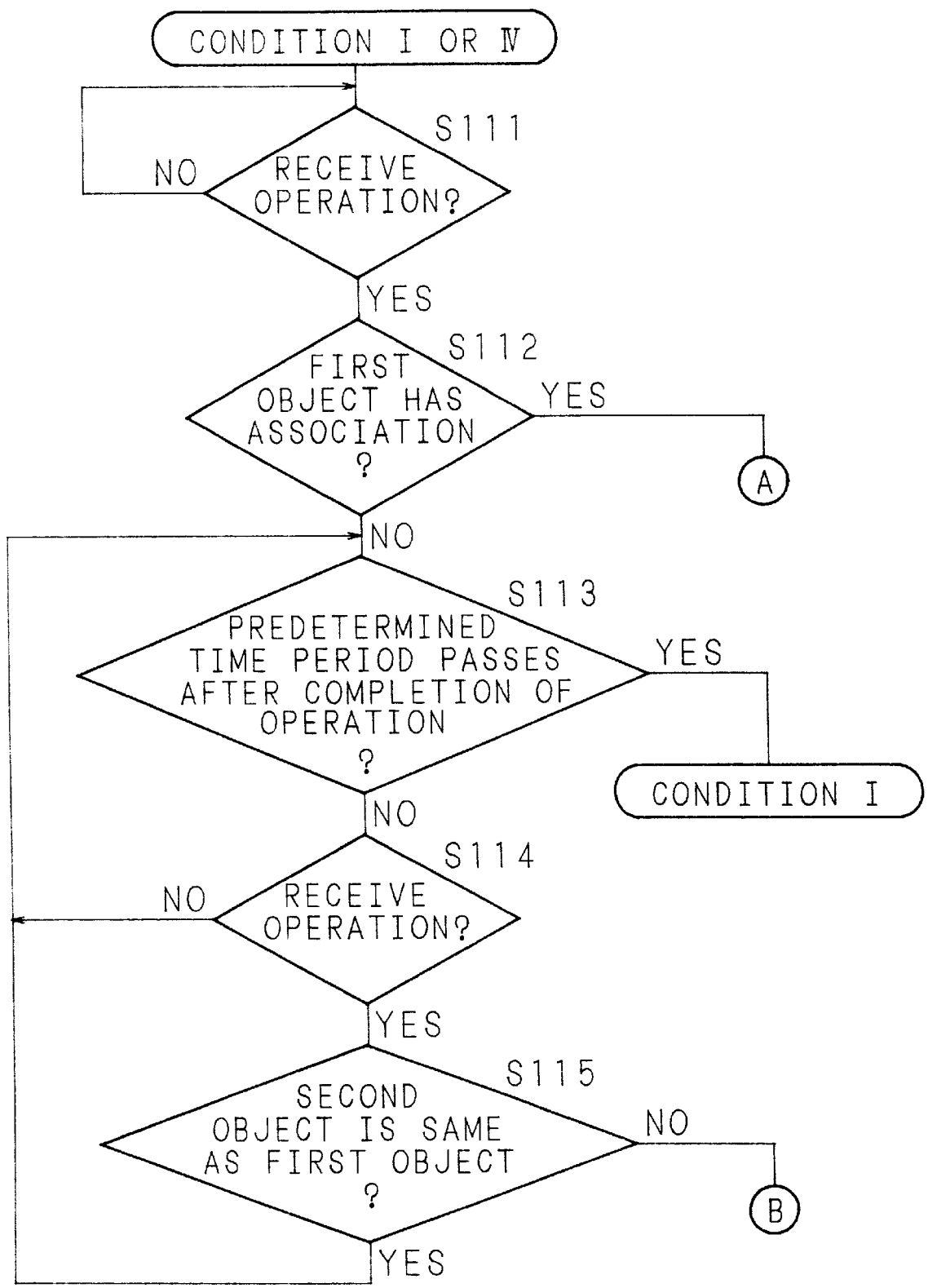
FIG. 27 is a flow chart showing a processing procedure for an association between objects.
Figure 28:
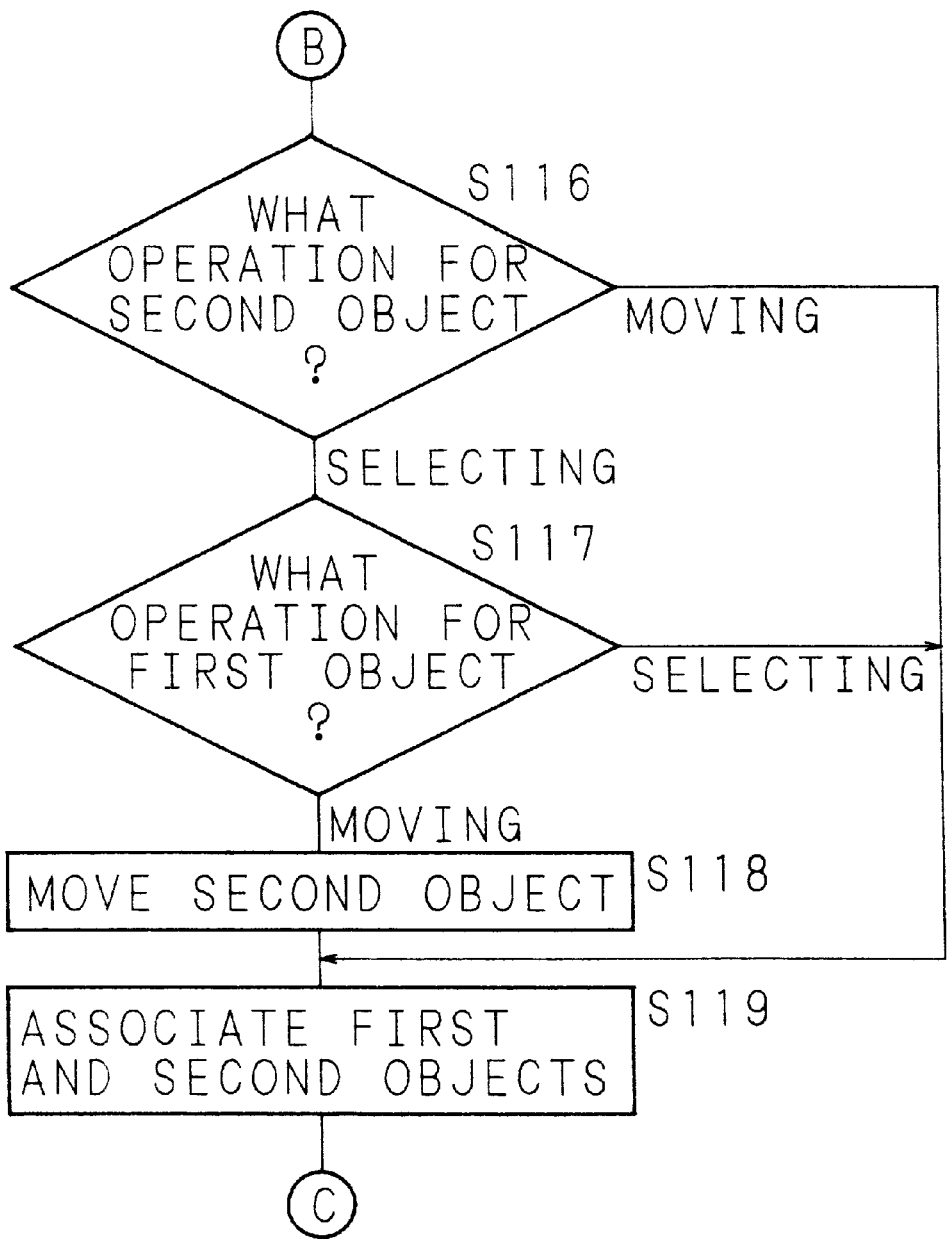
FIG. 28 is a flow chart showing a processing procedure for an association between objects.
Figure 29:
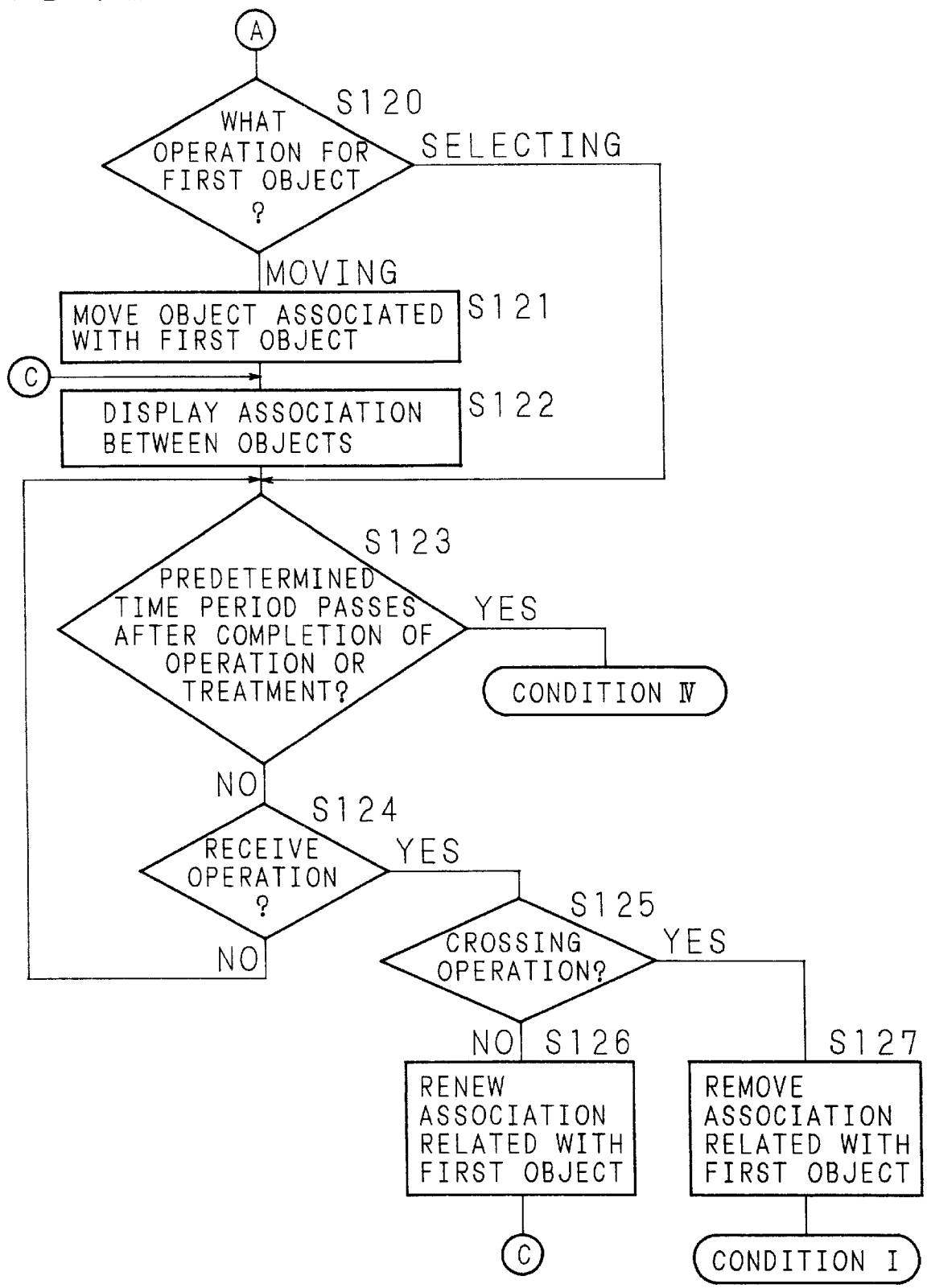
FIG. 29 is a flow chart showing a processing procedure for an association between objects.

FIGS. 27 through 29 show flow charts showing processing procedures for the association of objects in the object editing apparatus of the invention. The personal computer 21 effects the operation with respect to the objects, namely, receiving the selecting operation and the moving operation to conduct the associating process of the desired objects. In the selecting operation and the moving operation, concretely the area of the object is clicked and the object is dragged with the use of a mouse 25. Normally the management condition of the object is either a condition I where the association is not effected between the objects or a condition IV where the association is effected between the objects.

A change into the condition II or the condition III respectively from the condition I or the condition IV is caused by receiving the completion of the operation by the user (S111). By receiving the transition in the condition, it is judged (S112) whether or not a first object to be operated by the user has an association with the other object. Thus, it is identified whether the condition has been changed from the condition I or the condition IV. When it is judged that the association is not formed at S112, it is judged (S113, S114) whether or not the operation of the user has been conducted within the predetermined time period from the completion of the operation with respect to the first object which has caused the condition change. When the operation has been received, it is judged (S115) whether or not the second object to be operated is the same as the first object. S113, S114, S115 are equivalent to the condition II.

When the second object is the same as the first object (at S115, YES) in S115, the procedure goes back to S113 to repeat the aforementioned steps. When the second object is different from the first object (at S115, NO), it is judged (S116) whether the operation with respect to the second object is the selecting operation or the moving operation. When the operation is judged to be the selecting operation, it is judged (S117) whether the operation with respect to the first object is the selecting operation or the moving operation. When it is judged to be the moving operation in S117, the first object and the second object are associated with each other (S119) after the second object has been moved (S118) with the moving vector the same as that of the moving operation of the first object. In the other cases in S116, S117, only the association of the first object and the second object is conducted in S119. In S113, the condition is changed into a condition I when the predetermined time period has passed since the completion of the operation with respect to the first object.

When at S112, it is judged that the first object has been associated with the other object (at S112, YES), it is judged that the operation with respect to the first object is the selecting operation or the moving operation (S120). When the operation is judged to be the moving operation, the segment for connecting these objects is displayed, after the moving process has been conducted with the moving vector the same as that of the moving operation (S121), so as to show the association thereof (S122). When the object having relation with the first object exists in plural, segments for connecting the first object with the respective other objects are displayed. When the operation is judged to be the selecting operation at S120, only the displaying of the association between the objects in S122 is conducted. Also, at S122 similarly after the associating process of the first object and the second object has been conducted at S119, the association is displayed and the following steps are carried out.

At S122, it is judged (S123, S124) whether or not an operation is conducted by the user within the predetermined time period from the completion of the operation or the process which has been caused to display the association between the objects. When the operation has been received, it is judged (S125) whether or not the operation is the crossing operation for crossing the segment for connecting the objects by a track of the pointer. S123 and S124 are equivalent to the condition III. When it is judged that the operation is not the crossing operation at the S125, the association related to the first object is renewed (S126), and the procedure goes back to S122 and the aforementioned steps are repeated. When the operation is judged to be the crossing operation, the association shown by the segment to be crossed is canceled (S127), so as to change the condition to the condition I. When the predetermined time period has passed at the S123, the condition is changed into the condition IV.

Instead of the segment for connecting the objects to show the association between the objects at the S122, the area of the object related to the association can be colored or can be surrounded with a frame. Then a desired object may be selected, instead of conducting the crossing operation in the S125.

The embodiment of the editing process such as connecting, separating, erasing or the like of the objects will be described.

FIG. 30 shows one example of the registration contents of the object executive table 12. The registration contents of the executive table 12 comprises an object ID for specifying each object, a display position data for showing coordinates of the initial display position of each object, an attribute data showing the classification as the drawing pattern, character string or the like, a contents data showing the information contents of each object, a condition data showing the distinction between the selection, the non-selection or the like, and a time stamp showing the making time of each object. "Selection" in the condition data shows that the object is selected by the user' operation to be edited. When the editing process such as connecting, separating, erasing or the like with respect to the object is conducted, the registration contents of the object executive table 12 are rewritten each time the respective editing process is completed.

Embodiment 13

Connecting Objects (thirteenth invention)

In the embodiment 13, it is assumed that, when two objects are to be connected, the user drags and drops one of the objects into the area of another object with the mouse 25. It is judged whether the object is to be connected (pre-connecting) before the other object or it is to be connected (post-connecting) after the other object, in accordance with the position (drop point) where the object is dropped. For example, when the drop point is in the upper left position of the character string of the other object superposed, the pre-connecting is conducted. When the drop point is in the lower right position thereof, the post-connecting is conducted.

Figure 31A:
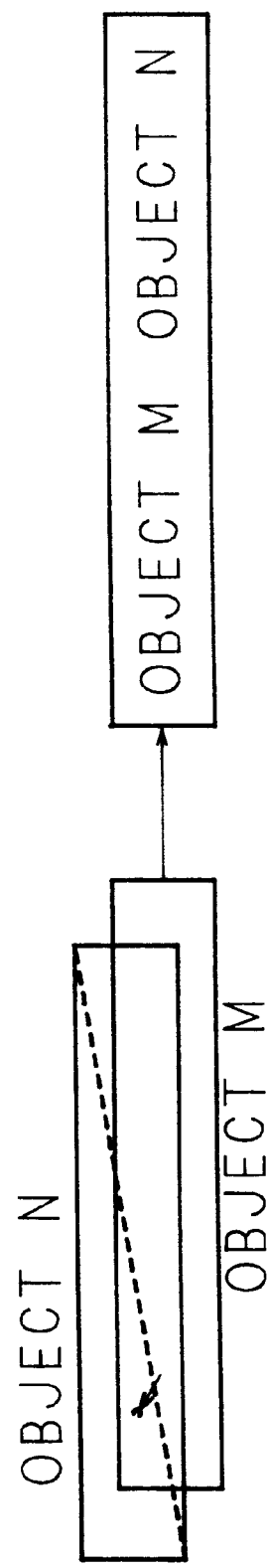
FIGS. 31A and 31B are explanatory diagrams showing examples of displaying and operating of objects in an object connecting process (embodiment 13)
Figure 31B:
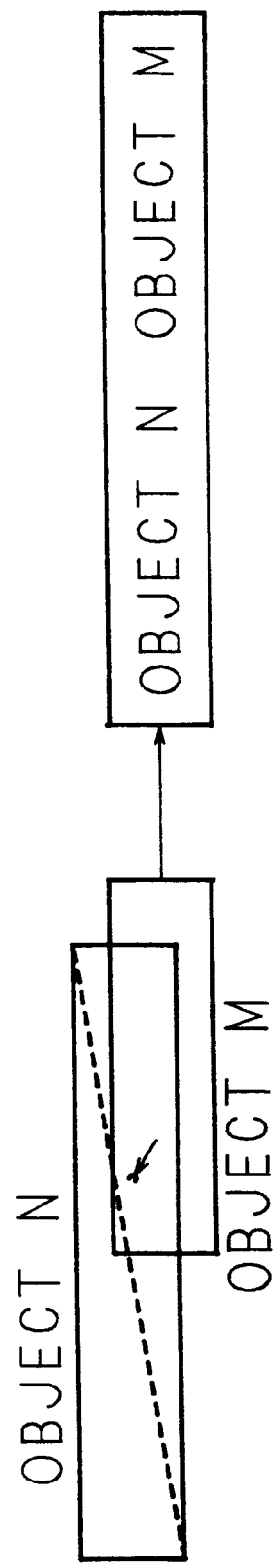

FIGS. 31A and 31B are explanatory diagrams showing examples of displaying and operating of objects in a connecting process of the objects for the embodiment 13. As shown in FIG. 31A, when the user drops the object M onto the upper left area of the object N, the system connects the object M before the object N and conducts the displaying operation. As shown in FIG. 31B, when the user drops the object M onto the lower right area of the object N, the system connects the object M after the object N and conducts the displaying operation. When the registration contents of the object executive table 12 before the changing are in the aforementioned FIG. 30, the registration contents of the object executive table 12 after the changing are shown in FIG. 32. A novel object P made by connecting the objects M and N is added and the condition data of the respective objects M and N is changed into "connected".

Figure 33:
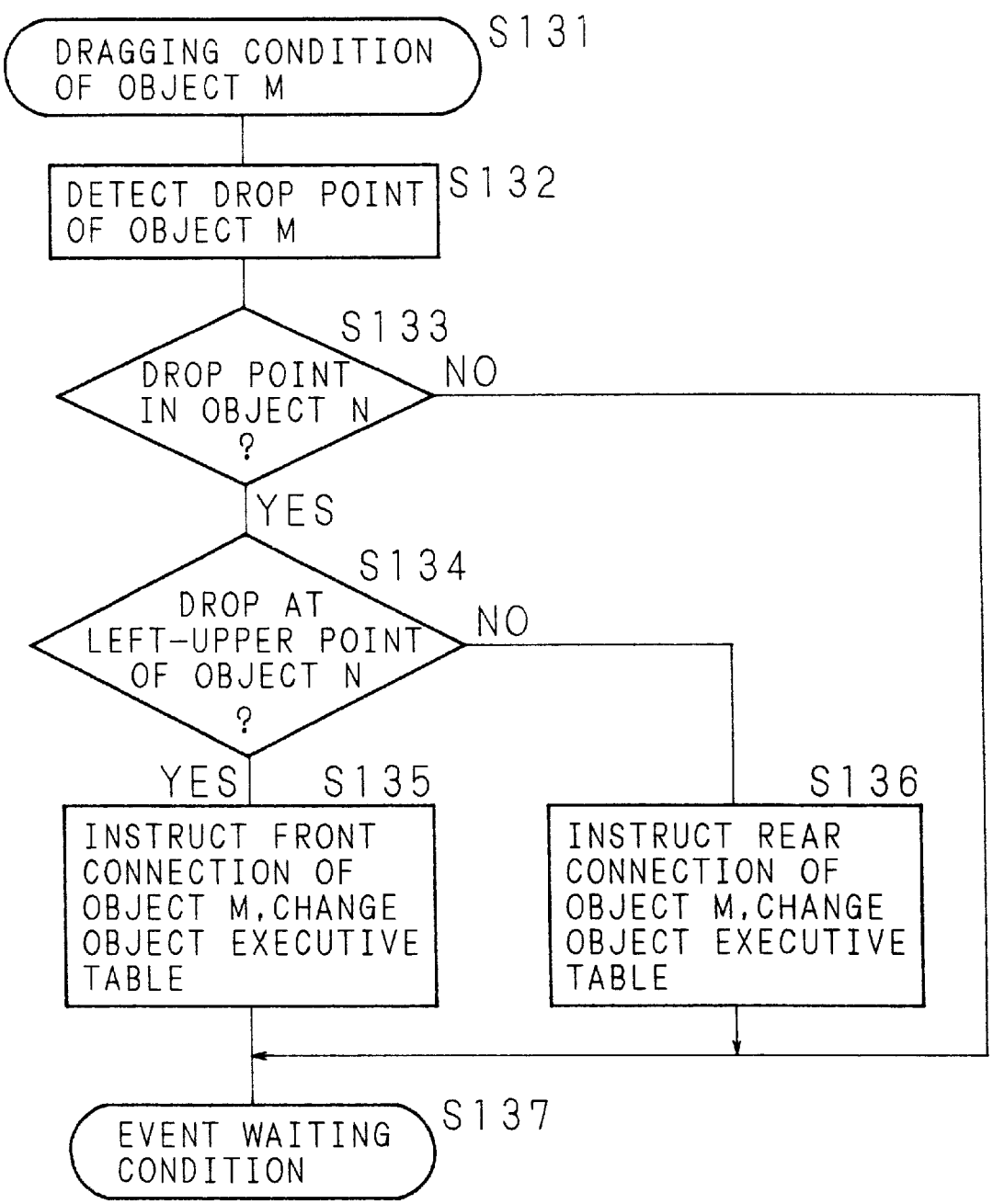
FIG. 33 is a flow chart showing a procedure for the connecting process (embodiment 13)

FIG. 33 is a flow chart showing processing procedure for the embodiment 13. Object M is dragged (S131) and the drop point (the position of the cursor when dropped) of the object M is notified from the interface unit 13 (S132). Referring to the object executive table 12, it is judged (S133) whether or not the drop point is in the area of any object N (S133). When the drop point is not in the area (at S133, NO), the condition becomes an event waiting condition (S137). When it is in the area (at S133, YES), it is judged whether or not the drop point is in the upper left area of the object N (S134). When the drop point is in the upper left area (at S134, YES), an instruction is issued to the object display unit 11 to display and connect the object N after the object M, and the condition becomes the event waiting condition (S137) after the registration contents of the object executive table 12 has been changed (S135). When the drop point is not in the upper left area of the object N (at S134, NO), an instruction is issued to the object display unit 11 to connect and display the object N before the object M, and the condition becomes the event waiting condition (S137), after the registration contents of the object executive table 12 has been changed (S136).

Regarding the definition of the pre-connection or the post-connection, it does not matter whether the connection is one (connection in the same line) in the horizontal direction, or the connection (connection as another line) in the vertical direction depending on the designing of the system.

In such a connecting operation, when one object points at the upper left portion of the other object, it is connected to the front (left or upper) position of the pointed object. Thus, the connecting operation can be conducted with the user's natural consciousness. Also, the order relation of the connection can be instructed with intuition.

Embodiment 14

Connecting Objects (thirteenth invention)

In the embodiment 14, when two objects are to be connected, the user drags and drops one object into the area of the other object with a mouse 25. It is judged whether one object is to be connected before the other object (pre-connecting), or after it (post-connecting), depending on how one object is superposed on the other object. For example, when one object is superposed on the upper, upper left or left portion of the other object, the pre-connecting is conducted. When one object is superposed on the lower, lower right or right portion of the other object, the post-connecting is connected. Although the side on which the connection is effected is not definite in the case of lower left and upper right positions, for example, in the case of lower left, the pre-connecting operation may be conducted, and in the case of upper right, the post-connecting operation may be conducted.

Figure 34A:
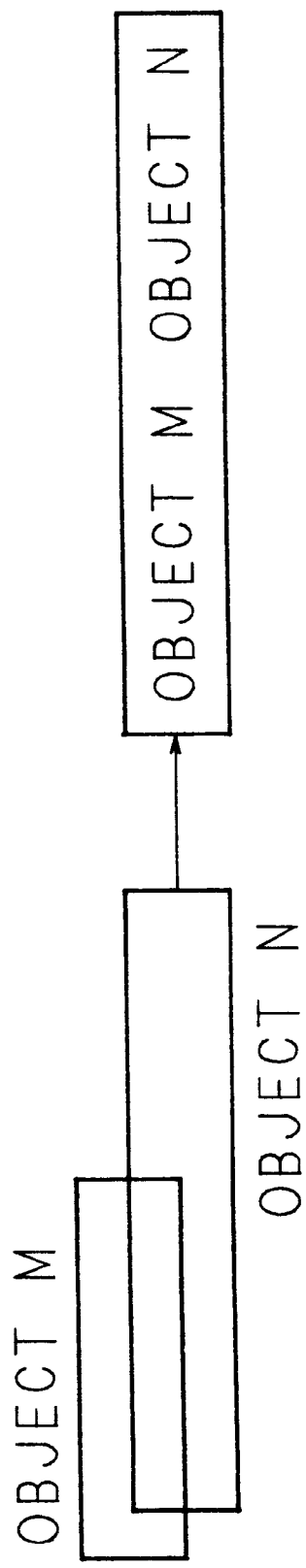
FIGS. 34A and 34B are explanatory diagrams showing examples of displaying and operating of objects in an object connecting process (embodiment 14)
Figure 34B:
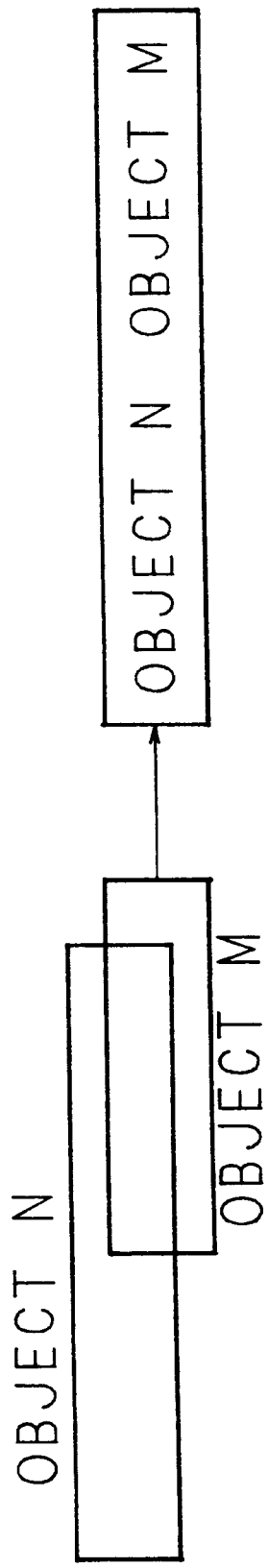

FIGS. 34A and 34B are explanatory diagrams showing examples of displaying and operating of objects in the connecting process of the objects for the embodiment 14. As shown in FIG. 34A, when the user places the object M on the upper left position of the object N, the system connects the object M before the object N and displays them. As shown in FIG. 34B, when the user places the object M on the lower right area of the object N, the system connects the object M after the object N does and displays them.

Figure 35:
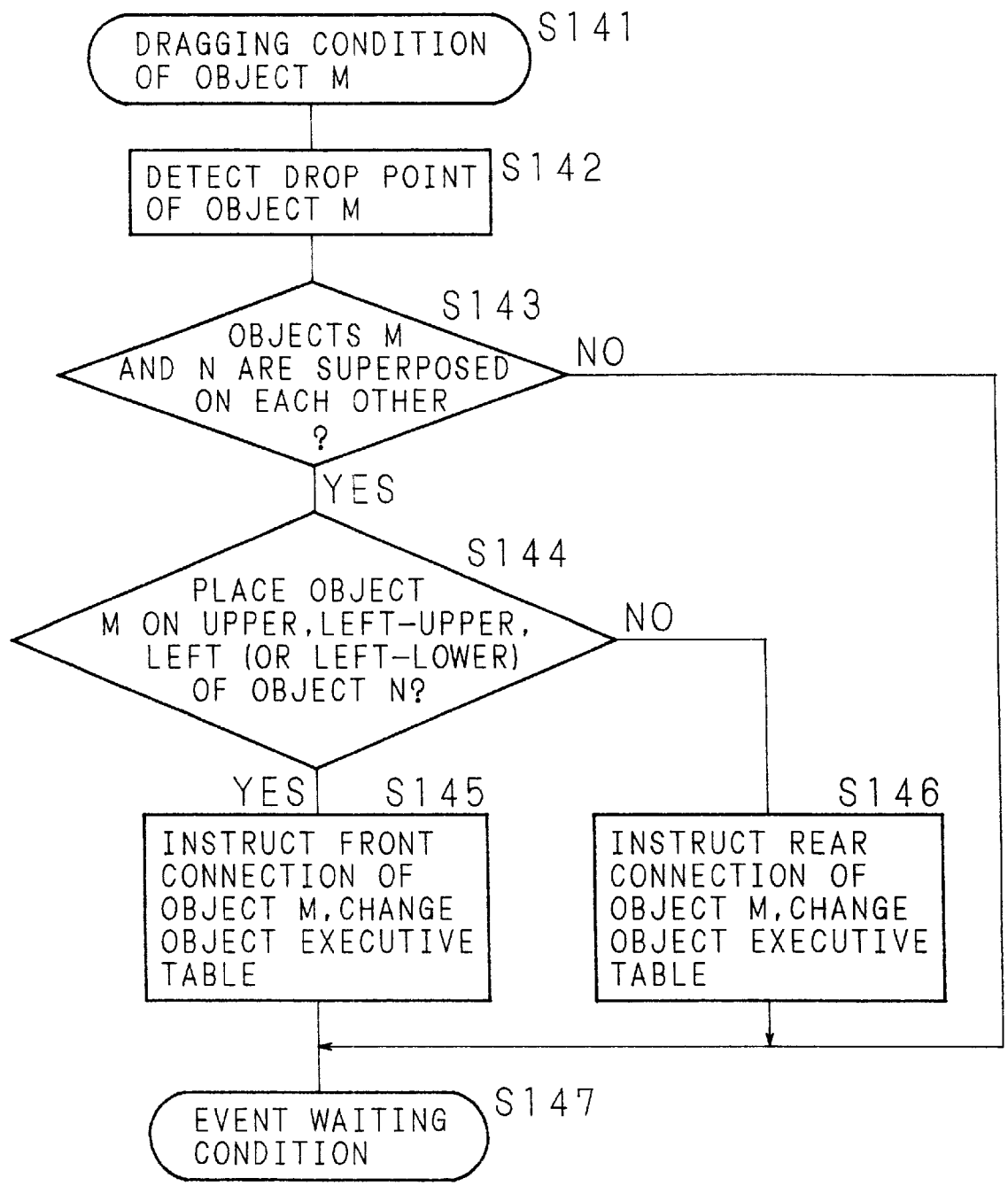
FIG. 35 is a flow chart showing a procedure for the connecting process (embodiment 14)

FIG. 35 is a flow chart showing a processing procedure for the embodiment 14. One object M is dragged (S141), and the drop point of the object M is notified from the interface unit 13 (S142). Referring to the object executive table 12, it is judged (S143) whether or not the two objects of the object M and another object N are superposed on each other. When they are not superposed (at S143, NO), the condition becomes the event waiting condition (S147). When they are superposed (at S143, YES), it is judged (S144) whether or not the object M is placed on the upper, upper left or left (or lower left) portion of the object N. For example, when the object M is placed on the upper left area (at S144, YES), an instruction is issued to the object display unit 11 that the object N is to be connected after the object M and displayed. Also often the registration contents of the object executive table 12 has been changed (S145), the condition becomes the event waiting condition (S147). On the other hand, when the object M is not placed (at S144, NO) on the upper, upper left or left (or lower left) portion of the object N, an instruction is issued to the object display unit 11 that the object N is to be connected before the object M and displayed. Also, after the registration contents of the object executive table 12 has been changed (S146), the condition becomes the event waiting condition (S147).

In such a connecting operation, when one object is superposed on the upper left portion of the other object, the superposing object is connected to the front (left or upper) position of the superposed object. Thus, the connecting operation can be effected with the natural consciousness of the user.

Embodiment 15

Connecting Objects (thirteenth invention)

Figure 36:
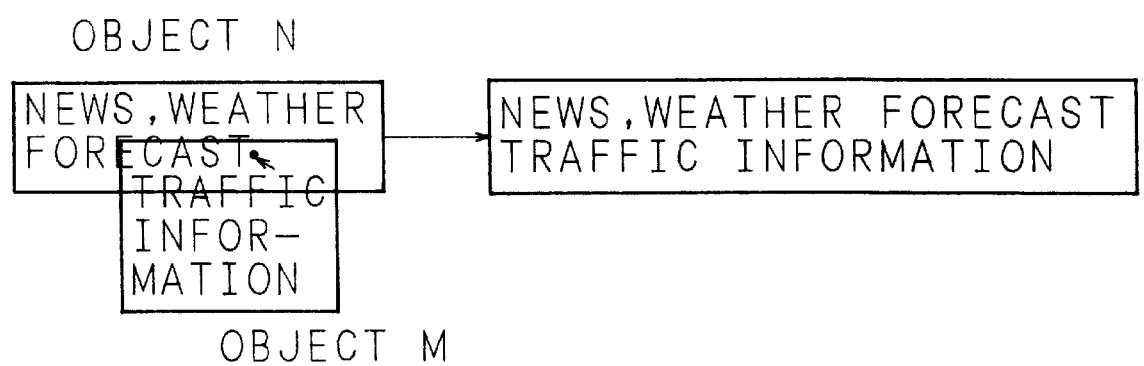
FIG. 36 is an explanatory diagram showing examples of displaying and operating of objects in an object connecting process (embodiment 15)

In the embodiment 15, when two character string objects are to be connected with each other, the user drags and drops one object on the area of the other object with a mouse 25, and inserts the character string of one object, into the place nearest to the drop point, in accordance with the drop point of one object within the area of the other object. Although the embodiment interferes with the embodiment 13, either method can be selected in accordance with the designing idea of the system. FIG. 36 is an explanatory diagram showing an example of displaying and operating of objects in a connecting process of the objects for the embodiment 15. As shown in FIG. 36, when the user drops the object M in a character string of the object N, the system inserts the object M between the characters of the object N and conducts the displaying process.

Figure 37:
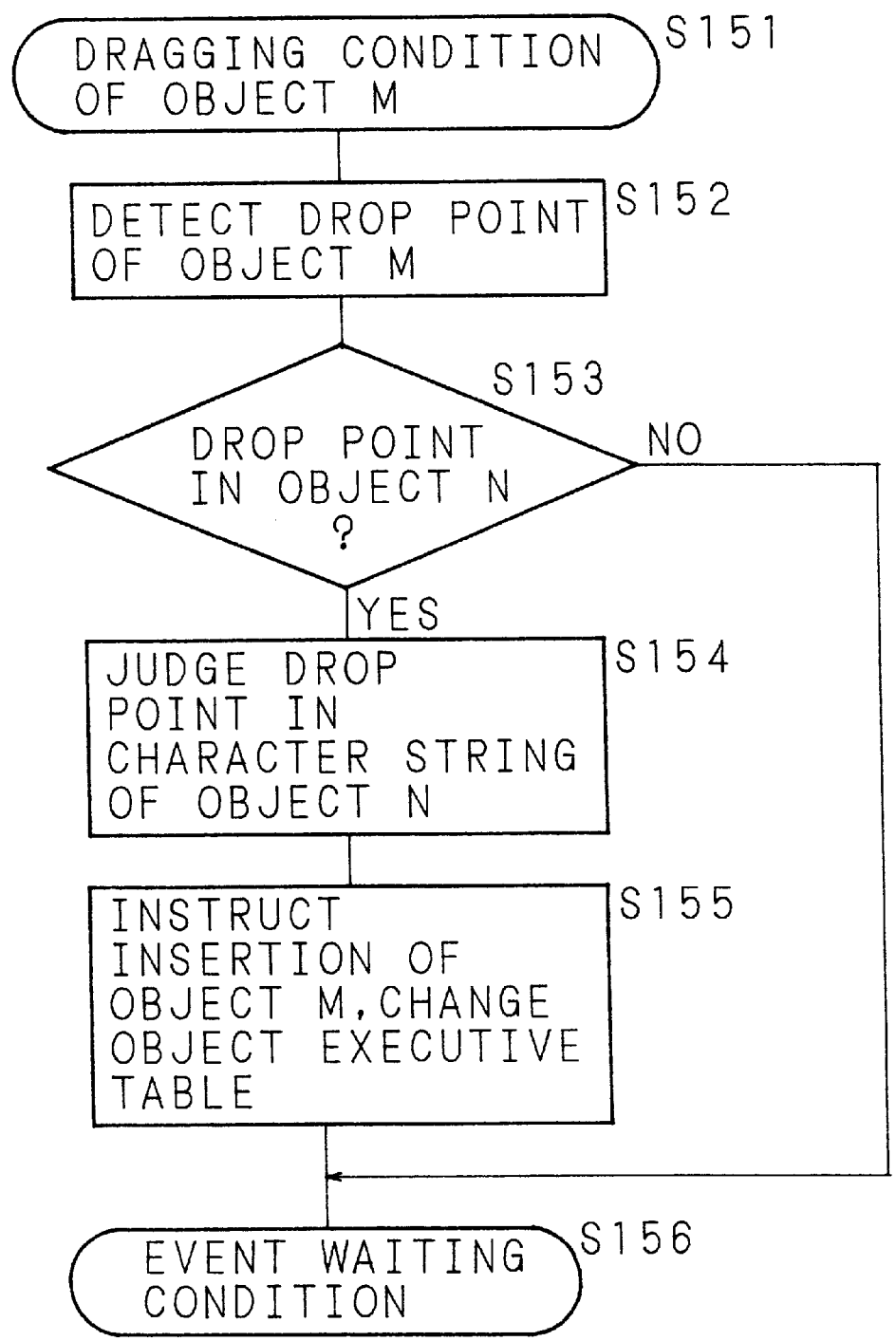
FIG. 37 is a flow chart showing a procedure for the connecting process (embodiment 15)

FIG. 37 is a flow chart showing the processing procedure for the embodiment 15. One object M is dragged (S151) and the drop point of the object M is notified from the interface unit 13 (S152). Referring now to the object executive table 12, it is judged (S153) whether or not the drop point is in the area of any object N (S153). When the drop point is not in the area thereof (at S153, NO), the condition becomes the event waiting condition (S156). When the drop point is in the area thereof (at S153), it is judged where it has been dropped in the character string of the object N (S154). An instruction is issued to the object display unit 11 to insert and display the object M in the drop position within the character string of the object N, and after the registration contents of the object executive table 12 has been changed (S155), the condition becomes the event waiting condition (S156).

In such a connecting operation, when a desired position in an object where an insertion is to be effected, another object superposing on it is inserted there. Thus, the connecting operation can be effected with the natural consciousness of the user.

Embodiment 16

Connecting Objects (thirteenth invention)

Figures 38A, 38B, 38C:
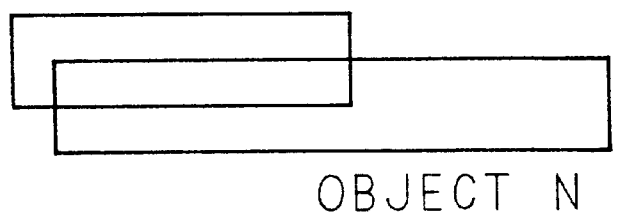
FIGS. 38A through 38C are explanatory diagrams showing examples of displaying and operating of objects in an object connecting process (embodiment 16)

In the embodiment 16, when two objects are to be connected with each other, the user drags and drops one object in the area of other object with a mouse 25. Referring now to the object executive table 12, a connecting is conducted with an object having the older time stamp being positioned before the other, in accordance with the time stamp of each object. FIGS. 38A through 38C are explanatory diagrams showing examples of displaying and operating of objects in a connecting process of the objects for the embodiment 16. When the user drops the object M onto the area of the object N, as shown in FIG. 38A, if the time stamp of the object M is newer than the time stamp of the object N, the system connects the object M after the object N and displays them as shown in FIG. 38B. If the time stamp of the object M is older than the time stamp of the object N, the system connects the object M before the object N, and displays them as shown in FIG. 38C.

Figure 39:
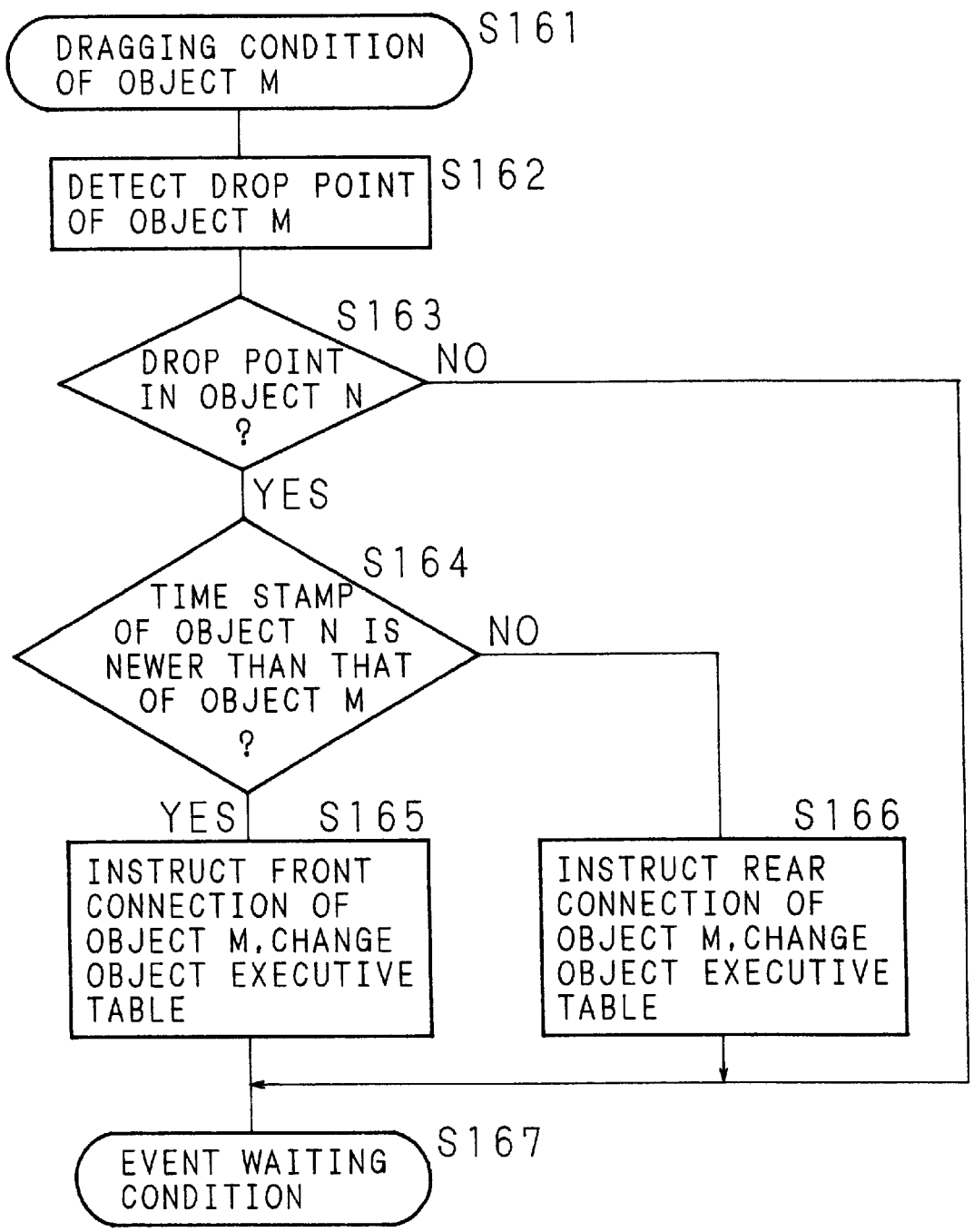
FIG. 39 is a flow chart showing a procedure for the connecting process (embodiment 16)

FIG. 39 is a flow chart showing the processing procedure for the embodiment 16. One object M is dragged (S161), and the drop point of the object M is notified (S162) from the interface unit 13. Referring now to the object executive table 12, it is judged (S163) whether or not the drop point is in the area of any object N. Referring to the object executive table 12 as shown in FIG. 30, it is judged (S164) whether or not the time stamp of the object N is newer than the time stamp of the object M. When it is newer (at S164, YES), an instruction is issued to the object display unit 11 that the object N should be connected after the object M and displayed. Also, after the registration contents of the object executive table 12 has been changed (S165), the condition becomes the event waiting condition (S167). On the other hand, when it is not newer (at S164, NO), an instruction is issued to the object display unit 11 that the object N should be connected before the object M and displayed. Also, after the registration contents of the object executive table 12 has been changed (S166), the condition becomes the event waiting condition (S167).

Such a connecting operation is suitable for combining participants' comments in the order they are made, when the contents of the comments are written as objects.

Embodiment 17

Connecting Objects (thirteenth invention)

Figure 40A:
FIGS. 40A through 40C are explanatory diagram showing examples of displaying and operating of objects in an object connecting process (embodiment 17)
Figure 40B:
Figure 40C:
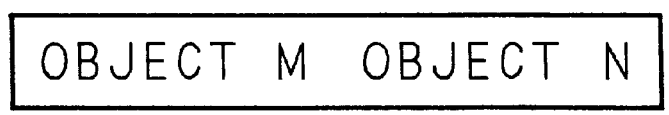

In the embodiment 17, when one object is specified with a mouse 25 and then the other object is specified with the mouse 25 within a predetermined time period (for example, within one second), the two objects are connected with each other. When still another object is specified within the predetermined time period, three objects or more can be connected. FIGS. 40A through 40C are explanatory diagrams showing examples of displaying and operating of objects in a connecting process of the objects for the embodiment 17. When the user single-clicks the object M as shown in FIG. 40A and then the object N is double-clicked within one second as shown in FIG. 40B, the system connects the object N and displays the object N after the object M as shown FIG. 40C.

Figure 41:
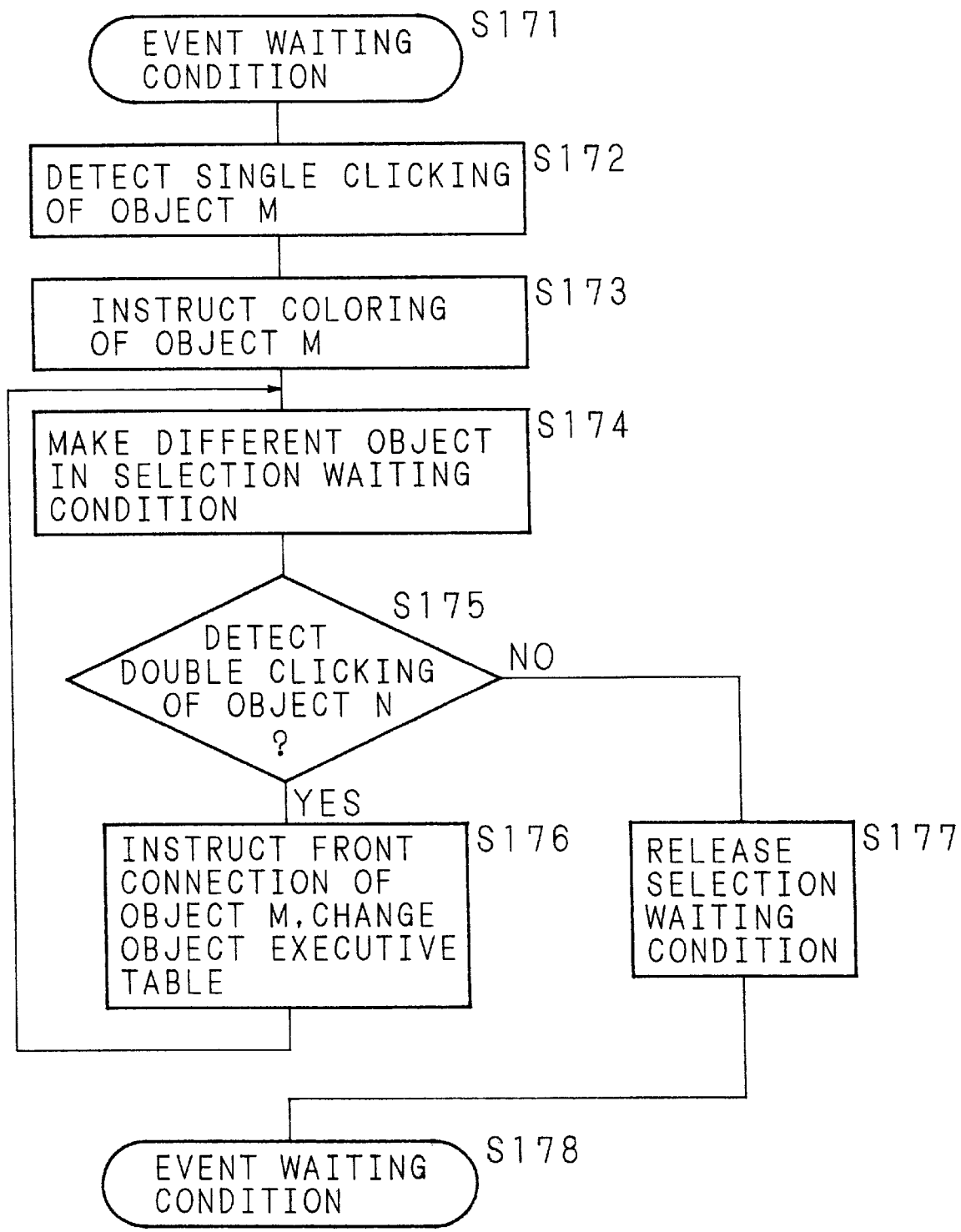
FIG. 41 is a flow chart showing a procedure for the connecting process (embodiment 17)

FIG. 41 is a flow chart showing a processing procedure for the embodiment 17. In the event waiting condition (S171), a single click in the area of the object M is notified from the interface unit 13 (S172). Then, an instruction is issued to the object display unit 11 (S173) to color object M and display it and the other object enters the selection waiting condition (S174). Then, it is judged whether or not a double click in the area of the other object N is notified from the interface unit 13 within one second (S175). When it is not notified (at S175, NO), the condition becomes the event waiting condition (S178) after the selection waiting condition has been released (S177). When it is notified (at S175, YES), an instruction is issued to the object display unit 11 that the selected object N should be connected after the object M and displayed. Also, after the registration contents of the object executive table 12 has been changed (S176), the procedure goes back to S174 and the condition becomes the selection waiting condition of a further object.

In such a connecting operation, a connecting operation, suitable for the natural human sense can be effected, which is similar to an action by a finger of pointing each of the objects to be connected and pointing them again to indicate a connection.

Embodiment 18

Connecting Objects (thirteenth invention)

In the embodiment 18, when the user selects one object with a mouse 25 and then selects another object with the mouse 25 within a predetermined time period (for example, within one second) after the first selecting operation, and an operation of enclosing the two objects is effected, with a L button down, while the two objects are selected, the objects are connected. Three objects or more can be connected by increasing the number of objects to be selected.

Figure 42A:
FIGS. 42A through 42D are explanatory diagrams showing examples of displaying and operating of objects in an object connecting process (embodiment 18)
Figure 42B:
Figure 42C:
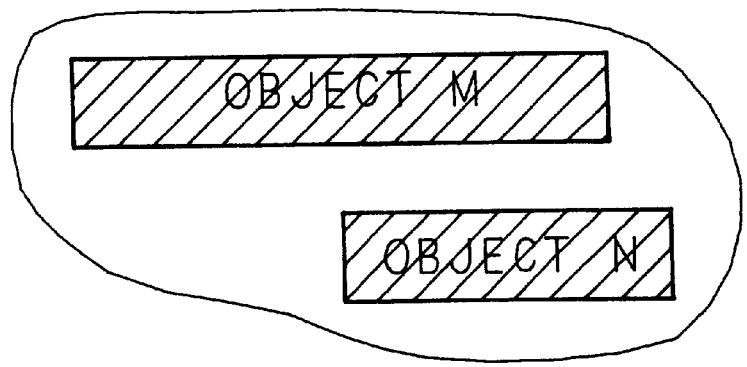
Figure 42D:
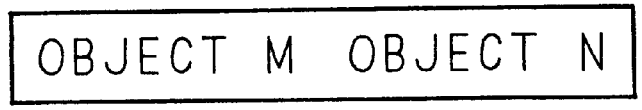

FIGS. 42A through 42D are explanatory diagrams showing examples of displaying and operating of objects in a connecting process of the objects for the embodiment 18. When the user single-clicks the object M as shown in FIG. 42A, and makes a single clicking operation of the object N within one second, as shown in FIG. 42B, and further makes a pointing operation for enclosing the object M and the object N as shown in FIG. 42C, the system connects the object N after the object M, and displays them as shown in FIG. 42D.

Figure 43:
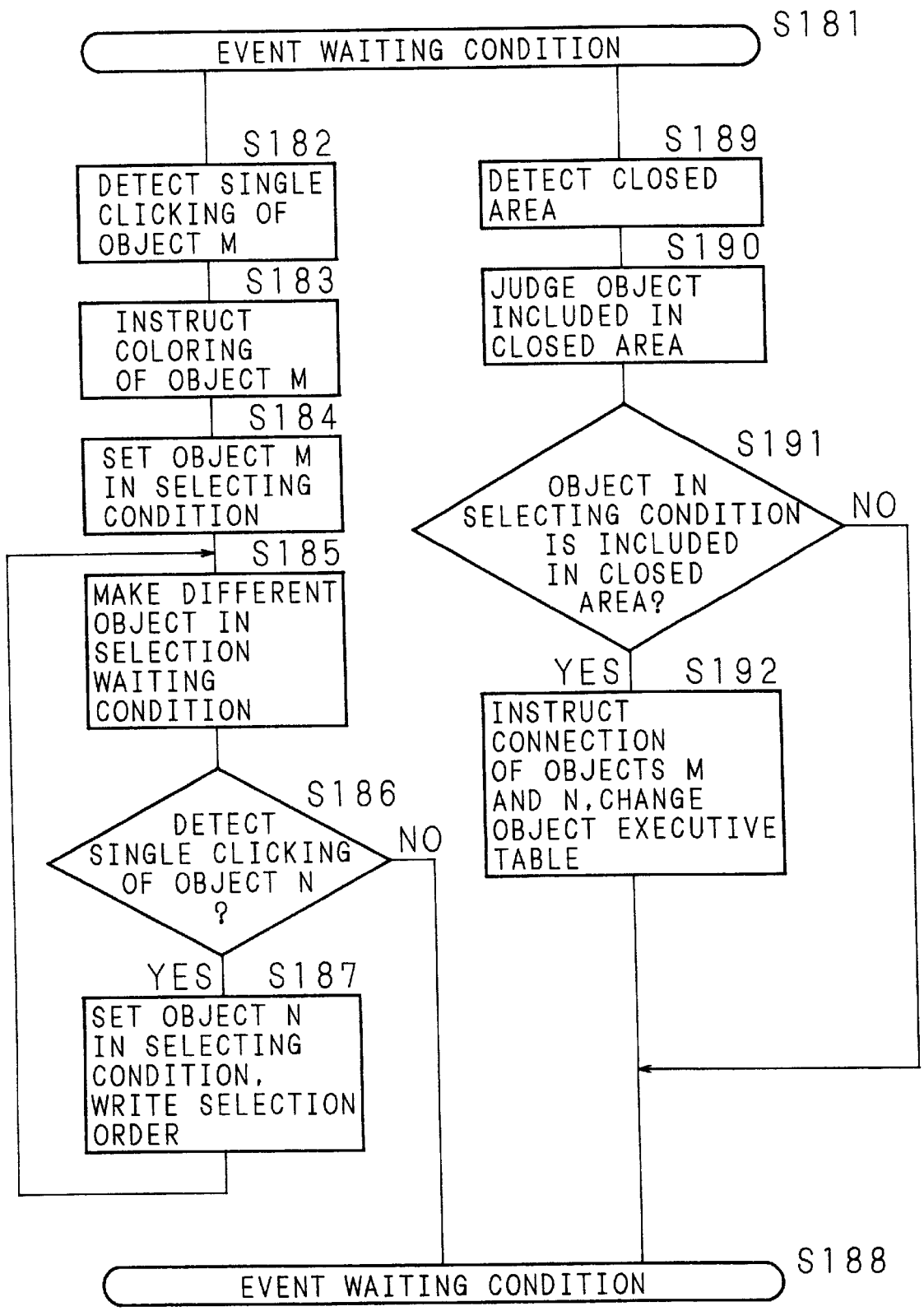
FIG. 43 is a flow chart showing a procedure for the connecting process (embodiment 18)

FIG. 43 is a flow chart showing the processing procedure for the embodiment 18. In the event waiting condition (S181), a single clicking in the area of the object M is notified from the interface unit 13 (S182). Then, an instruction is issued (S183) to the object display unit 11 on coloring of the object M and displaying of it, and enters the selection waiting condition (S185) for another object after the condition is made where the object M of the object executive table 12 is selected (S184). Then, it is judged whether or not a double click in the area of the other object N is notified from the interface unit 13 within one second (S186). When it is not notified (at S186, NO), the condition becomes a event waiting condition (S188). On the other hand, when it is notified (at S186, YES), the condition is made where the object N of the object executive table 12 is selected. After the order of the selection has been written (S187), the procedure goes back to S187 and the condition is made the selection waiting condition for still another object. In the event waiting condition (S181), the selection of a closed area is notified from the interface unit 13 (S189). An object included in the selected closed area is judged (S190). It is judged whether or not a plurality of objects of the selecting condition are included in the selected closed area (191). When they are not included (at S191, NO), the condition becomes the event waiting condition (S188). When they are included (at 191, YES), an instruction is issued to the object display unit 11 that the object M and the object N should be connected with each other and displayed in accordance with the order in which the objects are written in the object executive table 12. Also, the registration contents of the object executive table 12 are changed (S192), and the event waiting condition is set (S188).

In such a connecting operation, a connecting operation suitable for the natural human sense can be effected, which is similar to an action by a finger of pointing each of the objects to be connected and encirclosing them to indicate a connection.

Embodiment 19

Connecting Objects (thirteenth invention)

In the embodiment 19, first, the user selects one object with a mouse 25 within the predetermined time period (for example, within one second) after the other object has been selected with the mouse 25. When a line drawing operation is effected from the area of one object into the area of the other object with a L button down in a condition where the two objects are selected, the objects are connected. Three objects or more can be connected by increasing the number of the objects to be selected.

FIGS. 44A through 44D are explanatory diagrams showing examples of displaying and operating of objects in a connecting process of the objects for the embodiment 19. When the user single-clicks the object M as shown in FIG. 44A, then single-clicks the object N within one record as shown in FIG. 44B, and further makes a pointing operation as shown in FIG. 44C for connecting the object M with the object N, the system connects the object N and displays the object N after the object M as shown in FIG. 44D.

Figure 45:
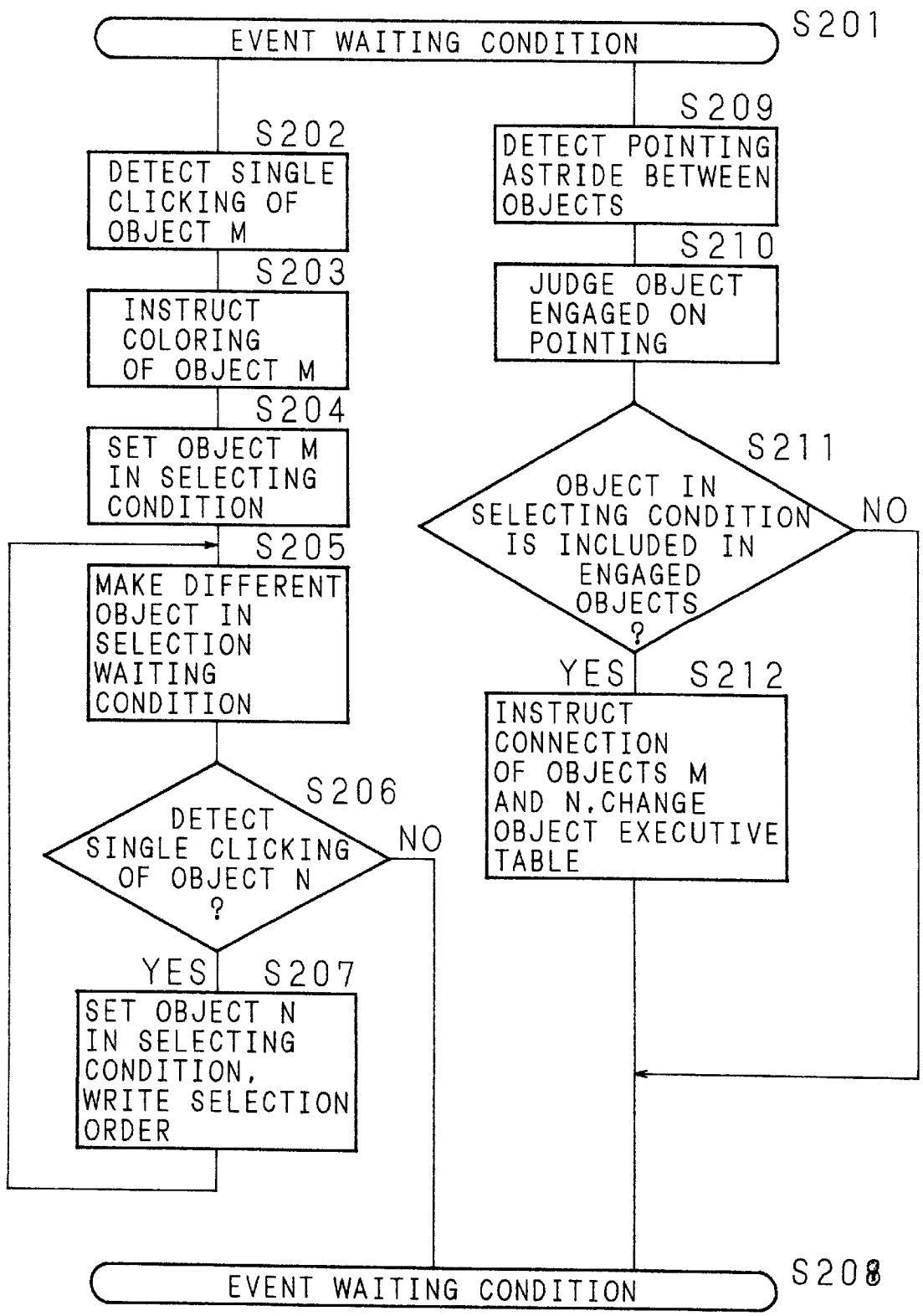
FIG. 45 is a flow chart showing a procedure for the connecting process (embodiment 19)

FIG. 45 is a flow chart showing the processing procedure for the embodiment 19. In the event waiting condition (S201), a single clicking in the area of the object M is notified from the interface unit 13 (S202). Then, an instruction is issued (S203) to the object display unit 11 to color the object M and display it. The condition is changed to a selection waiting condition for another object (S205) after the object M of the object executive table 12 is selected (S204). Then, it is judged whether or not a single clicking in the area of the other object N is notified from the interface unit 13 within one second (S206). When it is not notified (at S206, NO), the condition becomes an event waiting condition (S208). On the other hand, when it is notified (at S206, YES), the condition is made where the object N of the object executive table 12 is selected. After the order of the selection has been written (S207), the procedure goes back to S205, and the condition becomes the selection waiting condition for another object. In the event waiting condition (S201), the pointing astride between a plurality of object areas is notified from the interface unit 13 (S209). It is judged (S210) which object is included in the pointed area. It is judged whether or not a plurality of objects in the selected condition are included in the pointed object (S211). When they are not included (at S211, NO), the condition becomes the event waiting condition (S208). When they are included (at S211, YES), an instruction is issued to the object display unit 11 that the object M and the object N should be connected with and displayed in accordance with the order in which the objects are written in the object executive table 12. Also, the registration contents of the object executive table 12 are changed (S212), and the condition becomes the event waiting condition (S208).

In such a connecting operation, a connecting operation suitable for the natural human feeling can be effected, which is similar to an action by a finger of pointing at each of the objects to be connected and then linking them to indicate a connection.

Embodiment 20

Preventing an Error Connection of Objects (fourteenth invention)

In the embodiment 20, the system first displays a plurality of objects connected in a connecting condition in accordance with the order based on the connecting operation of the user. When the user judges from the display that the order of the connection is reverse, if the user makes a single clicking within the area of the connected objects with a mouse 25 within a predetermined time period (for example, within one second) after the display of the connection, the system changes the order of the connection and displays them. Also, for the predetermined time period in which a change in the connecting order can be effected, the displaying process is conducted with different color for each of the original objects before the connecting process.

Figure 46A:
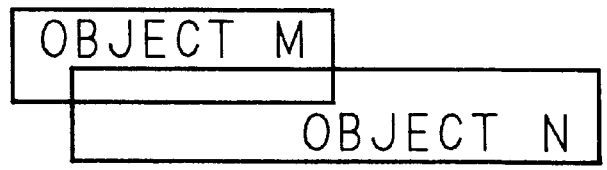
FIGS. 46A through 46D are explanatory diagrams showing examples of displaying and operating of objects in an object connecting order changing process (embodiment 20)
Figure 46B:
Figure 46C:
Figure 46D:
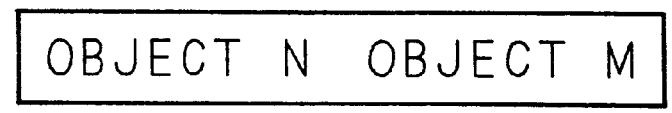

FIGS. 46A through 46D are explanatory diagrams showing examples of displaying and operating of objects in a connecting order changing process of the objects for the embodiment 20. In the example shown in FIGS. 46A through 46D, the connecting process in the aforementioned embodiment 14 is adopted. When the user places the object M in the upper left area of the object N as shown in FIG. 46A, the system connects and displays the object M before the object N as shown in FIG. 46B. At this time, the two original objects M and N are displayed in different colors for only one second. When the user single-clicks on the area of the connected objects for one second in which the objects are displayed in different colors, the system changes the order of the objects M and N, namely, connects the object M after the object N as shown in FIG. 46C, and displays them.

Figure 47:
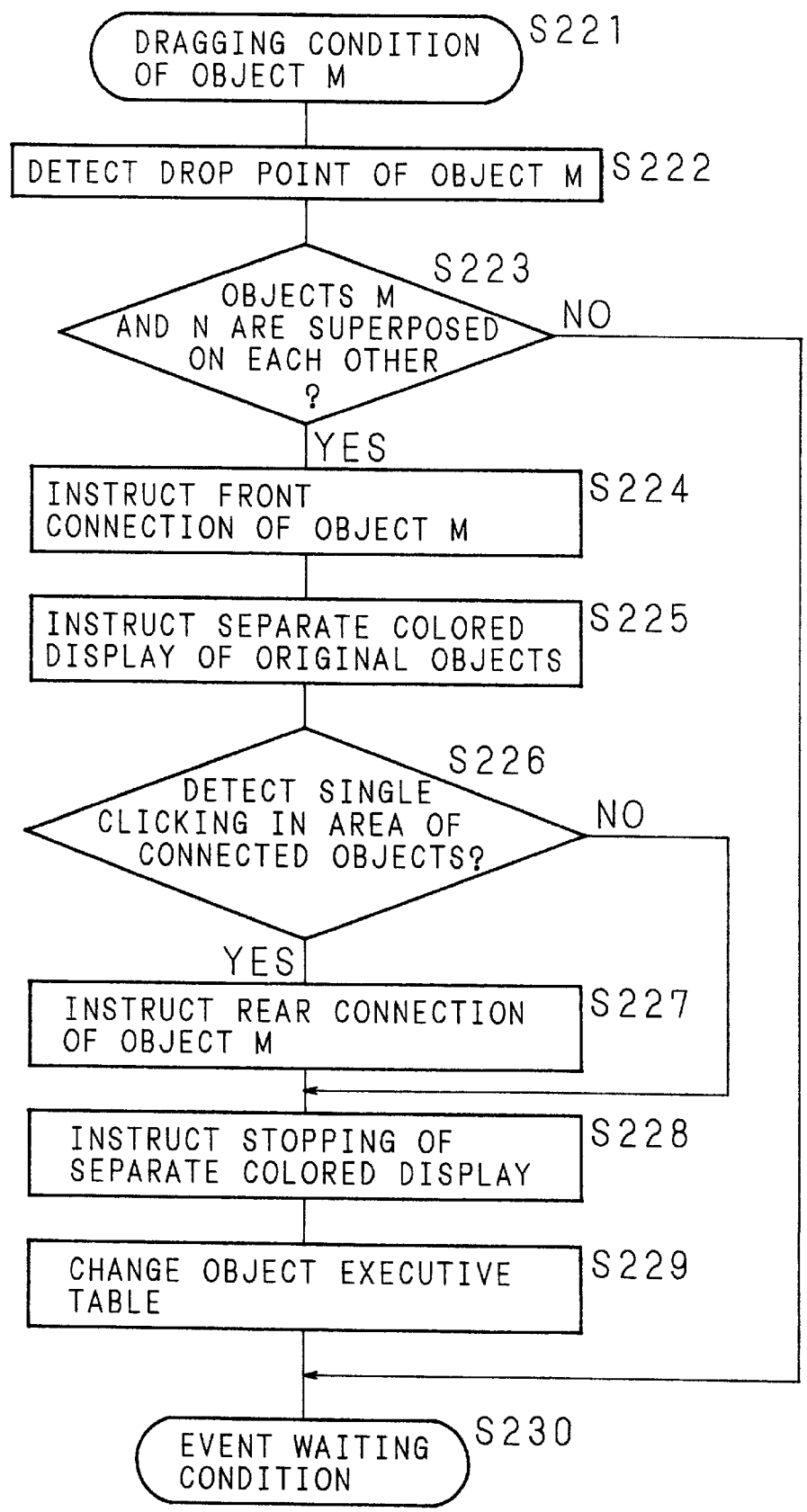
FIG. 47 is a flow chart showing a procedure for the connecting order changing process (embodiment 20)

FIG. 47 is a flow chart showing the processing procedure for the embodiment 20. In the example shown in FIG. 47, the connecting process in the aforementioned embodiment 14 is adopted. One object M is dragged (S221), and the drop point of the object M is notified from the interface unit 13 (S222). Referring to the object executive table 12, it is judged (S223) whether or not the two objects of the object M and the object N are superposed on each other. When they are not superposed (at S223, NO), the condition becomes the event waiting condition (S230). When the object M is superposed on the upper left area of the object N (at S223, YES), an instruction is issued (S224) to the object display unit 11 that the object N should be connected and displayed after the object M. An instruction (S225) is issued to the object display unit 11 that the connected objects are to be displayed for one second with the original objects M and N being displayed in different colors. The single clicking is notified from the interface unit 13 during one second in which the objects are displayed in different colors, and it is judged whether or not the position is within the area of connected objects (S226). When the position is not within the area, the procedure goes directly to S228. When it is within the area, the procedure goes to S228 after instructing (S227) the object display unit 11 to connect the object N before the object M and display them. An instruction is issued (S228) to the object display unit 11 to stop displaying the objects in different colors. Thereafter, the registration contents of the object executive table 12 is changed (S229), and the condition becomes the event waiting condition (S230).

In the above-described embodiment 20, when the order of the objects connected and displayed is recognized to be wrong, the errors in the connecting order can be corrected by the operation suitable for the natural human sense through the unintentional touching of the object.

Embodiment 21

Preventing an Error Connection of Objects (fourteenth invention)

In the embodiment 21, the system first displays a plurality of objects in a connected condition in accordance with the order based on the connecting operation of the user. When the user judges from the display that the order of the connection is reverse, the user effects a dragging operation astride between the two object areas with a mouse 25 with a predetermined time period (for example, within one second) after the display of the connection, the system changes the connecting order and displays the objects. Also, for the predetermined time period in which the change in the connecting order can be effected, the displaying process is conducted with a different color for each of the original objects before the connecting operation.

Figure 48A:
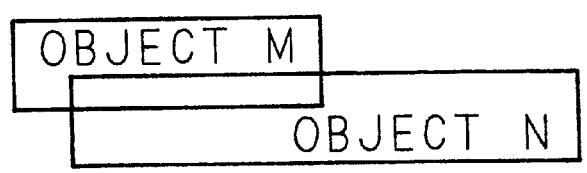
FIGS. 48A through 48D are explanatory diagrams showing examples of displaying and operating of objects in an object connecting order changing process (embodiment 21)
Figure 48B:
Figure 48C:
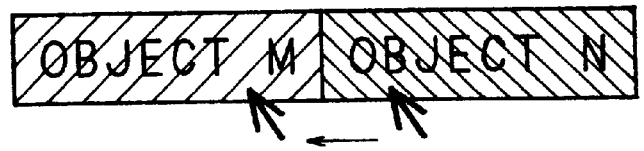
Figure 48D:
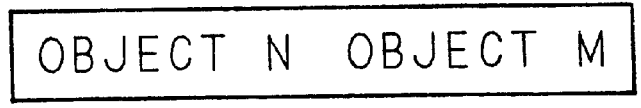

FIGS. 48A through 48D are explanatory diagrams showing examples of displaying and operating of objects in a connecting order changing process of the objects for the embodiment 21. In the example shown in FIGS. 48A through 48D, the connecting process in the aforementioned embodiment 14 is adopted. When the user places the object M on the upper left area of the object N as shown in FIG. 48A, the system connects and displays the object M before the object N as shown in FIG. 48B. At this time, the two original objects M and N are displayed in different colors only for one second. As shown in FIG. 48C, when the user moves the cursor with a L button down astride between the connected objects M and N shown in different colors for one second, the system changes the order of the objects M and N, namely, connects the object M after the object N and displays them.

Figure 49:
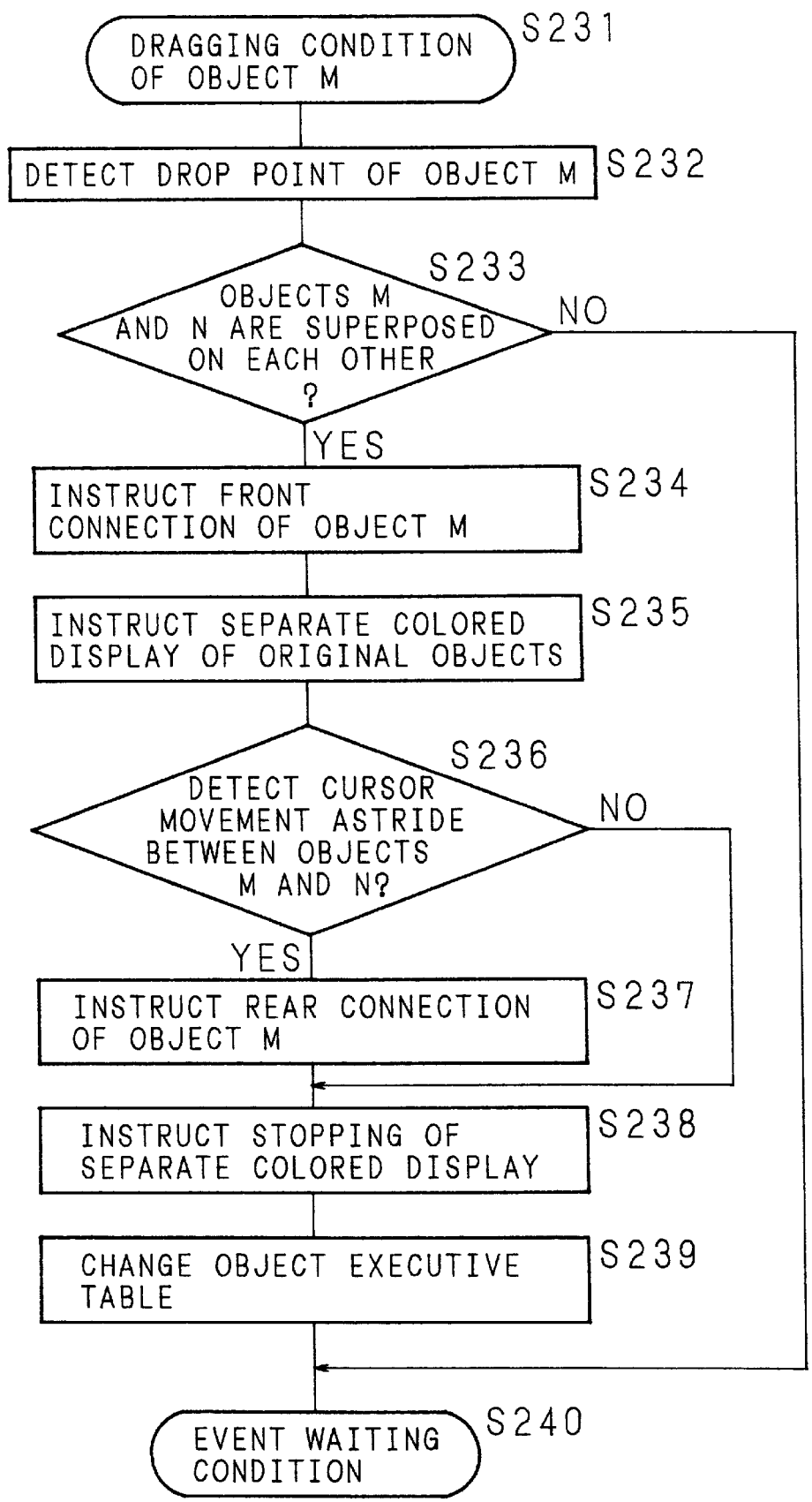
FIG. 49 is a flow chart showing a procedure for the connecting order changing process (embodiment 21)

FIG. 49 is a flow chart showing the processing procedure for the embodiment 21. In the example shown in FIG. 49, the connecting process in the aforementioned embodiment 14 is adopted. One object M is dragged (S231), and the drop point of the object M is notified from the interface unit 13 (S232). Referring to the object executive table 12, it is judged (S233) whether or not the two objects of the object M and the another object N are superposed on each other. When they are not superposed (at S233, NO), the condition becomes the event waiting condition (S240). When the object M is superposed on the upper left area of the object N (at S223, YES), an instruction is issued (S234) to the object display unit 11 that the object N should be connected and displayed after the object M. An instruction (S235) is issued to the object display unit 11 that the connected objects should be displayed with the original objects M and N being displayed in different colors for one second. The cursor moving with the L button down is notified from the interface unit 13 during the one second when the objects are displayed in different colors. It is judged (S236) whether or not the movement of the cursor is astride between the connected objects M and N. When the movement thereof is not astride (at S236, NO), the procedure goes directly to S238. When it is astride (at S236, YES), an instruction is issued (S237) to the object display unit 11 that the object N should be connected and displayed before the object M. Then, the procedure goes to S238. An instruction for stopping the color display is issued to the object display unit 11 (S238). Thereafter, the registration contents of the object executive table 12 is changed (S239), and the condition becomes the event waiting condition (S240).

In the above-described embodiment 21, when the order of the objects connected and displayed is recognized to be wrong, the error in the connecting order can be corrected by the operation suitable for the natural human sense, which is a prompt action for trying to move the objects and exchange their positions.

Embodiment 22

Preventing an Error Connection of Objects (fourteenth invention)

In the embodiment 22, when the user drags and drops one object onto the area of the other object to conduct a connecting operation with a mouse 25, the system displays the objects in such a manner that the other object is connected before or after the moved object before the user drops it. When the user drops it as it is, the objects are connected in that order. When the user drags one object beyond a predetermined distance, the order becomes reverse.

Figure 50A:
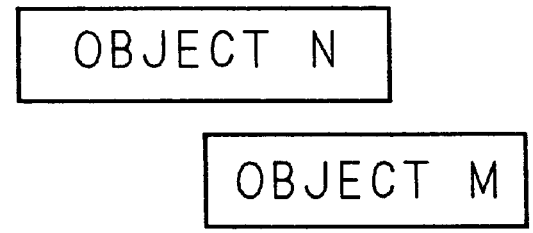
FIGS. 50A through 50D are explanatory diagrams showing examples of displaying and operating of objects in an object connecting order changing process (embodiment 22)
Figure 50B:
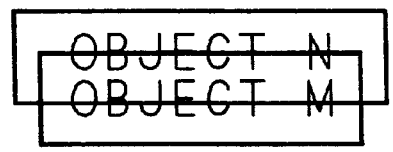
Figure 50C:
Figure 50D:

FIGS. 50A through 50D are explanatory diagrams showing examples of displaying and operating of objects in a connecting order changing process of the objects for the embodiment 22. In the examples shown in FIGS. 50A through 50D, the connecting operation is adopted in the aforementioned example 13. When the user drags the object M in FIG. 50A onto the area of the object N as shown in FIGS. 50A and 50B, the system displays the object N before the object M as shown in FIG. 50C. At this time, when the user drops it as it is, the objects are connected with the sequential relation being unchanged. When the user moves the object M slightly (for example, ten dots or more) to the left in the condition shown in FIG. 50C, the system displays the object N after the object M. When the user drops it as it is in the condition in FIG. 50D, the objects are connected with the sequential relation being unchanged.

Figure 51:
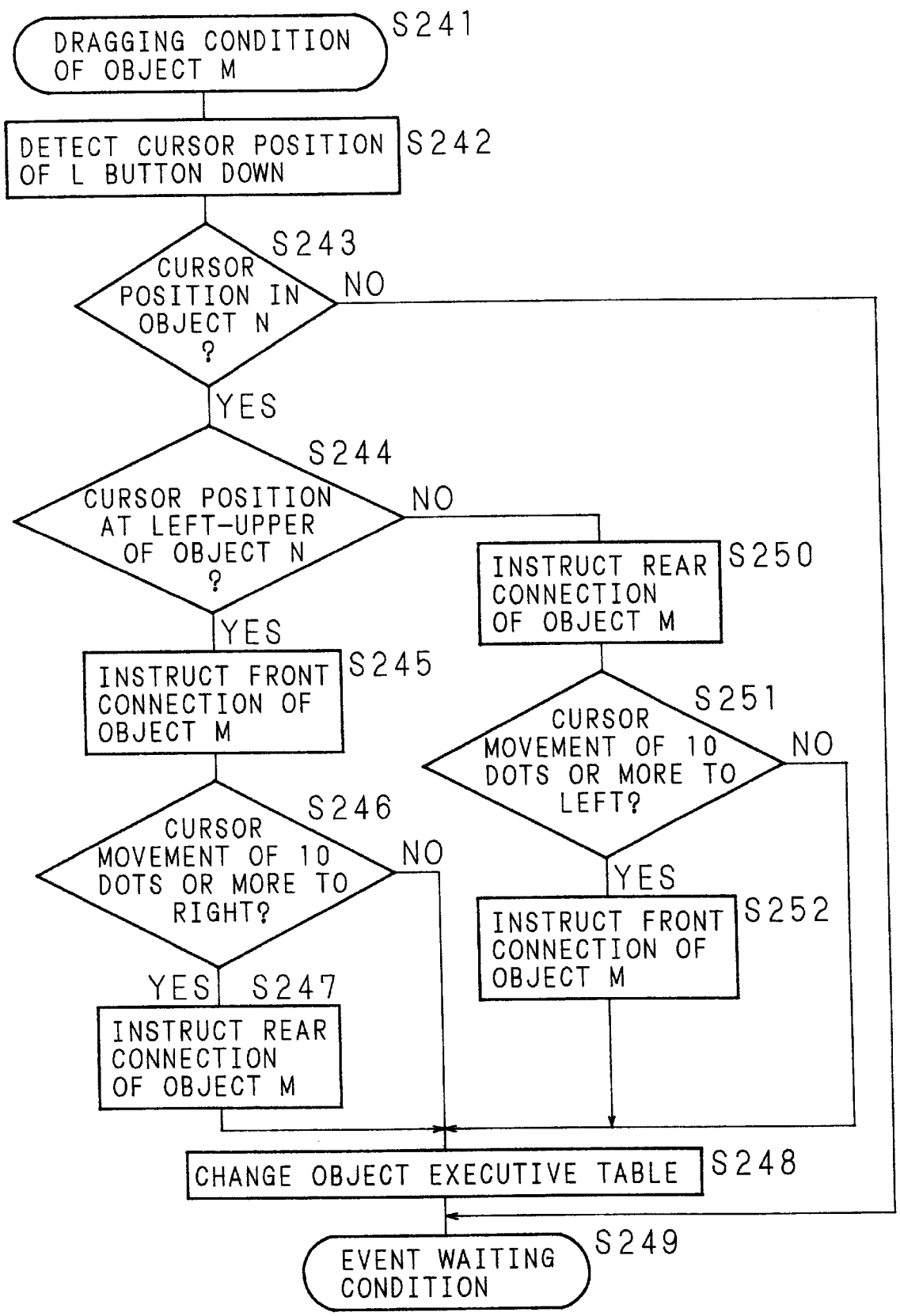
FIG. 51 is a flow chart showing a procedure for the connecting order changing process (embodiment 22)

FIG. 51 is a flow chart showing the processing procedure for the embodiment 22. In the example shown in FIG. 51, the connecting process in the aforementioned embodiment 13 is adopted. One object M is dragged (S241) and the cursor position of the L button down for moving the object M is notified from the interface unit 13 (S242). Referring to the object executive table 12, it is judged in whether or not the cursor position is in the area of another object N. (S243). When it is not in the area (at S243, NO), the condition becomes the event waiting condition (S249). On the other hand, when it is in the area (at S243, YES), it is judged whether or not the cursor position exists on the upper left position of the object N (S244). When it is in the area (at S244, YES), an instruction is issued (S245) to the object display unit 11 that the object N should be connected and displayed after the object M. The cursor moving with the L button down is notified from the interface unit 13 and it is judged whether or not the movement of 10 dots or more to the right is performed within the area of the connected object (S246). When the movement of 10 dots or more is not performed (at S246, NO), the procedure goes directly to S248. When the movement of 10 dots or more is performed (at S246, YES), an instruction is issued (S247) to the object display unit 11 that the object N should be connected and displayed before the object M, and then the procedure goes to S248. When the cursor position does not exist on the upper left position of the object N (at S244, NO), an instruction is issued (S250) to the object display unit 11 that the object N should be connected and displayed before the object M. The cursor movement of the L button down is notified form the interface unit 13 and it is judged (S251) whether or not the movement of 10 dots or more to the left is performed within the area of the connected object. When the movement is not 10 dots or more (at S251, NO), the procedure goes directly to S248. When the movement is ten dots or more (at S251, YES), an instruction is issued to the object display unit 11 (S252) that the object N should be connected and be displayed after the object M, and then the procedure goes to S248. Finally, the registration contents of the object executive table 12 are changed (S248), and the condition becomes the event waiting condition (S249).

In the above-described embodiment 22, it is possible to notify the user how a plurality of objects are connected in a series of connecting operations by the user, and errors in the connecting order can be prevented.

Embodiment 23

Preventing an Error Connection of Objects (fourteenth invention)

In the embodiment 23, when a connecting operation of the objects is conducted, the system displays for the predetermined time period (for example, three seconds) how the objects are gradually connected. When the user notices an error in the connecting order while the objects are gradually connected, the order of the connection can be reversed by double-clicking on the area of the object.

Figure 52A:
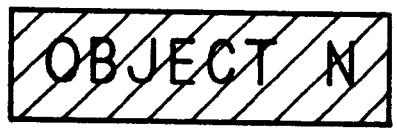
FIGS. 52A through 52D are explanatory diagrams showing examples of displaying and operating of objects in an object connecting order changing process (embodiment 23)
Figure 52B:
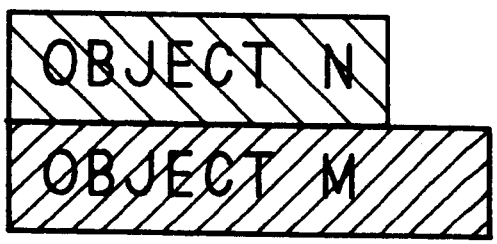
Figure 52C:
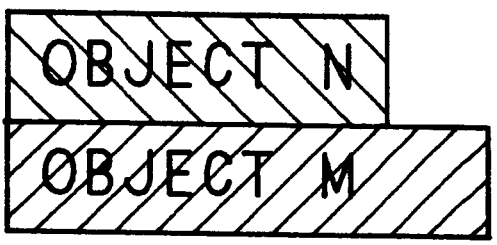
Figure 52D:
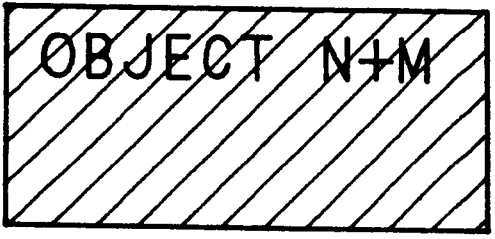

FIGS. 52A through 52D are explanatory diagrams showing examples of displaying and operating of objects in a connecting order changing process of objects for the embodiment 23. In the examples shown in FIGS. 52A through 52D, the connecting process in the aforementioned embodiment 14 is adopted. As shown in FIGS. 52A, 52B, the user performs a connecting operation of the object M with the object N. At this time, the system displays the object M in a deeper color. Then, in the course of three seconds, the system gradually makes the color of the object M lighter as shown in FIG. 52C. After the elapse of three seconds, the system connects the object M with the object N, and conducts the displaying process as shown in FIG. 52D. When the areas of the objects M and N to be connected are double-clicked within the three minutes, the connecting order can be changed.

Figure 53A:
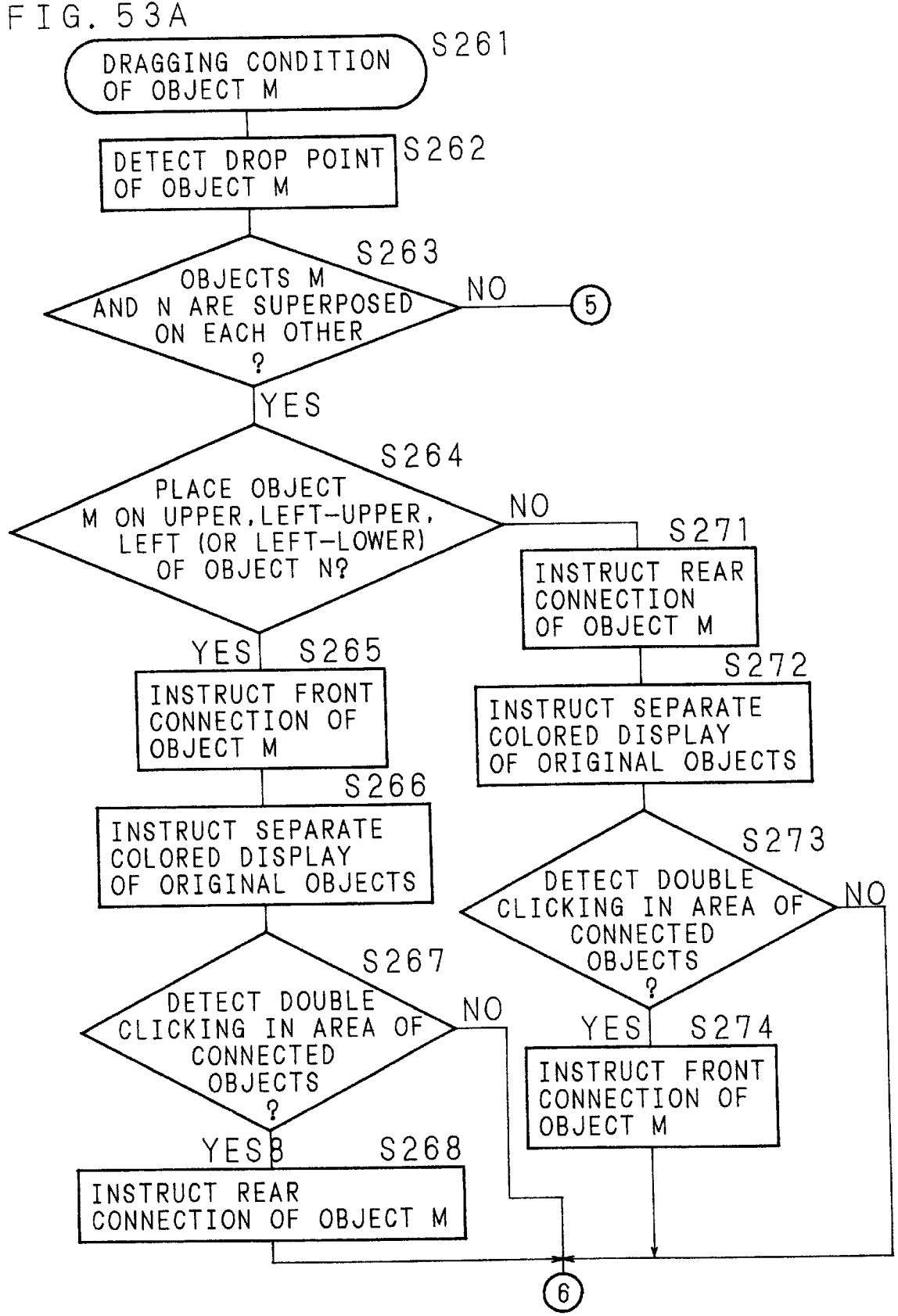
FIGS. 53A and 53B are a flow chart showing a procedure for the connecting order changing process (embodiment 23)
Figure 53B:
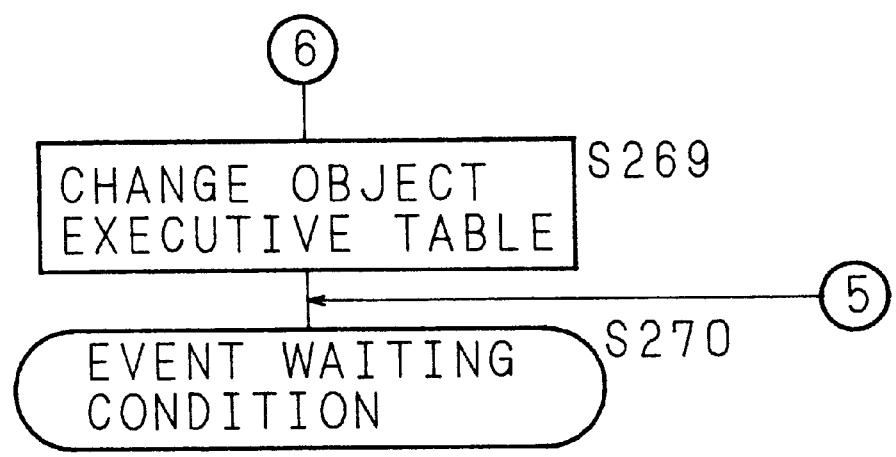

FIG. 53 is a flow chart showing the processing procedure for the embodiment 23. In the example shown in FIG. 53, the connecting process in the aforementioned embodiment 14 is adopted. One object M is dragged (S261), and the drop point of the object M is notified from the interface unit 13 (S262). Referring to the object executive table 12, it is judged (S263) whether or not the two objects, the object M and another object N, are superposed on each other. When they are not superposed (at S263, NO), the condition becomes the event waiting condition (S270). When the objects M and N are superposed (at S263, YES), it is judged (S264) whether or not the object M is placed on the upper left, left or upper (or left lower) portion of the object N. When the object M is placed (at S264, YES), an instruction is issued (S265) to the object display unit 11 that the object N should be connected and be displayed after the object M. An instruction is issued (S266) to the object display unit 11 about the display of the connected objects that the original objects M and N should be displayed in different colors for three seconds. A double clicking operation is notified from the interface unit 13 during the three seconds when the objects are displayed in different colors, and is judged (S267) whether or not the position clicked on is within the area of the connected objects. When the position is not within the area (at S267, NO), the procedure goes directly to S269. When the position is within the area (at W267, YES), an instruction is issued to the object display unit 11 (S268) that the object N should be connected and be displayed before the object M, and then the procedure goes to S269. When the object M is not placed in the specified position in S264 (at S264, NO), an instruction is issued (S271) to the object display unit 11 that the objects N should be connected and displayed before the object M. An instruction is issued (S272) to the object display unit 11 about the display of the connected objects that original objects M and N should be displayed in different colors for three seconds. A double clicking is notified from the pointing interface unit 13 during the three seconds when the objects are displayed in different colors, and it is judged (S273) whether or not the position clicked on is within the area of the connected objects. When it is not within the area (at S273, NO), the procedure goes directly to S269. When it is within the area (at S273, YES), an instruction is issued (S274) to the object display unit 11 that the object N should be connected and displayed after the object M, and then the procedure goes to S269. Finally, the registration contents of the object executive table 12 are changed (S269), and the condition becomes the event waiting condition (S270).

In the above-described embodiment 23, the system does not display the connection in a moment. Since the condition of the connecting process of the objects is displayed for a certain period of time, the user can clearly recognize the connection of the objects. Even when the objects are connected against the user's intention with a mistaken operation, the connection of the objects in the wrong order can be canceled and modified into one in the correct connecting order with an operation suitable for the natural human sense, which is a prompt action of separating the objects being connected.

Embodiment 24

Separating Object (fifteenth, sixteenth inventions)

FIGS. 54A through 54D are explanatory diagrams showing examples of displaying and operating examples of objects in a separating process of the object for the embodiment 24. As shown FIGS. 54A, 54B, the user selects the character string object N with a single clicking of the mouse 25. The selected object N is colored. Thereafter, as shown in FIG. 54C, the user conducts the L button down of the mouse 25 outside of the area of the selected object N. In the condition of the L button down, the mouse cursor is moved from the outside of the area of the selected object N into the area thereof, and then moved out of the area again. At this time, when the user conducts the L button up, the system separates the selected object N and displays it with the line drawn with the mouse cursor being as a boundary as shown in FIG. 54D. To inform the user of how the object N is separated, the system displays two areas S and T, which is to be separated, in different colors when the mouse cursor is outside of the area of the object. To stop the separating operation when the two areas S and T to be separated are displayed in the different colors, the cursor is moved in the area of the object N again with the L button down, and the L button up is conducted. In the case of character string objects, the boundary which the objects are separated is between the characters close to the track of the mouse cursor swept by the user.

Figure 55:
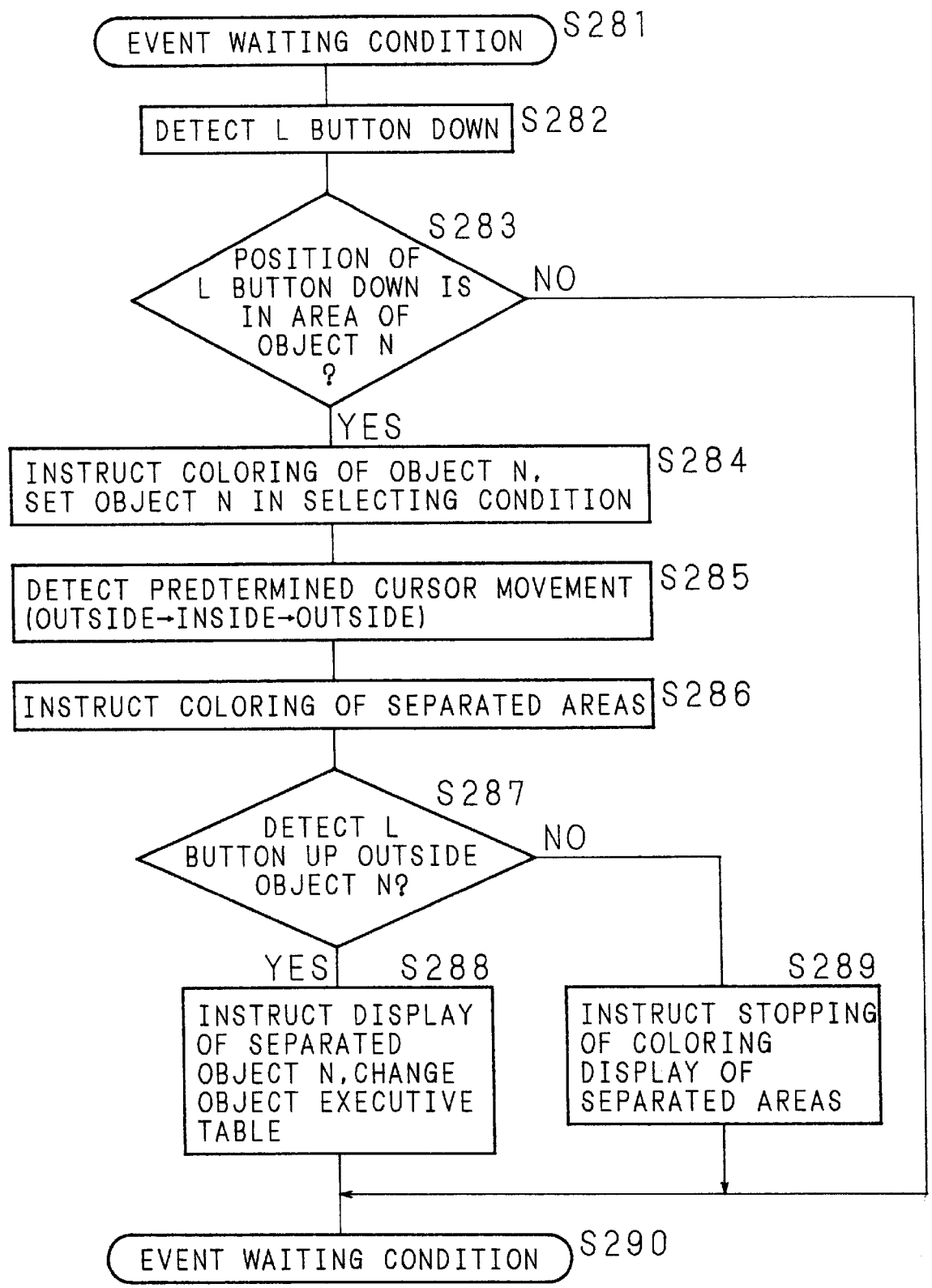
FIG. 55 is a flow chart showing a procedure for the separating process (embodiment 24)

FIG. 55 is a flow chart showing the processing procedure for the embodiment 24. In the event waiting condition (S281), the L button down of the mouse 25 is notified from the interface unit 13 (S282). Referring to the object executive table 12, it is judged (S283) whether or not the position of the L button down is in the area of the object N. When it is not in the area of the object N (at S283, NO), the condition becomes the event waiting condition (S290). When it is in the area of the object N (at S283, YES), an instruction is issued to the object display unit 11 that the object N should be colored and displayed, and the object N is selected (S284) in the object executive table 12. The cursor movement with the L button down is notified from the interface unit 13, and it is detected (S285) that the cursor is moved into the area of the object N from the outside thereof and moved out again. An instruction is issued (S286) to the object display unit 11 that the areas separated by the cursor movement should be colored. The L button up is notified from the interface unit 13. It is judged (S287) whether or not the position of the L button up is outside of the object N. When it is outside (at S287, YES), an instruction is issued to the object display unit 11 that the object N should be separated and displayed. Also, the registration contents of the object executive table 12 is changed (S288), and the condition becomes the event waiting condition (S290). When it is not outside (at S287, NO), an instruction is issued (S289) to the object display unit 11 to stop the coloring display of the separated areas, and the condition is changed into the event waiting condition (S290).

In the embodiment 24, the separation of the objects can be conducted with an operation suitable for the natural human sense, that is, cutting up the selected object with the mouse cursor.

Embodiment 25

Separating Object (fifteenth, sixteenth inventions)

FIGS. 56A through 56E are explanatory diagrams showing examples of displaying and operating of objects in a separating process of the object for the example 25. As shown In FIGS. 56A, 56B, the user selects the character string object N having character strings in a plurality of lines with a single clicking of the mouse 25. The selected object N is colored. Then, as shown in FIG. 56C, the user moves the mouse cursor with the L button down of the mouse 25 in the selected character string object, vertically crosses a line, and conducts the L button up. The character string object N is separated with the position close to the position, at which the crossing operation is conducted, as a boundary. When an operation of vertically crossing a line is performed before the L button up is conducted, the system can judge the separating position. Therefore, as shown in FIG. 56D, the system changes the color of the displayed character string object before and after the separating position to inform the user of where to separate the object. When the user conducts the L button up in the condition of the FIG. 56D, the system divides the character string object N and conducts the displaying operation as shown in FIG. 56E.

Figure 57:
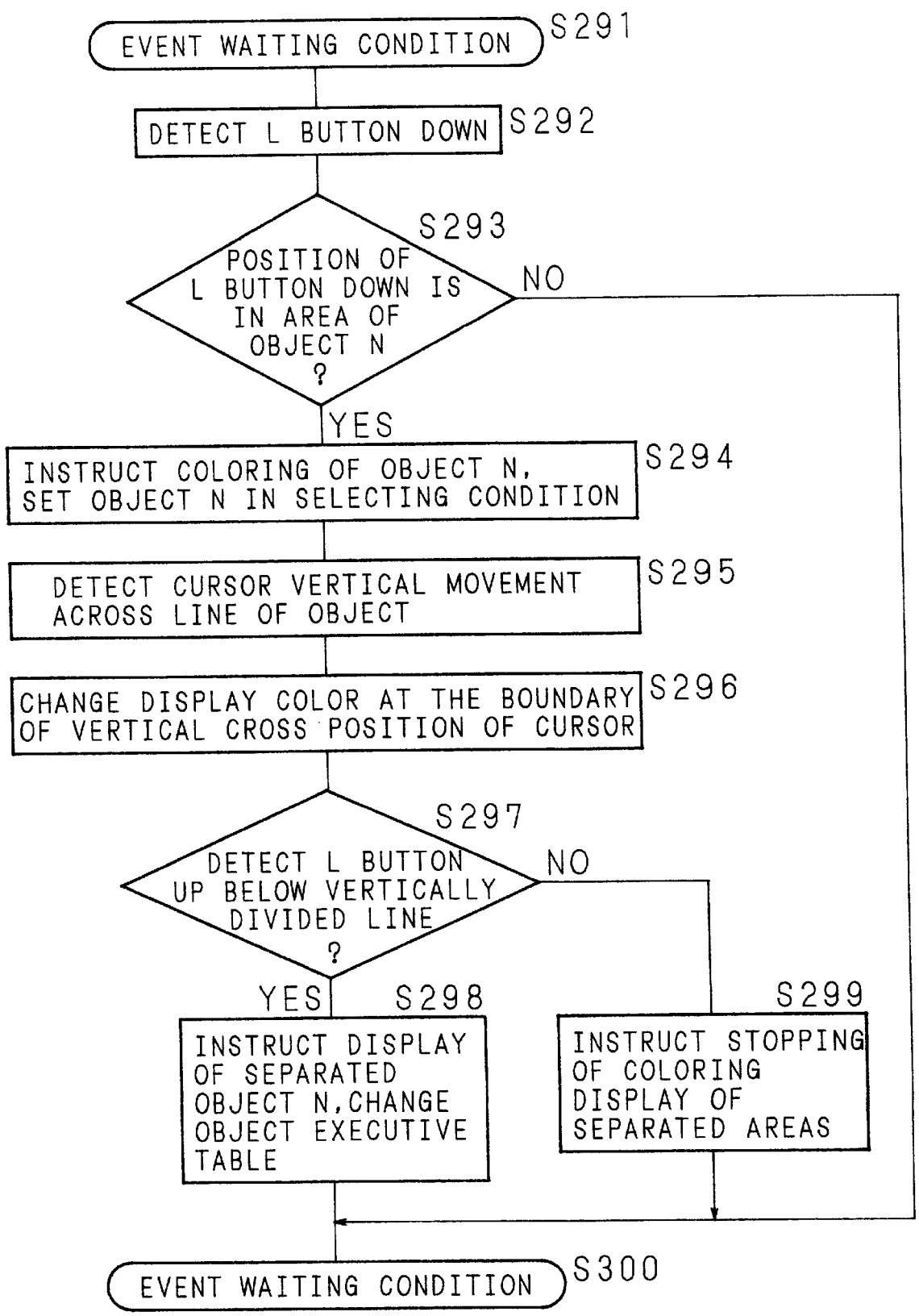
FIG. 57 is a flow chart showing a procedure for the separating process (embodiment 25)

FIG. 57 is a flow chart showing the processing procedure for the embodiment 25. In the event waiting condition (S291), the L button down of the mouse 25 is notified from the interface unit 13 (S292). Referring now to the object executive tale 12, it is judged whether or not the position of the L button down is in the area of the object N (S293). When it is not in the area thereof (at S293, NO), the condition becomes the event waiting condition (S300). When it is in the area (at S293, YES), an instruction is issued to the object display unit 11 to display the object N in color, and the object N is put into the selected condition with the object executive table 12 (S294). A cursor movement of the L button down is notified from the interface unit 13. It is detected (S295) that the cursor mouses vertically crossing a line of the object N. An instruction is issued to the object display unit 11 that the color should be changed in the area separated with the position where the cursor vertically crosses as the boundary (S296). The L button up is notified from the interface unit 13. It is judged (S297) whether or not the position of the L button up is on the side lower than vertically crossed line. When it is on the lower side (at S297, YES), an instruction is issued to the object display unit 11 to separate the object N and display it. Also, the registration contests of the object executive table 12 is changed (S298), and the condition becomes the event waiting condition (S300). On the other hand, when it is not on the lower side (at S297, NO), an instruction is issued (S299) to the object display unit 11 to stop the color displaying operation of the separated area, and the condition becomes the event waiting condition (S300).

The embodiment 25, in addition to the effect of the embodiment 24, is effective in the separation of the objects displayed with a plurality of lines making the best use of the connection of the words and characters.

Embodiment 26

Separating Object (fifteenth, sixteenth inventions)

FIGS. 58A through 58E are explanatory diagrams showing examples of displaying and operating of objects in a separating process of the object for the embodiment 26. As shown In FIGS. 58A, 58B, the user selects the drawing object N with a single clicking of the mouse 25. The selected object N is colored. Then, as shown in FIG. 56C, the user moves the mouse cursor in the condition of the L button down of the mouse 25 for surrounding the separated area within the selected object N, so as to make a closed area. To inform the user of how the separating operation is conducted, the system gives the closed area a color different from that of the object, when the closed area is made, and conducts the displaying process. In this condition, when the user conducts the L button up within the object N as shown in FIG. 58D, the system separates from the original object the component of the object included in the closed area shown in FIG. 58E, and conducts the displaying process. To stop the separating process when the closed area is colored and displayed, the mouse cursor is moved out of the object and conducts the L button up. The components of the object may be character strings or graphics.

Figure 59:
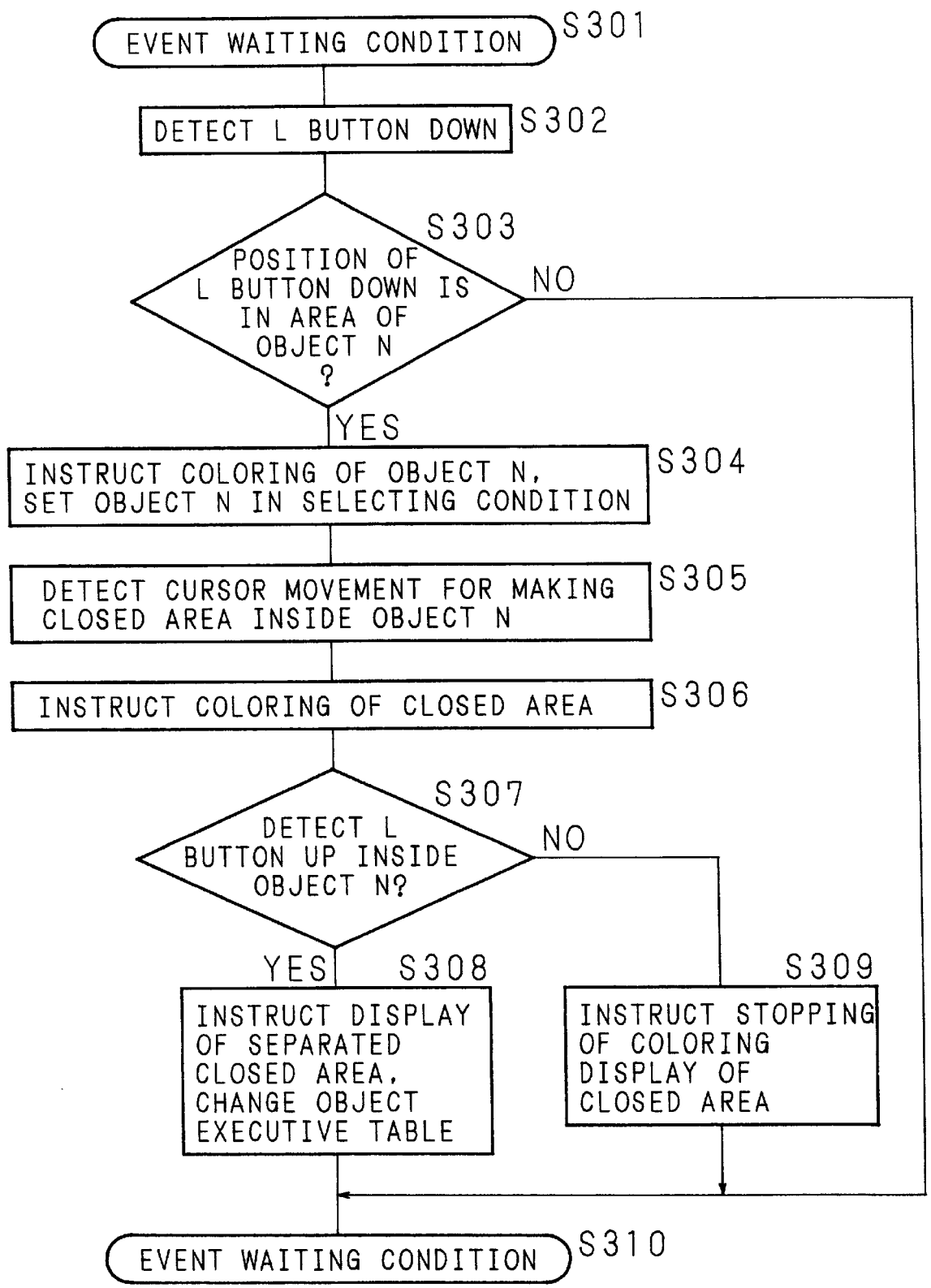
FIG. 59 is a flow chart sowing a procedure for the separating process (embodiment 26)

FIG. 59 is a flow chart showing the processing procedure for the embodiment 26. In the event waiting condition (S301), the L button down of the mouse 25 is notified from the interface unit 13 (S302). Referring to the object executive table 12, it is judged (S303) whether or not the position of the L button down is in the area of the object N. When it is not in the area of the object N, the condition becomes the event waiting condition (S310). When it is in the area of the object N, an instruction is issued to the object display unit 11 that the object N should be colored and displayed, and also the object N is selected (S304) in the object executive table 12. The cursor movement of the L button down is notified from the interface unit 13, and it is detected (S305) that the movement of the cursor makes a closed area within the object N. An instruction is issued (S306) to the object display unit 11 that the closed area thus made should be given a color different from that of the object. The L button up is notified from the interface unit 13. It is judged (S307) whether or not the position of the L button up is inside of the object N (S307). When it is inside (at S307, YES), an instruction is issued to the object display unit 11 that a component of the object included in the closed area of the object N should be separated and displayed. Also, the registration contents of the object executive table 12 are changed (S308), and the condition becomes the event waiting condition (S310). When it is not inside (at S307, NO), an instruction is issued (S309) to the object display unit 11 to stop the colored display of the closed area, and the condition is changed into the event waiting condition (S310).

In the embodiment 26, the objects can be separated with an operation suitable for the natural human sense, that is, tracing the area to be cut out in the selected object.

Embodiment 27

Separating Object (fifteenth and seventeenth inventions)

FIGS. 60A through 60E are explanatory diagrams showing examples of displaying and operating of objects in a separating process of the object for the embodiment 27. As shown In FIGS. 60A and 60B, the user selects the character string object N with a single clicking of the mouse 25. The selected object N is colored. Then, as shown in FIG. 60C, the user moves the mouse cursor on the character string in the condition of the L button down of the mouse 25 within the selected object N and conducts the L button up on the character string. In this case, the system gives a different color to the character string on which the cursor moves in the L button down condition as shown in FIG. 60D, and conducts the displaying process. Then, when the user drags and drops the character string out of the object with the mouse 25 as shown in FIG. 60E, the object is separated into a plurality of objects. The system divides the character string object N, as shown in FIG. 60F, and conducts the displaying process.

Figure 61:
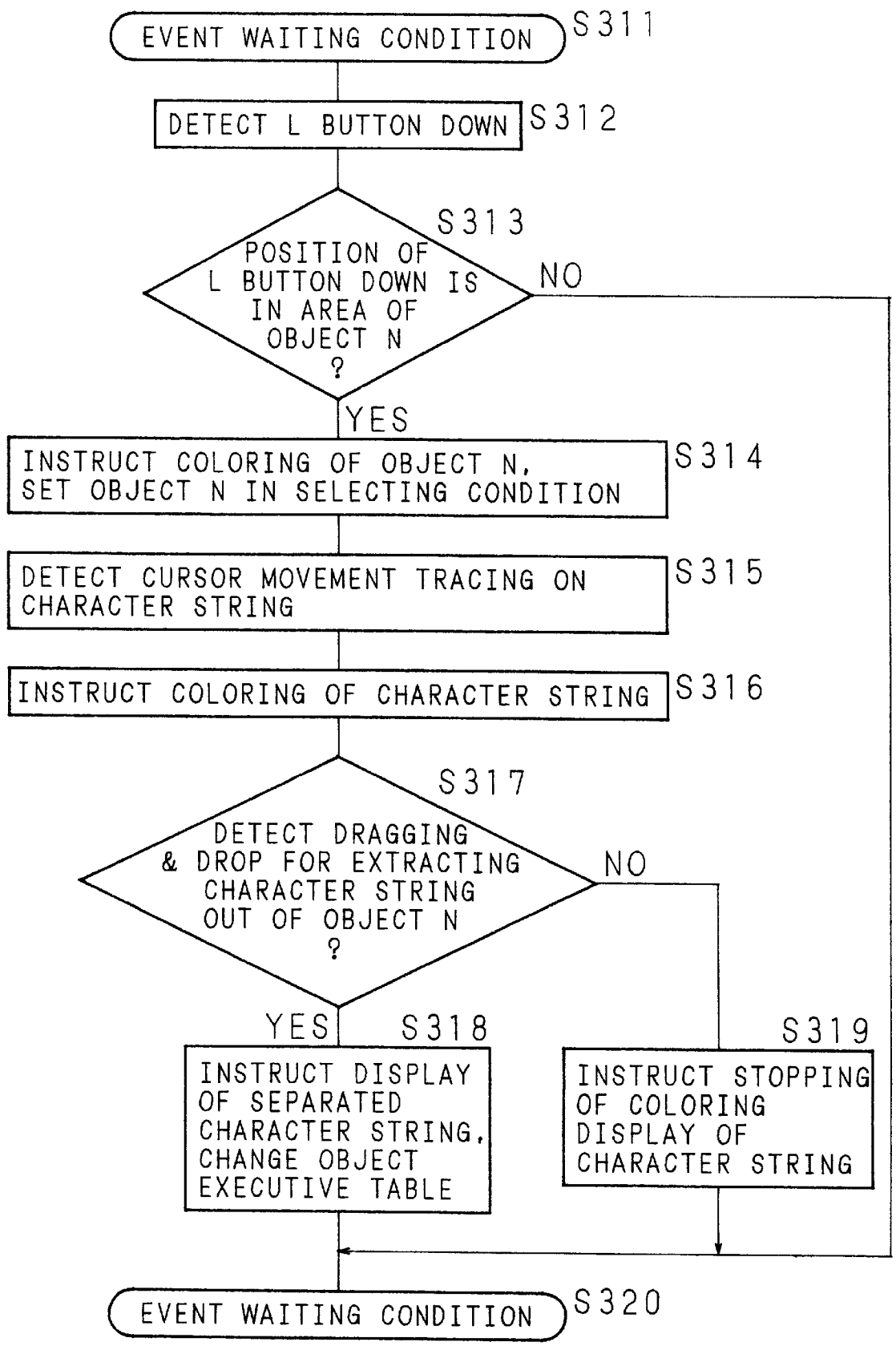
FIG. 61 is a flow chart showing a procedure for the separating process (embodiment 27)

FIG. 61 is a flow chart showing the processing procedure for the embodiment 27. In the event waiting condition (S311), the L button down of the mouse 25 is notified from the interface unit 13 (S312). Referring to the object executive table 12, it is judged (S313) whether or not the position of the L button down is in the area of the object N. When it is not in the area of the object N (at S313, NO), the condition becomes the event waiting condition (S320). When it is in the area of the object N (at S313, YES), an instruction is issued to the object display unit 11 that the object N should be colored and displayed, and the object N is selected (S341) in the object executive table 12. The cursor movement of the L button down is notified from the interface unit 13, and it is detected (S315) that the cursor has to trace a character string within the object N. An instruction is issued (S316) to the object display unit 11 that a color different from that of the object should be given to the traced character string. The drag and drop operations are notified from the interface unit 13. It is judged (S317) whether or not the operation is one for moving the selected character string in the object N out of the object N. When it is such an operation (at S317, YES), an instruction is issued to the object display unit 11 to separate the character string selected within the object N and display it. Also, the registration contents of the object executive table 12 is changed (S318) and the condition becomes the event waiting condition (S320). On the other hand, when it is not the operation (at S317, NO), an instruction is issued (S319) to the object display unit 11 to stop the color displaying process of the character string, and the condition is changed into the event waiting condition (S320).

In the embodiment 27, the object can be separated with an operation suitable for the natural human sense, that is tracing the area to be cut out in the selected object and moving it out the object.

Embodiment 28

Separating Object (fifteenth and seventeenth inventions)

Figure 62C:
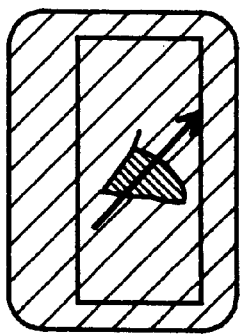
FIGS. 62A through 62F are explanatory diagrams showing examples of displaying and operating of objects in an object separating process (embodiment 28)
Figure 62F:
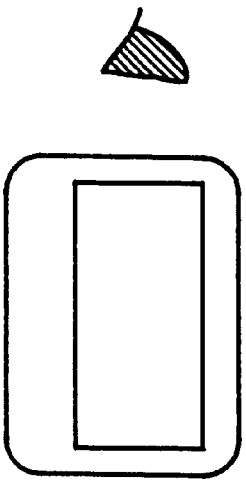
Figure 62B:
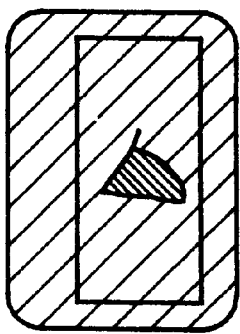
Figure 62E:
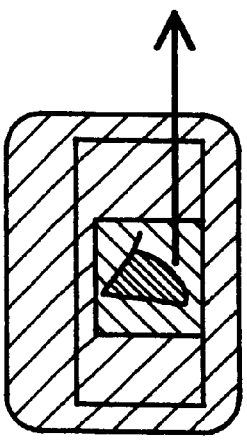
Figure 62A:
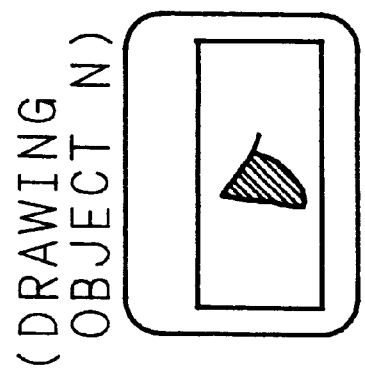
Figure 62D:
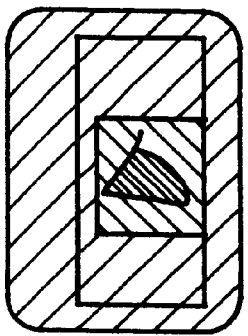

FIGS. 62A through 62F are explanatory diagrams showing examples of displaying and operating of objects in a separating process of the object for the embodiment 28. As shown In FIGS. 62A and 62B, the user selects a drawing object N with a single clicking of the mouse 25. The selected object N is colored. Then, as shown in FIG. 62C, the mouse cursor is moved with the L button down of the mouse 25 within the selected object N, the L button up is conducted within the same object N, and a rectangular area with the position of the L button down and the position of the L button up being respectively diagonal. In this case, the system displays the rectangular area within the object N in a different color from that of the object N as shown in FIG. 62D. Then, when the user drags and drops the colored rectangular area out of the object with the mouse 25 as shown in FIG. 62E, a component of the object included in the rectangular area is separated from the object N. As shown in FIG. 62F, the system divides the object N and conducts displaying process. The components of the object to be selected may be character strings or graphics.

Figure 63:
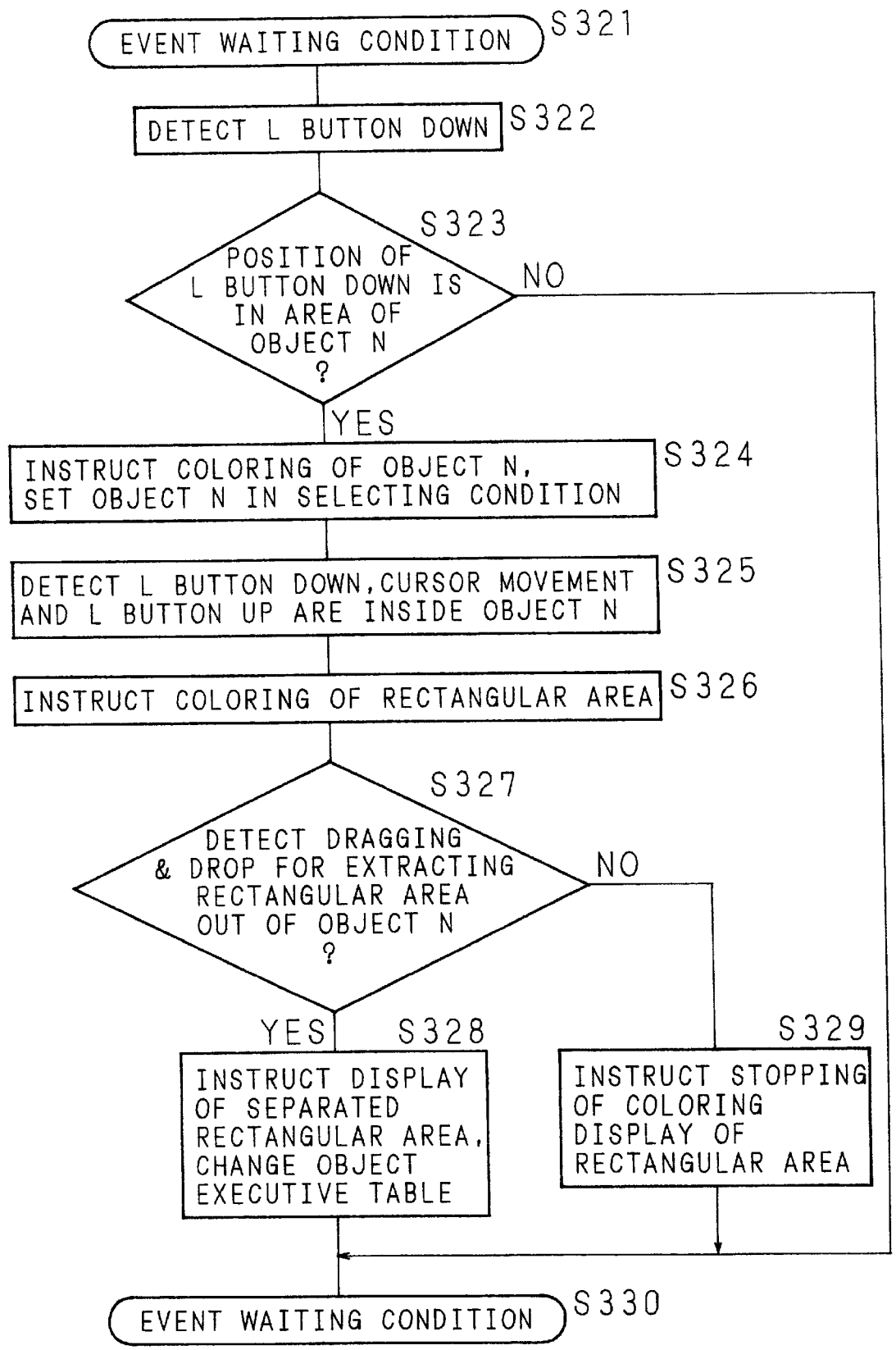
FIG. 63 is a flow chart showing a procedure for the separating process (embodiment 28)

FIG. 63 is a flow chart showing the processing procedure for the embodiment 28. In the event waiting condition (S321), the L button down of the mouse 25 is notified from the interface unit 13 (S322). Referring to the object executive table 12, it is judged (S323) whether or not the position of the L button down is in the area of the object N. When it is not in the area of the object N (at S323, NO), the condition becomes the event waiting condition (S330). When it is in the area of the object N (at S323, YES), an instruction is issued to the object display unit 11 that the object N should be colored and displayed, and the object N is selected (S324) in the object executive table 12. The L button down, cursor movement, and the L button up are notified from the interface unit 13, and it is detected (S325) that the either of the L button down position or the L button up position is within the object N. An instruction is issued (326) to the object display unit 11 that a color different from that of the object should be given to the rectangular area with the L button down position and the L button up position being diagonal. The drag and drop operation is notified from the interface unit 13, and it is judged (S327) whether or not the operation is for moving the rectangular area selected in the object N out of the object N. When it is such an operation (at S327, YES), an instruction is issued to the object displaying unit 11 to separate the component of the object included in the rectangular area selected within the object N and conducts the displaying process. Also, the registration contents of the object executive table 12 are changed (S328) and the condition becomes the event waiting condition (S330). On the other hand, when it is not the operation (at S327, NO), an instruction is issued to the object display unit 11 to stop the color displaying process of the rectangular area (S329) and the condition changes into the event waiting condition (S330).

In the embodiment 28, the objects can be separated with an operation suitable for the natural human sense, that is, specifying the area desired to be cut out in the selected object with a rectangle and moving it out of the object.

Embodiment 29

Separating Connected Objects (seventeenth invention)

FIGS. 64A through 64E are explanatory diagrams showing examples of displaying and operating of objects in a separating process of the objects for the embodiment 29. As shown In FIGS. 64A and 64B, the user selects a character string object P having character strings in a plurality of lines with a single clicking of the mouse 25. The character string object P is an object made by two objects M and N combined as shown in the registration contents of the object executive table 12 of FIG. 32. As shown in FIG. 64C, the system displays each of the original objects connected within the selected object P in a color different from each other. In this condition, when the user makes a double clicking on the area close to the boundary (for example, within 10 dots from the boundary) of the color, as shown FIG. 64D, the system divides the object P into the original object M and N at the boundary, and displays them.

Figure 65:
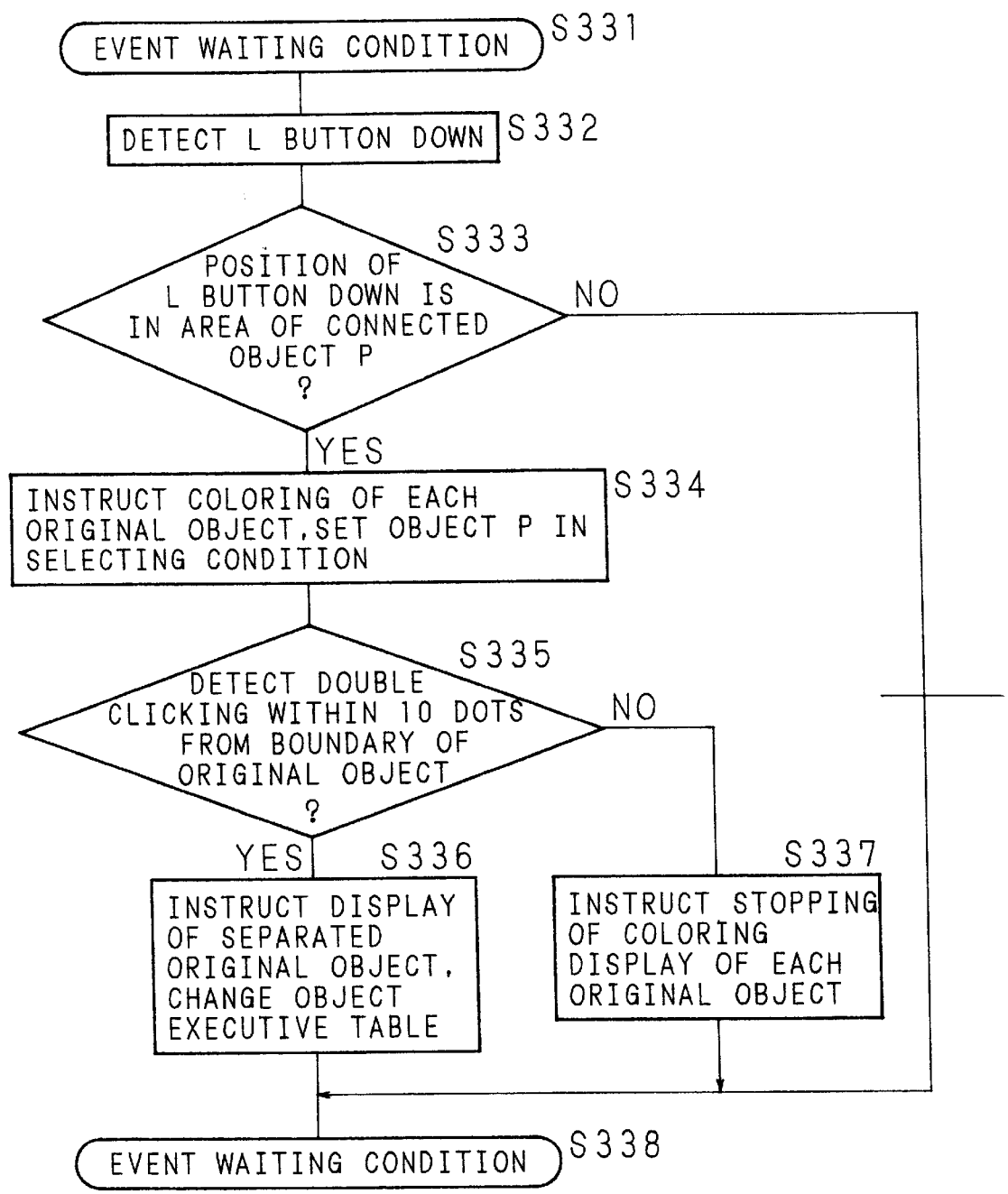
FIG. 65 is a flow chart showing a procedure for the separating process (embodiment 29)

FIG. 65 is a flow chart showing the processing procedures for the embodiment 29. In the event waiting condition (S331), the L button down of the mouse 25 is notified from the interface unit 13 (S332). Referring to the object executive table 12, it is judged whether the position of the L button down is in the area of the either object, and (S333) whether or not the object P is composed of a plurality of original objects. When it is not in the area of the object N (at S333, NO), the condition becomes the event waiting condition (S338). When it is in the area of the object N (at S333, YES), an instruction is issued to the object display unit 11 to display each of the original objects in the area of the object P in different colors, and the object P is selected (S334) in the object executive table 12. A double clicking is notified from the interface unit 13 and it is judged whether or not the position of the double click is within ten dots from the original object boundary of the object P (S335). When the position is within ten dots (at S335, YES), an instruction is issued to the object display unit 11 to separate the object P into the original objects M and N and display them, and the condition is chanced to the event waiting condition (S338) by changing the registration contents of the object executive table 12 (S336). When the position is not within ten dots (S335, NO), an instruction is issued (S337) to the object display unit 11 to stop displaying each of the original objects of the object P in a color different from each other, and the condition is changed to the event waiting condition (S338).

The embodiment 29 is effective when the object which has been connected is required to be restored to the original condition.

Embodiment 30

Separating Connected Objects (sixteenth invention)

FIGS. 66A through 66E are explanatory diagrams showing examples of displaying and operating of objects in a separating process of the objects for the embodiment 30. In the embodiment 30, the connected object and the object not connected are displayed in different colors. For example, as shown in FIG. 66A, the color of the object P made by connecting a plurality of objects M and N is different from the color of the object O which is originally a single object when the system displays each object. As the operations (FIGS. 66B through 66E) for separating the connected object P into the original objects M and N and displaying them is the same as the operations (FIGS. 64B through 64E) in the aforementioned embodiment 29, the description thereof is omitted. Also, the processing procedures of the embodiment 30 are the same as the processing procedures (see FIG. 65) of the embodiment 29.

The embodiment 30, in addition to the effects of the embodiment 29, has an effect of making the user recognize the connected object clearly.

Embodiment 31

Erasing Objects (seventeenth invention)

FIGS. 67A through 67D are explanatory diagrams showing examples of displaying and operating of objects in a erasing process of the objects for the embodiment 31. First, the user selects a pointing device having an erasing function. For example, the display area for adding the erasing function with the mouse 25 is selected with a single clicking to provide the mouse cursor with the erasing function. As disclosed in Japanese Patent Application Laid-Open No. 59-266, (1984), a pointing device can be used, which is capable of the pointing operation with an eraser function when it is removed from the specified retaining position and the sweeping operation on the screen is conducted. As shown in FIG. 67B, the system has a plurality of (six in the present example) blocks set for erasing with respect to a drawing object N shown in FIG. 67A. However, the blocks are not displayed. As shown in FIG. 67C, the user moves the mouse cursor onto the area of the object N with the use of the mouse 25 having the erasing function to point the block to be erased. On this case, the block may be directly pointed or may be pointed inside from the outside of the area. As shown in FIG. 67D, the system erases the drawing information existing in the block pointed with the mouse cursor and display the object. The object information managed by the object executive table 12 is re-constructed in a condition where the information within the pointed block has been erased. In the case of a character string object, the block may be constructed with a character unit.

Figure 68:
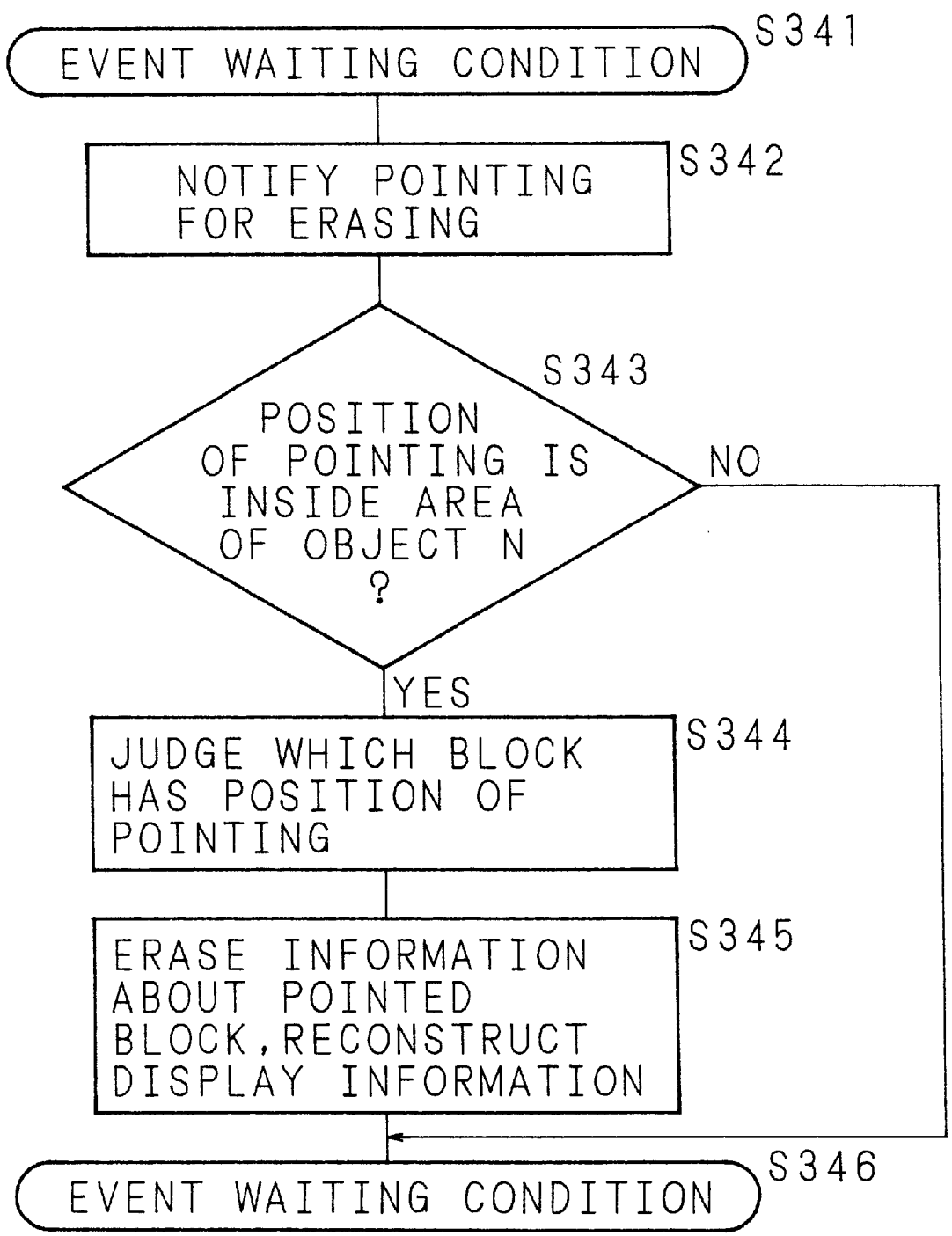
FIG. 68 is a flow chart showing a procedure for the erasing process (embodiment 31)

FIG. 68 is a flow chart showing the processing procedures for the embodiment 31. In the event waiting condition (S341), the pointing of the mouse 25 is notified from the interface unit 13 (S342). Referring to the object executive table 12, it is judged (S343) whether or not the position of the pointing is in the area of the object N. When it is not in the area of the object N (at S343, NO), the condition becomes the event waiting condition (S346). When it is in the area of the object N (at S343, YES), it is checked (S344) which block of the object N the position of the pointing exists in, and an instruction is issued to the object display unit 11 to erase the information existing in the pointed block. Also, in the object executive table 12, the display information is re-constructed (S345) to be in a condition where information existing in the pointed block is erased, and the condition becomes the event waiting condition (S346).

In the embodiment 31, the user can partially erase the display of the object by the above operation. As disclosed in the prior art, Japanese Patent Application Laid-Open No. 6-44006 (1994), the recognition of the user cannot catch up with the display of erasure when the object is removed at a time and unsatisfactory feelings may be caused. In the present invention, the aforementioned points are improved, making the erasing operation closer to an erasing operation with an actual blackboard eraser.

Embodiment 32

Editing Process Using an Operation Box
(eighteenth invention)

Figure 69A:
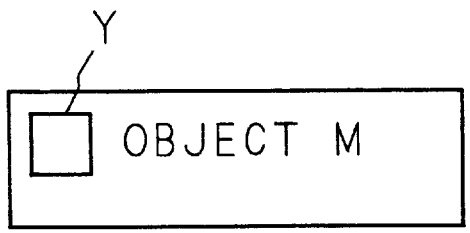
FIGS. 69A through 69C are explanatory diagrams showing examples of displaying and operating of objects in an object connecting process (embodiment 32)
Figure 69B:
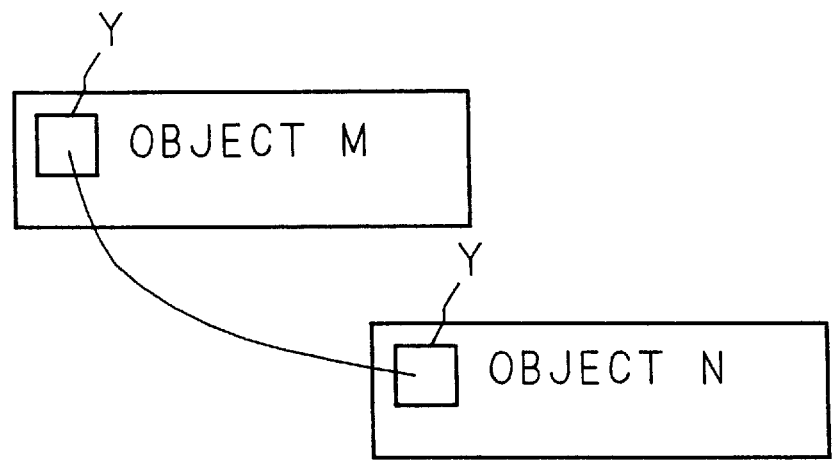
Figure 69C:
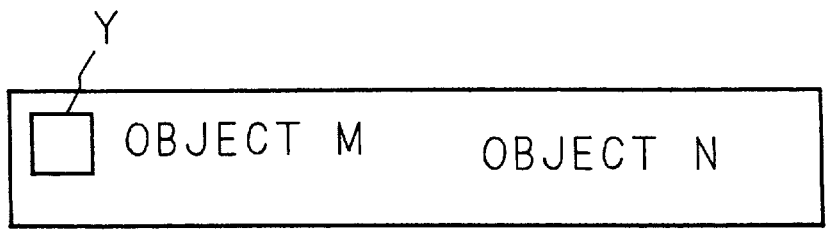

In the embodiment 32, the system displays an object with an operation box being buried in the display thereof. When the user conducts a pointing operation for connecting the operation boxes of a plurality of objects, the system displays with theses objects being connected. At this time, the objects pointed later are connected after the object pointed earlier, in accordance with the order of the pointing. In the case of the mouse, the connecting process is conducted in such a manner that the object on which the L button down is effected is connected before the object on which the L button up is effected. FIGS. 69A through 69C are explanatory diagrams showing examples of displaying and operating of objects in connecting process of the objects for the embodiment 32. As shown in FIG. 69A, the system displays, together with an object, a rectangular operation box Y being provided at the upper left position of each object M and N. As shown in FIG. 69B, the user conducts the pointing operation for connecting the operation box Y of the object M with the operation box Y of the object N with the use of the mouse 25. Then the system connects the object N after the object M and conducts the displaying process as shown in FIG. 69C.

Figure 70:
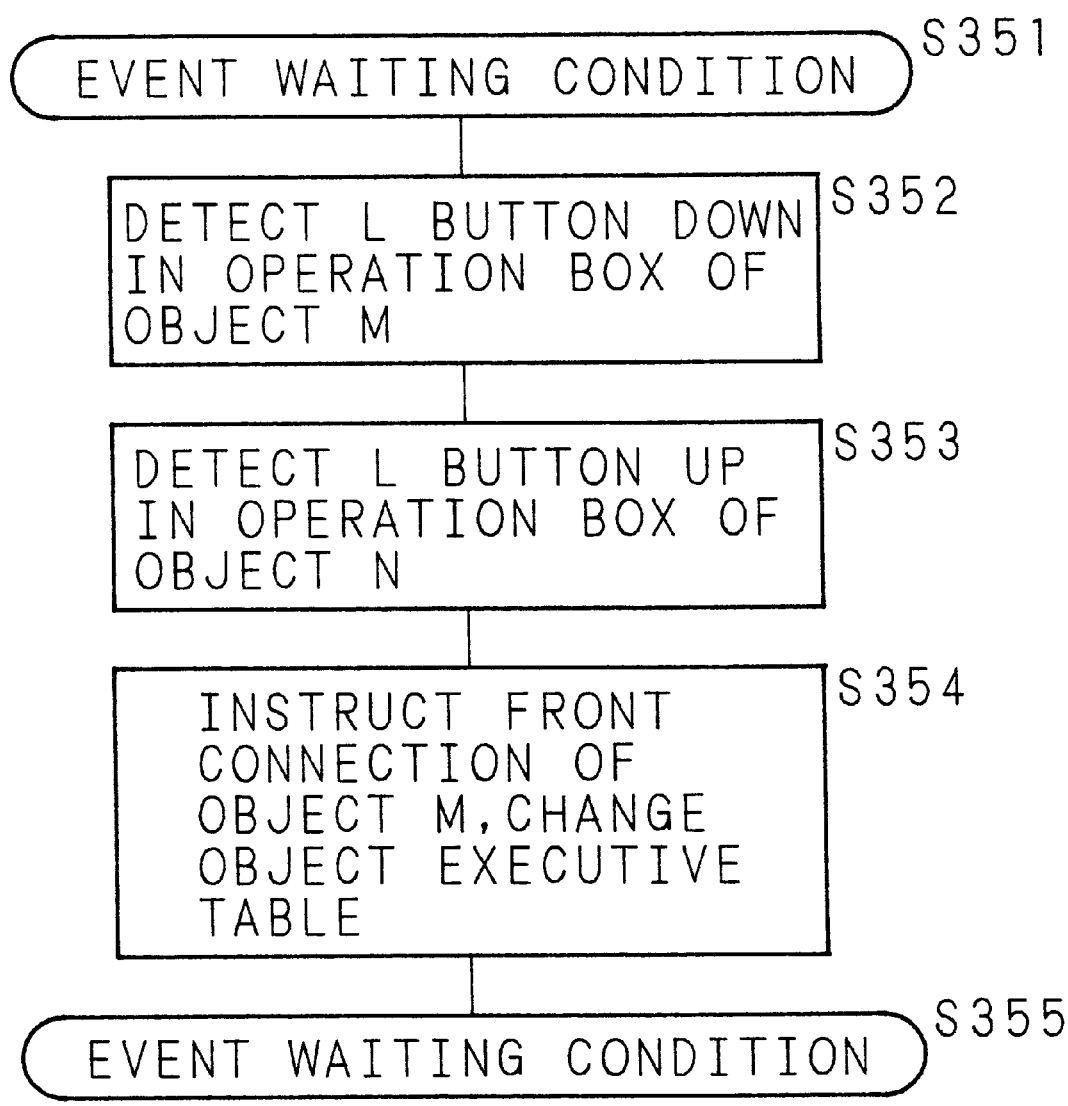
FIG. 70 is a flow chart showing a procedures for the connecting process (embodiment 32)

FIG. 70 is a flow chart showing the processing procedures for the embodiment 32. In the event waiting condition (S351), the L button down of the mouse 25 is notified from the interface unit 13. It is detected that the position of the L button down is the operation box Y of the object M (S352). The L button up is notified from the interface unit 13 and it is detected (S353) that the position of the L button up is the operation box Y of the object N. An instruction is issued to the object display unit 11 to connect the object N after the object M and display them, and the registration contents of the object executive table 12 are changed (S354), and the condition is changed to the event waiting condition (S355).

In the embodiment 32, such an operation box is provided to suggest the user how to conduct a connecting operation. Also an interfering operation with the other object operation on the HI such as selection, movement or the like of the object is reduced, thus making the designing of the HI simpler.

Embodiment 33

Editing Process Using an Operation Box
(eighteenth invention)

Figure 71A:
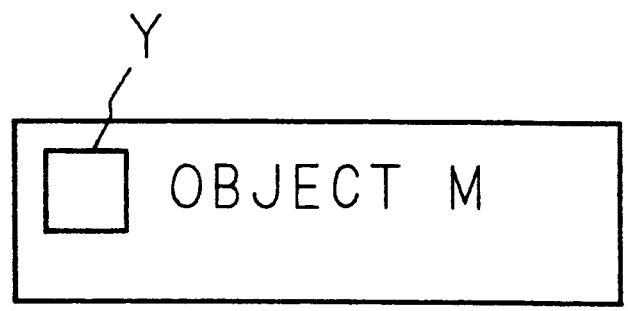
FIGS. 71A and 71B are explanatory diagrams showing examples of displaying and operating of an object in an object erasing process (embodiment 33)
Figure 71B:
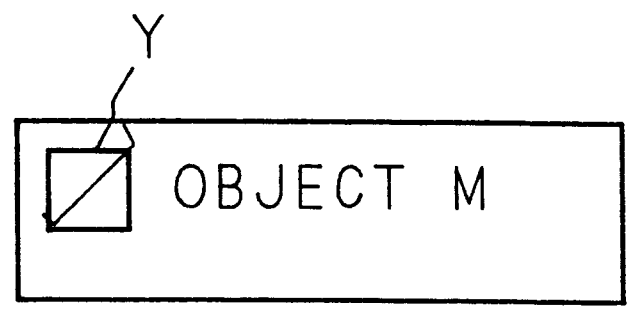

In the embodiment 33, the system displays an operation box embedded in the display of an object. When the user conducts a pointing operation, crossing the operation box in the display area of the object, the system erases the object. FIGS. 71A and 71B are explanatory diagrams showing examples of the displaying and operating of objects in the erasing process of the objects for the embodiment 33. As shown in FIG. 71A, the system displays, together with an object, a rectangular operation box Y being provided at the upper left position of the object M. As shown in FIG. 71B, the user conducts a pointing operation for crossing the operation box Y within the area of the object M with the use of the mouse 25. Then, the system erases the object M.

Figure 72:
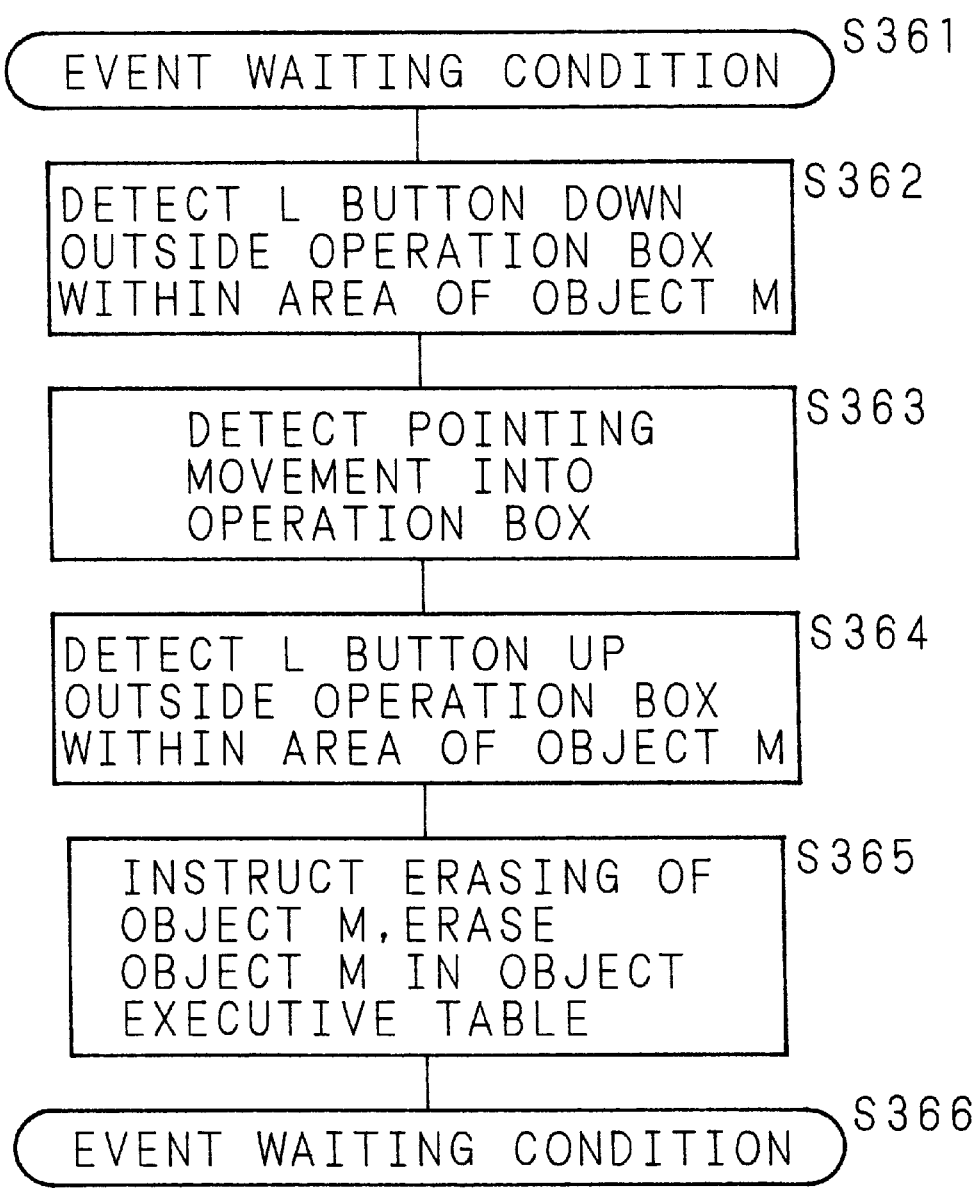
FIG. 72 is a flow chart showing a procedure for the erasing process (embodiment 33)

FIG. 72 is a flow chart showing the processing procedure for the embodiment 33. In the event waiting condition (S361), the L button down of the mouse 25 is notified from the interface unit 13. It is detected that the position of the L button down is within the area of the object M and on the outside of the operation box Y of the object M (S362). Also, the pointing movement with the L button down is notified from the interface unit 13 and it is detected that the pointing position is in the operation box Y of the object M (S363). Furthermore, the L button up is notified from the interface unit 13 and it is detected (S364) that the position of the L button up is within the area of the object M and outside of the operation box Y. An instruction to erase the object M is issued to the object display unit 11, and the object M is erased (S365) in the object executive table 12, thus making the condition the event waiting condition (S366).

In the embodiment 33, such an operation box is provided to suggest the user how to conduct the erasing operation, and the interfering operation on the HI with the other object operations such as selecting, moving operation of the objects is reduced, thus resulting in an effect of simplifying the designing of the HI.

Then, an editing process (embodiments 34 through 40) in which an erased object is restored and displayed again after being erased from the display will be described hereinafter.

FIG. 73 shows one example of the registration contents of the object executive table 12. The registration contents of the object executive table 12 has an object ID for specifying each object as in the aforementioned FIG. 30, a displaying positional data showing the coordinates of the initial display position of each object, an attribute data showing the classification as drawing pattern, character pattern and so on, and a condition data showing the classification as display or non-display in addition to the contents data showing the information contents of each object, and a non-display starting time data showing the time when the non-display condition starts. The "display" in the condition data shows the present displaying by the operation of the user, and the "non-display" shows the description in the past, but no displaying at present by the operation of the user. Also, the "non-display starting time" in the condition data is registered in the object in the non-display condition and shows the time when the non-display condition is set by the operation of the user.

Embodiment 34

Content Preserving of the Non-Display Object (nineteenth invention)

In the embodiment 34, to erase an optional object displayed, the user moves the cursor with the mouse 25 with the object erasing mode being set. In this case, the coordinates information of the cursor is notified from the interface unit 13. When the cursor reaches the area of the object to be erased in a condition where the L button of the mouse 25 is depressed, the condition of the object is changed from the "display" into the "non-display". The registration contents of the object executive table 12 of the object is also changed into the "non-display" and the object is erased from the display 22. But the contents of the object remains preserved in the object executive table 12.

Figure 74A:
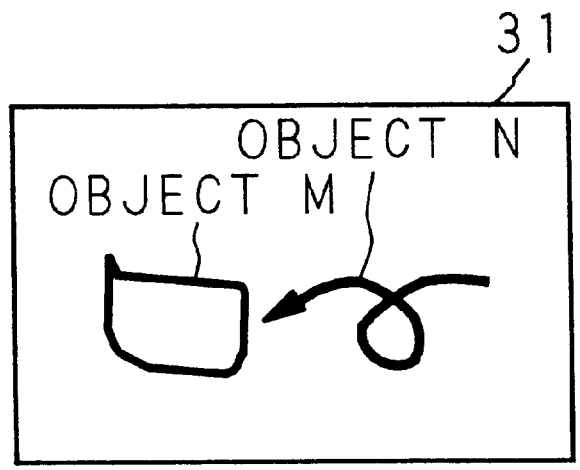
FIGS. 74A and 74C are explanatory diagrams showing examples of displaying and operating of objects in an object erasing and restoring process (embodiment 34)
Figure 74B:
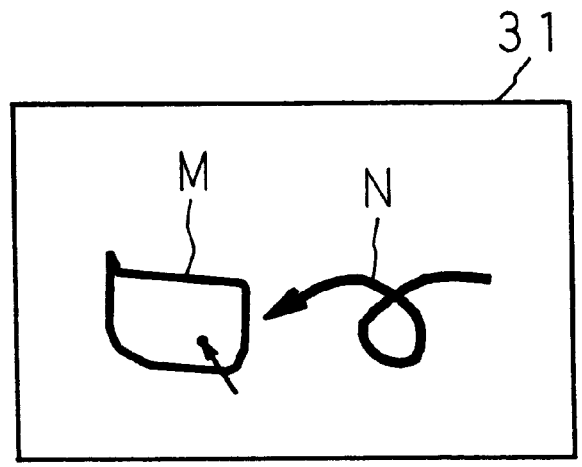
Figure 74C:
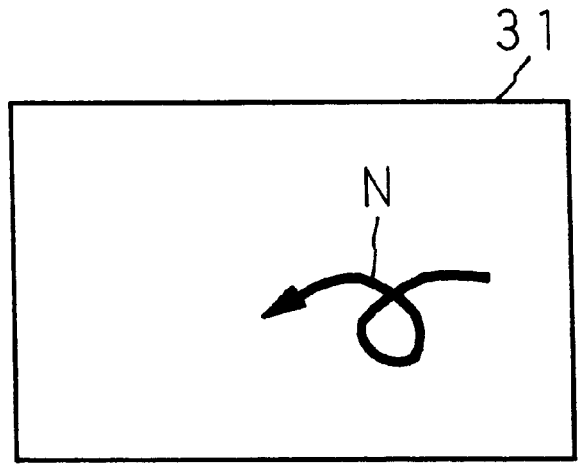

FIGS. 74A through 74C are explanatory diagrams showing examples of displaying and operating in erasing process of the objects for the embodiment 34. As shown in FIG. 74A, within the display area 31 of the display 22 exist a closed loop object M and an arrow mark object N. In the object erasing mode, when the user reaches the area of the object M in a condition where the L button of the mouse 25 is depressed as shown in FIG. 74B, the object M is selected into the non-display condition. As shown in FIG. 74C, the object M is erased from the display area 31. In this case, the condition data in the object executive table 12 of the object M is changed from the "display" to the "non-display", and the contents of the object M is preserved without being deleted from the object executive table 12.

Figure 75:
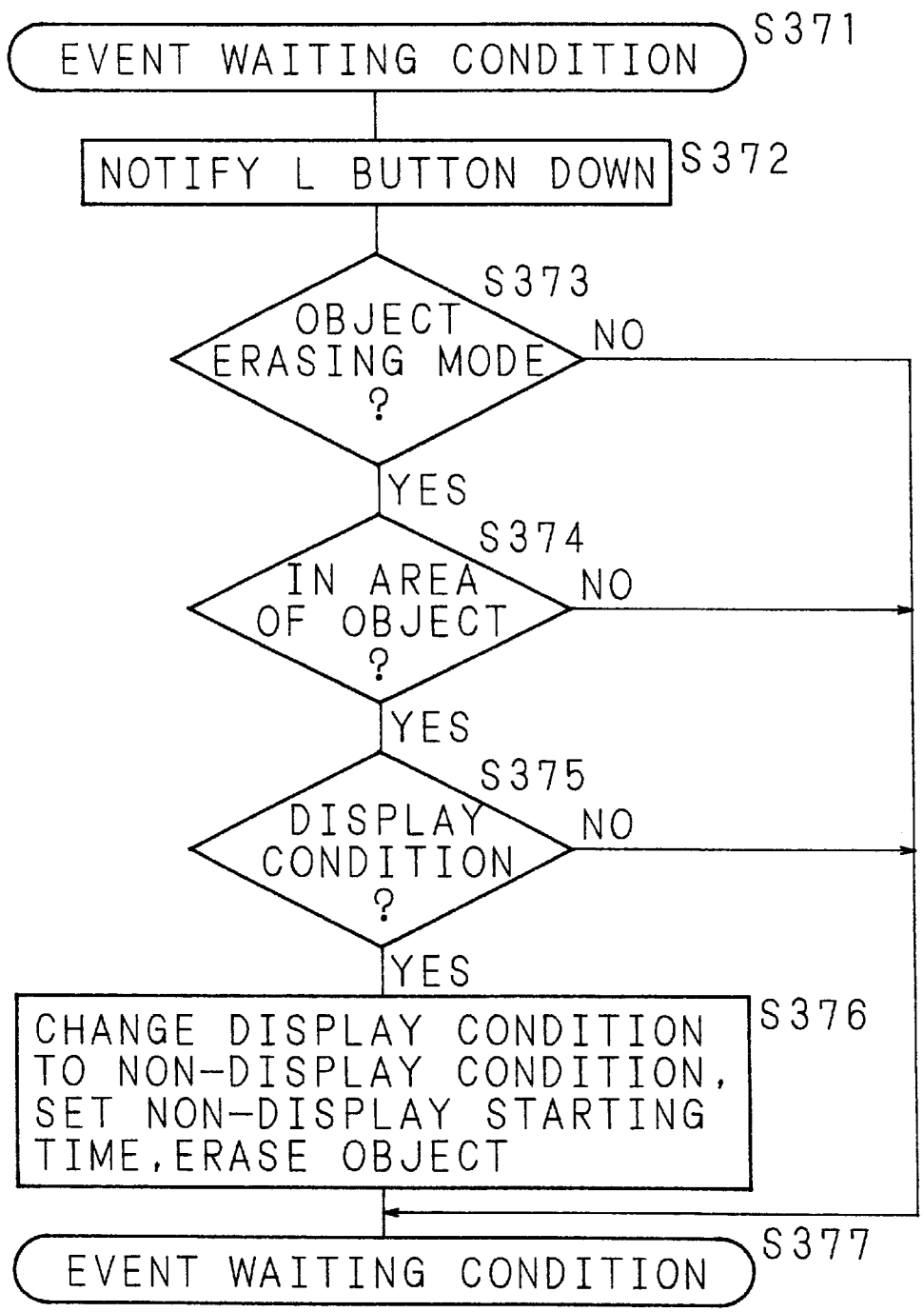
FIG. 75 is a flow chart showing a procedure for the erasing and restoring process (embodiment 34)

FIG. 75 is a flow chart showing the processing procedure for the embodiment 34. In the event waiting condition (S371), the L button down of the mouse 25 is notified from the interface unit 13 (S372). It is judged whether or not the present mode is the object erasing mode (S373). In the object erasing mode, it is judged (S374) whether or not the L button down is in the area of an either object, referring to the data of the display position of the object executive table 12. When it is in the object area, it is judged (S375) whether or not the object is in the present displaying condition. When it is in the displaying condition, the condition data of the object in the object executive table 12 is changed from the "display" into the "non-display" and the time is set in the non-display starting time. Also, the object display unit 11 is controlled, and the display of the object is erased (S376). Then, the condition becomes the event waiting condition (S377). On the other hand, when the response is NO in either of the S373, S374 and S375, the condition becomes the event waiting condition (S377).

In such erasing process, the quick reuse of the object once erased can be conducted, because the contents of the erased object are preserved.

Embodiment 35

Restoring of Objects (twentieth invention)

In the embodiment 35, the object once erased is restored and displayed again. To conduct such a re-displaying process, the user sets the object restoration mode. The object restoring mode is a mode for restoring the object which is erased from the display 22 but preserved in the project executive table 12 and conducting the displaying process again. When the user moves a cursor, with the L button of the mouse 25 being depressed, to the position where the object in the non-display condition was once displayed, namely, when the coordinates notified from the interface unit 13 are included in the area of the object in the non-displaying condition, the condition of the object in the object executive table 12 is changed from the "non-display" to the "displays". The object is displayed again on the display 22.

Figure 76A:
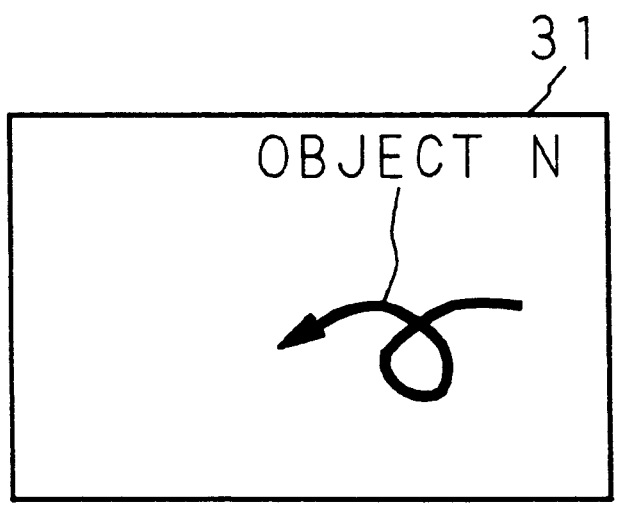
FIGS. 76A and 76C are explanatory diagrams showing examples of displaying and operating of objects in an object erasing and restoring process (embodiment 35)
Figure 76B:
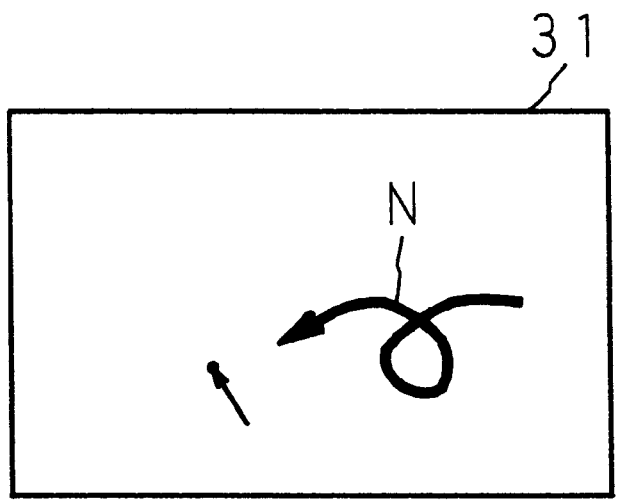
Figure 76C:
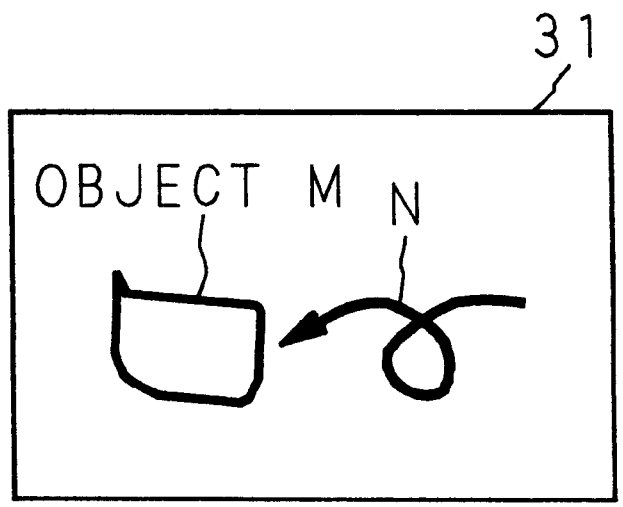

FIGS. 76A through 76C are explanatory diagrams showing examples of displaying and operating of objects in the erasing process of the objects for the embodiment 35. As shown in FIG. 76A, only the arrow mark object N is displayed within the display area 31 of the display 22. The closed loop object M was once displayed in the left side area from the object N within the display area 31, but is erased at present. When the cursor reaches the area where an object A was displayed in a condition where the user depresses the L button of the mouse 25 as shown in FIG. 76B, in the object restoring mode, the object M is restored into the displayed condition. As shown in FIG. 76C, the object M is restored and is displayed again at the same position within the displaying area 31 where it was once displayed. In this case, the condition data in the object executive table 12 of the object M is changed into the "display" from the "non-display".

Figure 77:
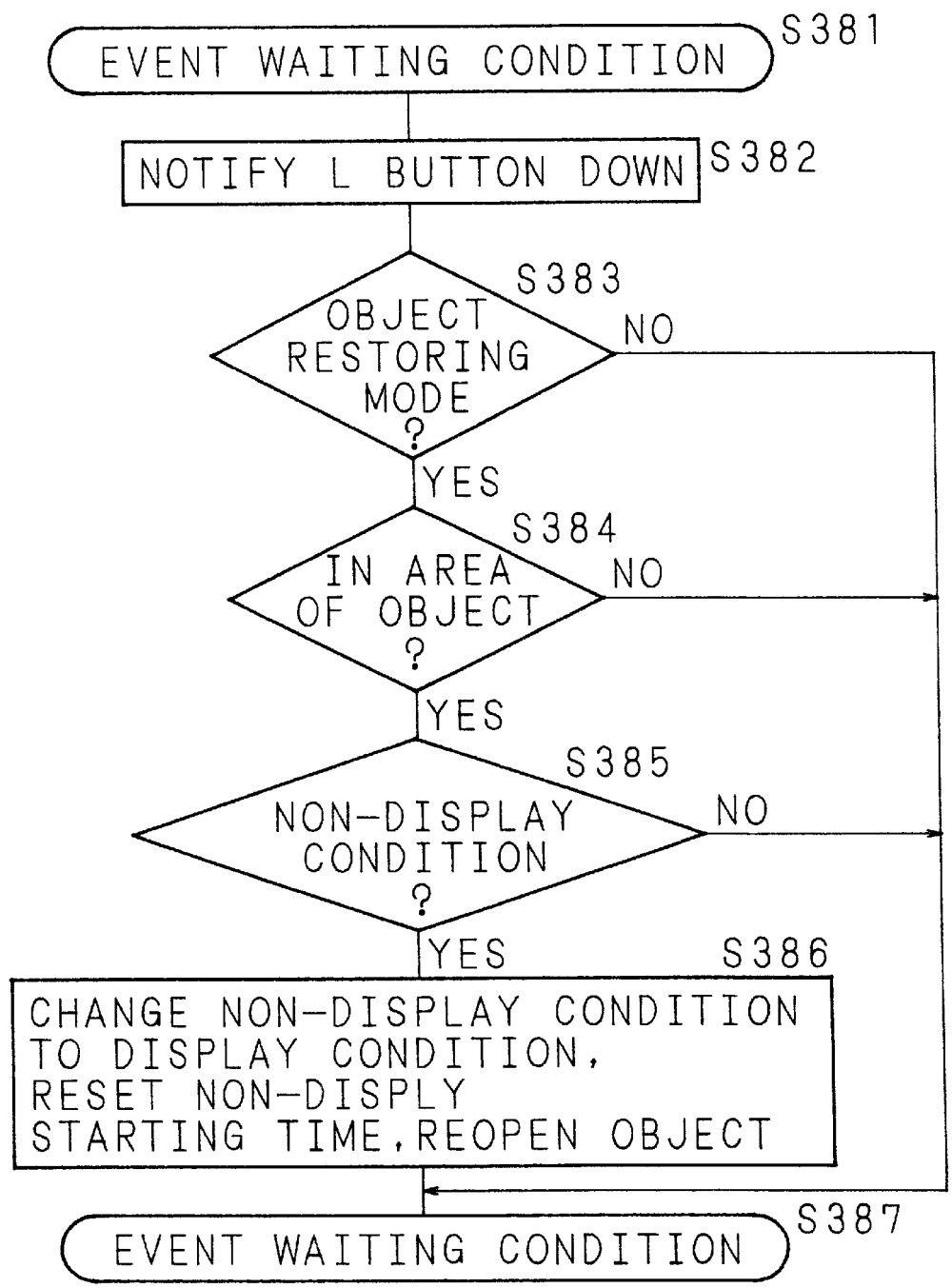
FIG. 77 is a flow chart showing a procedure for the erasing and restoring process (embodiment 35)

FIG. 77 is a flow chart showing the processing procedure of the embodiment 35. In the event waiting condition (S381), the L button down of the mouse 25 is notified (S382) from the interface unit 13. It is judged whether or not the present mode is the object restoring mode (S383). When it is the object restoring mode, it is judged whether or not it is in the area of an either object where the L button down is registered, referring to the data of the display position of the object executive table 12 (S384). When it is in the area thereof, it is judged (S385) whether or not the object is in the non-display condition at present, referring to the object executive table 12. When it is in the non-display condition, the condition data of the object in the object executive table 12 is changed into the "display" from the "non-display" and the non-display starting time registered is reset. And after the display of the object is re-opened (S386) by controlling the object displaying unit 11, the condition becomes an event waiting condition (S387). On the other hand, when the response is NO in either of S383, S384 and S385, the condition becomes the event waiting condition (S387).

In such a restoring process, the stored contents are read, and the object once erased is restored and is displayed again. When the object erased once is used for the editing process again by the user, the object is restored extremely quickly and is displayed again without making the contents of the object again.

Although the erasing and restoring process is conducted on the object-by-object basis in the aforementioned embodiment, it is possible to conduct the erasing and restoring process in finer units. FIG. 78 shows one example of the registration contents of the object executive table 12. Although the registration contents are the same as the registration contents shown in the aforementioned FIG. 73, the contents data, the condition data and the non-display starting time data are registered for each of strokes (lines). When such an object executive table 12 is provided, it is possible to conduct the erasing and restoring process on the stroke-by-stroke basis. For example, when a collection of characters forms one object, it is possible to erase or restore not only the whole object (the entire collection of the characters) but one character or even a portion of one character. When such an object executive table 12 as shown in FIG. 78 is provided, the other editing processing operation, of not only the erasing and restoring process but also the editing process such as aforementioned associating, connecting, separating and so on, can be conducted in finer units, in addition to on an object-by-object basis.

Embodiment 36

Erasing and Restoring of Objects (twenty-first invention)

In the embodiment 36, when the user changes the moving direction of a pen largely without releasing the pen immediately after erasing an optional object through a moving operation of the pen of the pen coordinate input apparatus 23, the object erased is restored and displayed again.

Figure 79A:
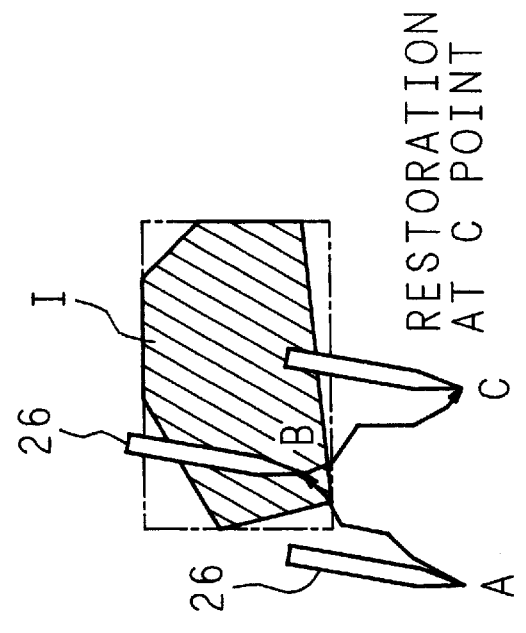
FIGS. 79A and 79C are explanatory diagrams showing examples of displaying and operating of objects in an object erasing and restoring process (embodiment 36)
Figure 79B:
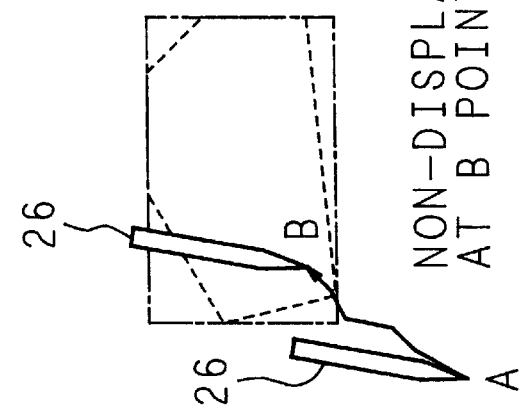
Figure 79C:
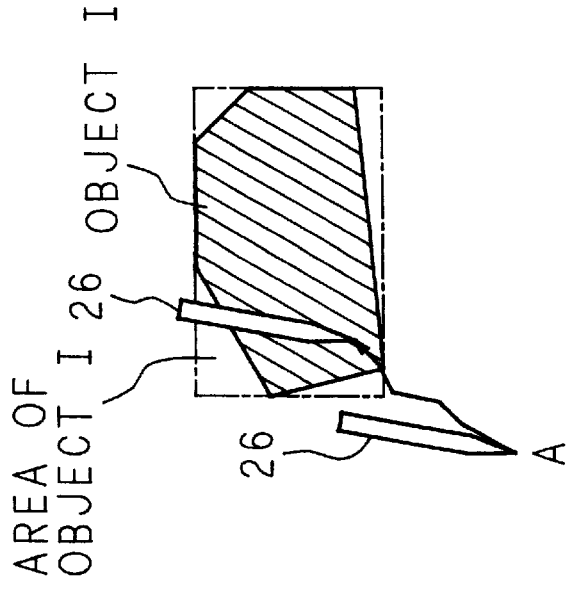

FIGS. 79A through 79C are explanatory diagrams showing examples of displaying and operating of objects in the erasing and restoring process for the embodiment 36. As shown in FIG. 79A, the closed loop object I is displayed. In a condition where an object erasing mode is set, the user enters into the object I from the A point with a pen 26 of the pen coordinate input apparatus 23. At a time point when a pen 26 reaches the B point within the object I, the object I is erased as shown in FIG. 79B. Thereafter, when the user changes the moving direction of the pen 26 at the B point, and moves it so far as to C point, the object I is restored and is displayed again as shown in FIG. 79C.

In such a process, the average movement vector (vector AB) from the A point to the B point is obtained when the object I is erased at the B point, and the average movement vector (vector BC) to the C point from the B point is obtained at a time point when the pen 26 moved from the B point to reach the C point. When the directions of both the vectors (vector AB and vector BC) are considerably different from each other, the moving operation of the pen 26 from the B point to the C point is considered as the restoring operation of the object I, and the object I is displayed again.

Figure 80A:
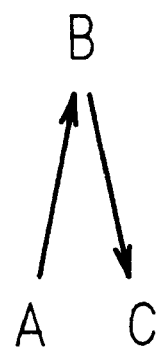
FIGS. 80A and 80B are diagrams showing the relationship between moving vectors of a pen in the embodiment 36.
Figure 80B:
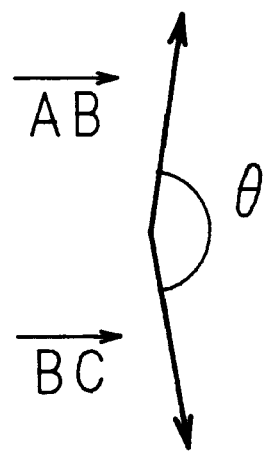

FIGS. 80A and 80B are diagrams showing the relationship between the two movement vectors. FIG. 80A shows the average movement of the pen 26 and FIG. 80B shows an angle formed by the two movement vectors. The considerable difference in the direction of both the vectors (vector AB and vector BC) means that an angle θ formed by the two vectors (vector AB and vector BC) shown in FIG. 80B exceeds the predetermined value. The angle θ formed by both the vectors (vector AB and vector BC) is obtained. When the value is the predetermined value (for example, 160 degrees) or more, the object once erased is displayed again.

To detect the angle formed by the movement vector of such a pen 26, the information on the coordinates of the positions for obtaining the movement vectors in the tracking followed by the pen 26, and the condition (up or down) of the pen at the positions, and so on is required. FIG. 81 is a table showing one example of the registration contents of the pointer information table where such information is registered. The registration contents of the pointer information table has the point data for specifying the position to obtain the movement vectors, the coordinates data showing the respective positions, the coordinate data showing the classification of the up and down of the pen 26 at the respective positions, and the non-display object data showing whether or not the non-object is caused in the respective positions. The "up" in the condition data shows that the pen 26 is separated from the input face of the pen coordinate input apparatus 23. The "down" shows that the pen 26 is not separated from the input face. The "null" in the non-display object data shows that the non-display object is not caused in the position. When the non-display object is caused, the number of the object is registered. A plurality of objects can enter non-display condition simultaneously at one point position. The information on the point position up to the position n number before the present point position is constantly registered in the pointer information table and the registration contents of the pointer information table is renewed one after another as time passes each time the pen 26 moves.

Figure 82:
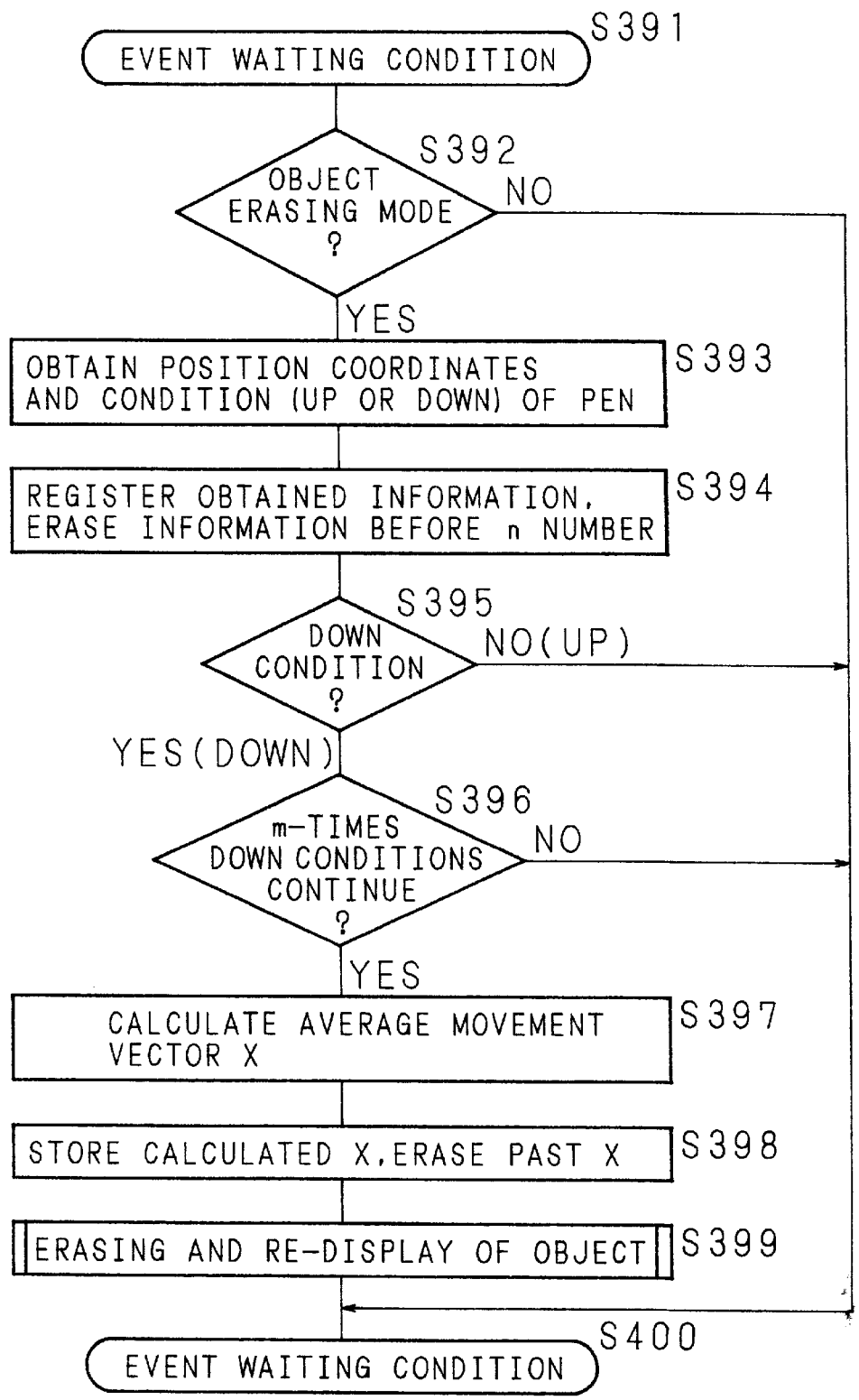
FIG. 82 is a flow chart showing a procedure for the erasing and restoring process (embodiment 36)
Figure 83:
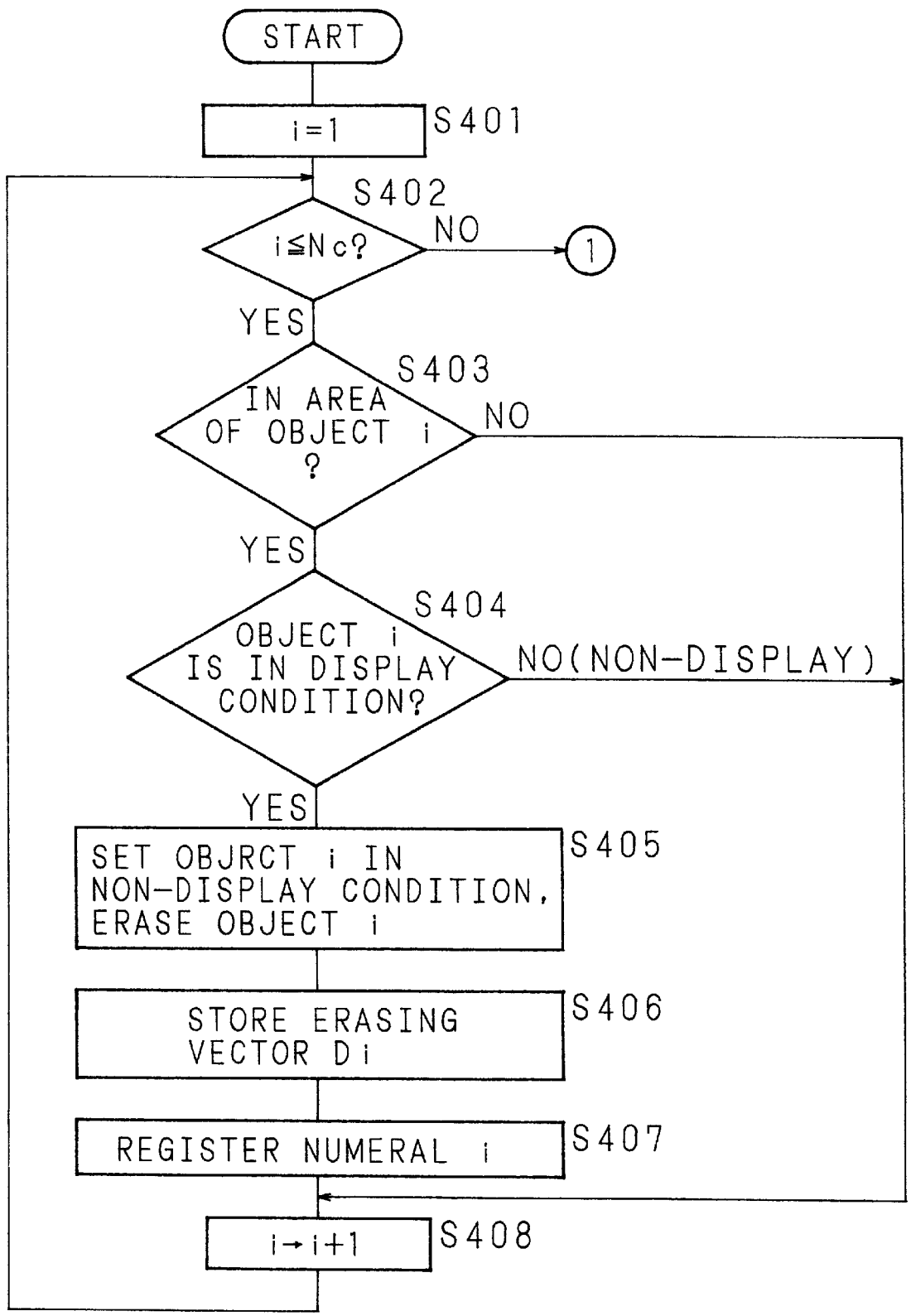
FIG. 83 is a flow chart showing a procedure for the erasing and restoring process (embodiment 36)
Figure 84:
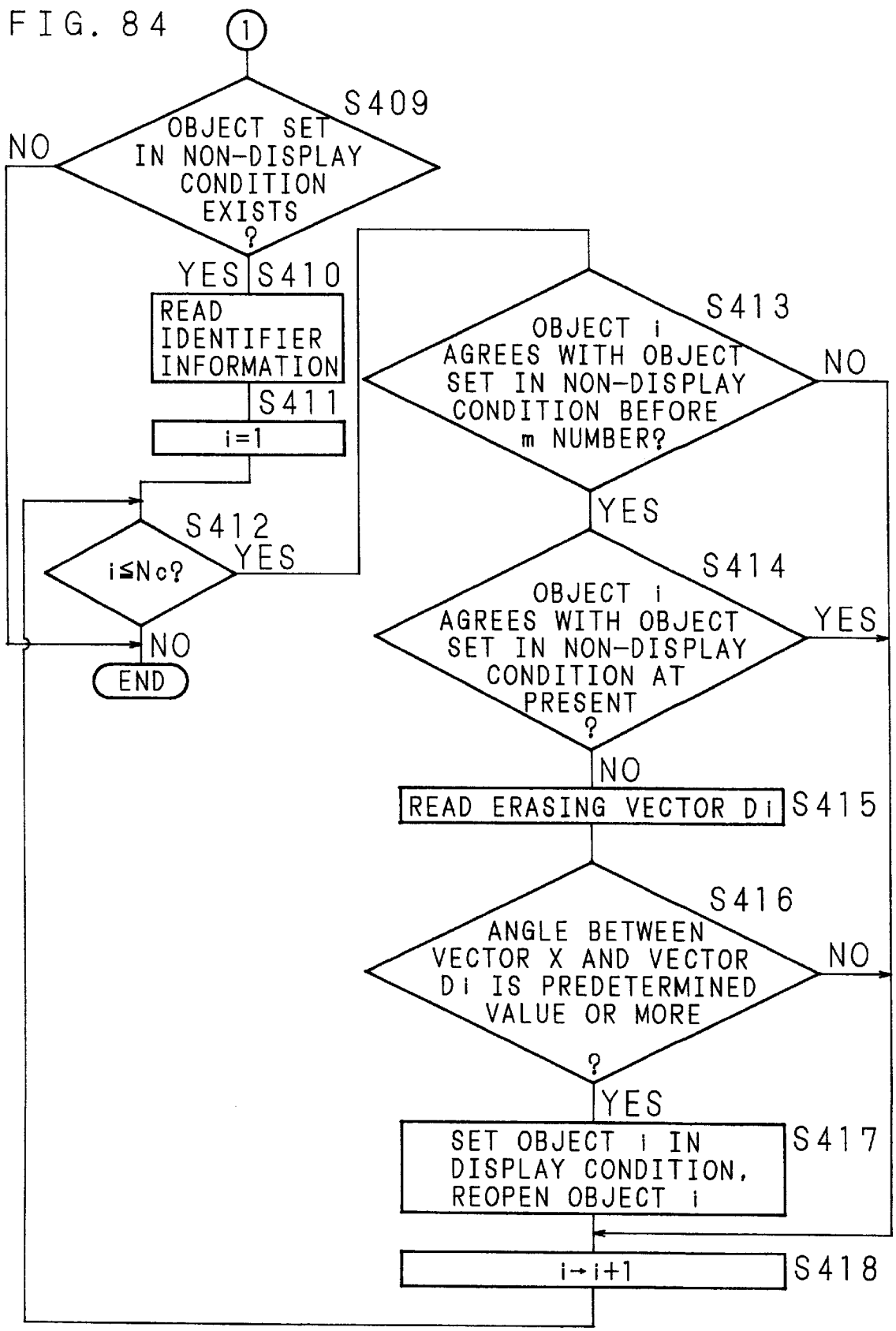
FIG. 84 is a flow chart showing a procedure for the erasing and restoring process (embodiment 36)

FIGS. 82 through 84 are flow charts showing the processing procedure for the embodiment 36. In the event waiting condition (S391), it is judged whether or not the mode is the present object erasing mode (S392). When the mode is the object erasing mode, the position coordinates and the condition (up and down) are obtained (S393) from the interface unit 13. The obtained information is registered in the pointer information table and the information on the point position n number before the present point position is erased from the pointer information table (S394). In this manner, the information on the continuing n number of pointer positions is normally registered in the pointer information table.

Then, it is judged whether or not the present pen 26 is in the down condition (S395). When it is in the down condition, it is judged (S396) whether or not the down condition of the pen 26 is continued in the point position m number (m≦n) before the present point position. When the down condition is continued, the average movement vector X of the pen 26 is calculated (S397) from the coordinate information on the m number of point positions. In this case, the average movement vector can be obtained from the coordinate value of the two point at both the ends, and the average movement vector can be obtained through averaging of the vector of the (m−1) between the point before the present point position m number and the other point. The calculated average movement vector X is stored and the past average movement vector X is erased (S398).

When the necessary conditions are satisfied, referring to the position information on the present pen 26, the calculated average movement vector X and so on, the erasing process of the displayed object or the re-display process of the erased object is conducted (S399). Then, the condition becomes the even waiting condition (S400). When the object erasing mode is not set at S396, when the pen 26 is in the up condition at S395, and when the down condition is not continued at S396, the condition becomes the event waiting condition (S400).

FIGS. 83 and 84 are flow charts showing the procedures for the subroutine of the S400 of FIG. 82, namely, the procedure for the erasing process of the objects or the re-display process of the object. Different numerals i (i=1, 2, ..., Nc:Nc is the total number of the present objects) are given to all the present objects. In the following description, the respective objects are managed with the numeral i and the object i denotes the object numbered i.

First, the i is set (S401) to 1 and the following procedure is conducted about the object given the numeral 1. It is judged whether or not the value of i is Nc or lower (S402). When the value is Nc or lower, it is judged (S403) whether or not the present point position of the pen 26 is in the area of the object i (S403). When it is in the area thereof, it is judged (S404) whether or not the object i is in the displaying condition at present. When it is in the displaying condition, the object i is put in the non-displaying condition, and the condition data of he object executive table 12 is changed into the "non-display" from the "display". Also, the object display unit 11 is controlled and the object i displayed in the display 22 is erased (S405). The average movement vector X at this time is stored as the erasing vector Di of the object i (S406). Furthermore, the numeral i of the object which entered the non-displaying condition at the present point position is registered in the pointer information table as an identifier (S407), and the procedure proceeds to S408. When the point position is not in the area of the object i at the S403, and the object i is in the non-display condition at S404, the procedure proceeds directly to S408.

The i is increased by 1 (S408), and the processing operation of the aforementioned S402 through S407 is effected about the object given a numeral 2. Thereafter, the i is increased (S408) again by 1. Likewise, the procedure S402 through S407 is conducted until the i exceeds Nc (S402:NO) while increasing the i by 1. Object which satisfies (YES at both S403 and S404) the conditions among all the objects is erased.

When the i exceeds Nc (S402:NO), it is judged (S409) whether or not the object which has been placed in the non-displaying condition at the point position m number before the present point position exists, referring to the pointer information table. When the object does not exist, the procedure is completed and the procedure goes back to the main routine of FIG. 82 and the condition becomes the event waiting condition (S400).

On the other hand, when the object exists at S409, the identifier information is read (S410). Then, the i is set into 1 again (S411), and the following procedure is conducted about the object given the numeral 1. It is judged whether or not the value of the i is the Nc or lower (S412). When the value of the i is Nc or lower, it is judged whether or not the object i agrees with the object which is placed in the non-displaying condition at the point position m number before the present point position (S413). When the objects agree with each other at S413, it is judged (S414) whether or not the object i agrees with the object which has entered the non-displaying condition in the present point position. When they do not agree with each other at S404, the erasing vector Di of the object i stored is read (S415). Then, it is judged (S416) whether or not an angle formed between the average movement vector X and the erasing vector Di read out is the predetermined value (160 degrees) or more. When the angle is 160 degree or more, the object i is placed in the displaying condition. The condition data of the object executive table 12 is changed into the "display" from the "non-display". The object display unit 11 is controlled and the displaying of the object i of the display 22 is resumed (S417) and the procedure goes to S418. When the object i does not agree with the object which has been put into the non-display condition in the point position m number before the present point position at S413, when the object i does not agree with the object which was put into the non-display condition at the present point position at S414 or when the angle is smaller than the predetermined value at S404, the procedure goes directly to S418.

The i is increased by 1 (S418), and the procedure of aforementioned S412 through S417 is effected about the object given a numeral 2. Thereafter, the i is increased again by 1 (S418). Likewise, the procedure of S412 through S417 is conducted until the i exceeds Nc (S412:NO) while increasing the i by 1. Objects among all the objects which satisfy (YES at both S413 and S416, NO at S414) the conditions are restored and displayed again. When the i exceeds Nc (S412:NO), the procedure is completed and goes back to the main routine of FIG. 82, and the condition is changed into the event waiting condition (S400).

The aforementioned procedure can be summarized as follows. The average movement vector X is calculated and renewed as the pen 26 moves from the point information on the point position n number before the present point (for example, C point of FIG. 79C). The conditions of renewing is that the pen 26 is down at the present pointer condition and at the point position m number before it. When the conditions of renewing are satisfied, it is then judged whether or not the present position of the pen 26 is in the area of the optional displayed object. When the position is in the area thereof, the operation is regarded as the erasing operation and the displayed object is erased, and the average movement vector at the erasing time is stored. To conduct the judging operation for re-displaying immediately judgment, after erasing, the erasing of the object at the present point position is registered in the pointer information table. Subsequently, it is judged whether or not the optional object is erased at the position m number before the present point position, namely, it is judged whether or not the present point position is equivalent to the position immediately after the object is erased. When there is an object which fulfills the requirements, the average movement vector of the object at the erasing operation is read and the present average movement vector is compared with the average movement vector thus read. When the direction thereof is considerably different, the object is displayed again to complete the procedure. The "immediately after" is assumed to be the point position m number after the present point position in the example.

In such a restoring process, the erased object can be displayed again by changing the moving direction of the pen immediately after the optional object is erased even if the mode has been set into the erasing mode so that the object erased by mistake can be restored without rewriting it.

Embodiment 37

Erasing and Restoring of Objects (twenty-first invention)

In the embodiment 37, when the user conducts a moving operation of the pen largely changed in the direction from that of the erasing operation in the area of the erased object after the optional object has been erased through the moving operation of the pen of the pen coordinate input apparatus 23, the erased object is restored and displayed again. The embodiment 37 is different from the aforementioned embodiment 36 in that the condition that the tracking of the pen continues and the condition that the operation conducted immediately after the erasing operation are not necessary to be satisfied in the re-displaying of the erased object. The pen should only be moved in such a direction that the angle formed by the moving vector in the erasing operation and the direction in which the pen is moved becomes the predetermined value or more.

Figure 85:
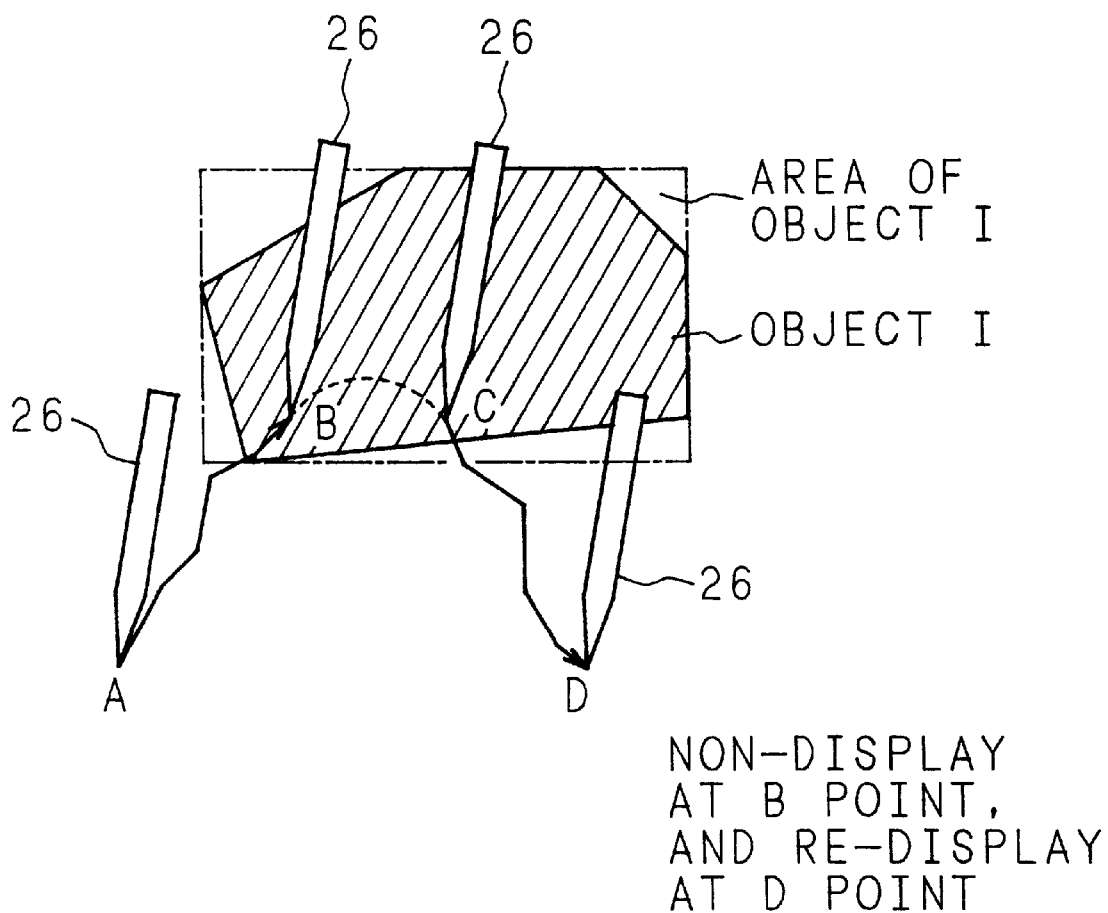
FIG. 85 is an explanatory diagram showing an example of displaying and operating of an object in an object erasing and restoring process (embodiment 37)

FIG. 85 is an explanatory diagram showing the example of displaying and operating of object in the erasing and restoring process of the object for the embodiment 37. In a condition where the closed loop object I is displayed and the mode is set into an object erasing mode, the user approaches the object I from the A point with the pen 26. At a time point when the pen 26 reaches the B point within the area of the object I, the object I is erased. When the user raises the pen 26 from the input screen, causes it to touch the screen at the C point in the area of the object I and moves it to the D point, the object I is restored and displayed again.

Figure 86:
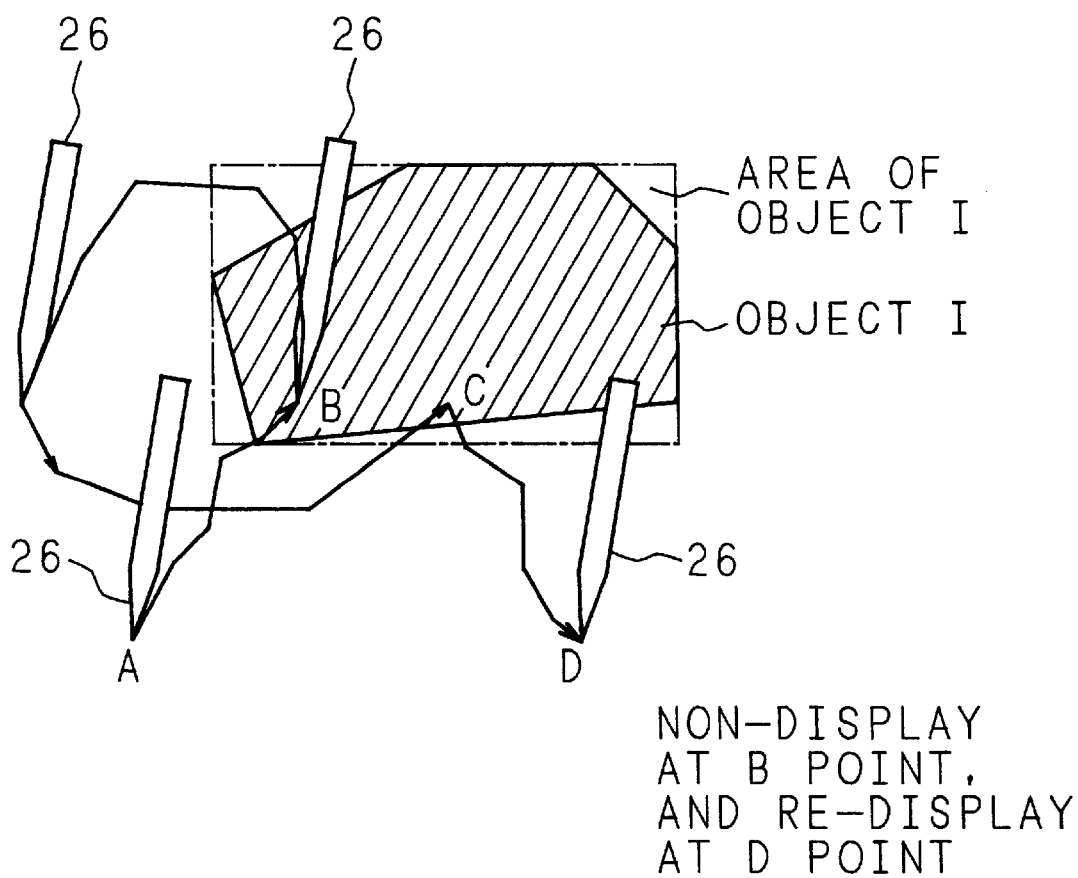
FIG. 86 is an explanatory diagram showing an example of displaying and operating of an object in an object erasing and restoring process (embodiment 37)

FIG. 86 is an explanatory diagram showing another example of displaying and operating of an object in the erasing and restoring process of the object for the embodiment 37. The closed loop object 1 is displayed and the mode is set into an object erasing mode. The user approaches the object L from the A point with the pen 26. At a time point when the pen 26 reaches the B point within the area of the object I, the object I is erased. When the user moves the pen 26 outside the area of the object I without raising it after the erasing operation and moves it to the D point via the C point in the area of the object I, the object I is restored and is displayed again.

Figure 87A:
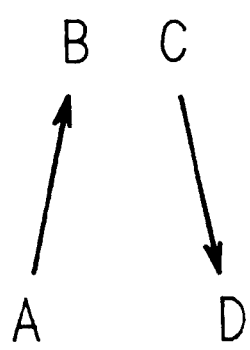
FIGS. 87A and 87B are diagrams showing the relationship between moving vectors of a pen in the embodiment 37.
Figure 87B:
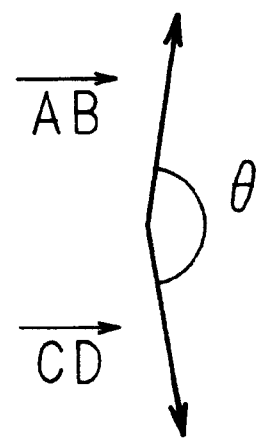

FIGS. 87A and 87B are diagrams showing the relationship between the two movement vectors (vector AB and vector BC) in the moving tracking of the above mentioned pen 26. FIG. 87A shows the general movement of the pen 26 and FIG. 87B shows an angle θ formed by the two moving vectors. The considerable difference in the direction of the vectors indicates that an angle θ formed by the two vectors shown in FIG. 87B is larger than the predetermined value. Thus, the angle θ formed by the two vectors is obtained. When the value is the predetermined value (for example, 160 degrees) or more, the object once erased is displayed again.

FIG. 88 is a diagram showing one example of the registration contents of the pointer information table in the embodiment 37. The registration contents of the pointer information table is composed of the point data, the coordinate data and the condition data as those of the registration contents of the pointer information table in the embodiment 36 shown in FIG. 81. Since the registration contents are not necessary to satisfy the condition that the operation is conducted immediately after the condition is changed to the non-display condition, the non-display object data showing whether or not the non-display object is caused is not registered. Also, as in the pointer information table of FIG. 81, the information on the point position up to the position n number before the present point position is constantly registered. The registration contents of the pointer information table is renewed one after another as time passes each time the pen 26 moves.

Figure 89:
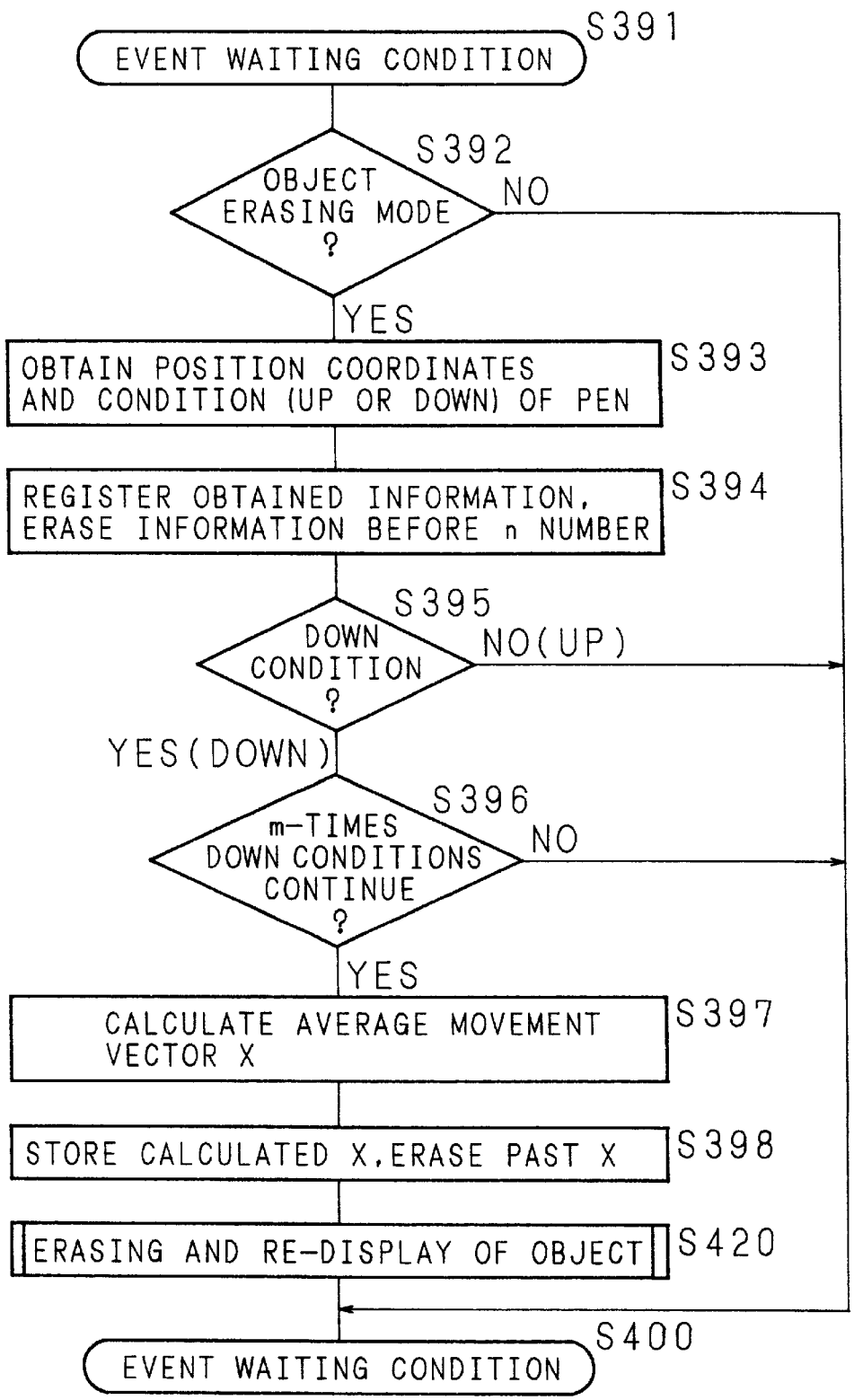
FIG. 89 is a flow chart showing a procedure for the erasing and restoring process (embodiment 37)
Figure 91:
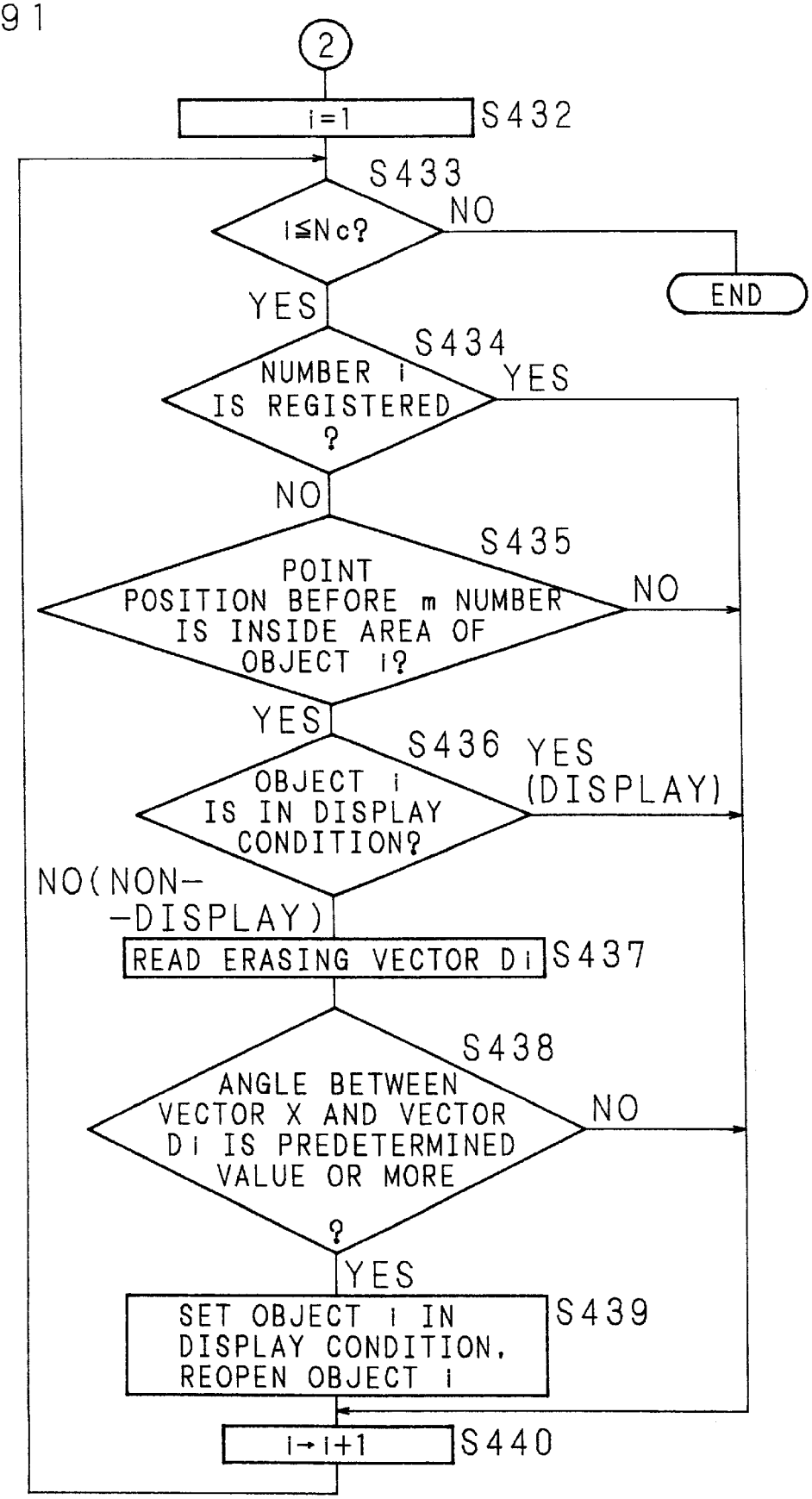
FIG. 91 is a flow chart showing a procedure for the erasing and restoring process (embodiment 37)

FIGS. 89 and 91 are flow charts showing the processing procedure of the embodiment 37. Referring to FIG. 89, the same step numbers are given to the same processings as those in the flow chart of FIG. 82, and the description thereof will be omitted. The renewing process has been made to obtain the latest average moving vector X at S398. Then, referring to the position information of the present pen 26, the calculated average movement vector X, and so on, if the necessary conditions are satisfied, the erasing process of the displayed object or the re-display process of the erased object (S420) is conducted, and then the condition is changed to the event waiting condition (S400).

Figure 90:
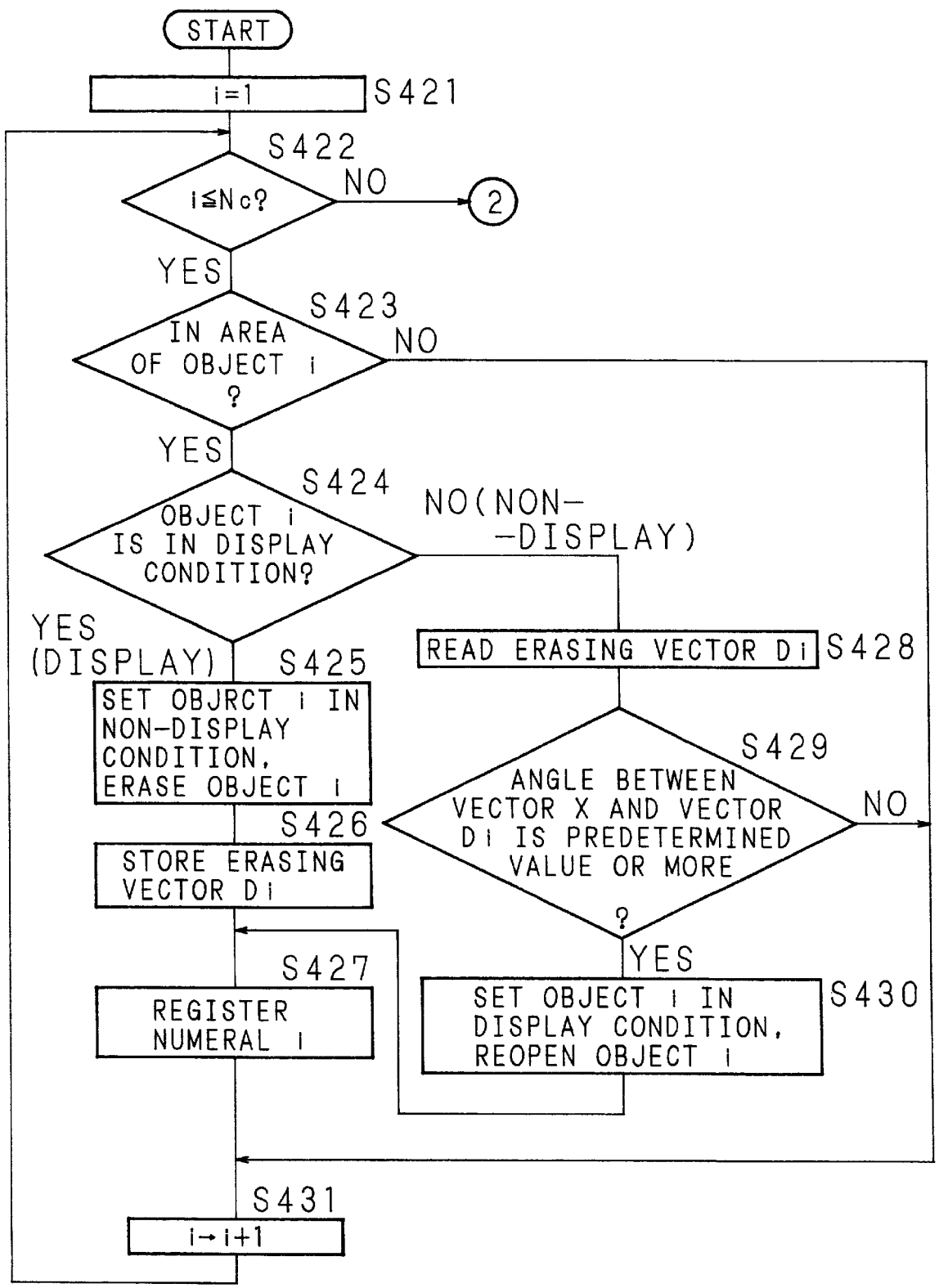
FIG. 90 is a flow chart showing a procedure for the erasing and restoring process (embodiment 37)

FIGS. 90 and 91 are flow charts showing the procedure for the sub-routine, namely, the procedure for the erasing process of the object or re-display process of the object. First, i is set into 1 (S421), and the following procedure will be conducted about the object given the number 1. It is judged (S422) whether or not the value of the i is the Nc, the total number of objects, or lower. When the value is Nc or lower, it is judged (S423) whether or not the present point position of the pen 26 is in the area of the object i, referring to the object executive table 12. When it is in the area thereof, it is judged (S424) whether or not the object i is in the display condition at present. When it is in the display condition, the object i is put into the non-displaying condition, and the condition data of the object executive table 12 is changed from the "display" to the "non-display". And the object display unit 11 is controlled and the object i displayed on the display 22 is erased (S425). The average movement vector X at this time is stored (S426) as the erasing vector Di of the object i. Furthermore, at the present point position, the condition becomes the non-display condition. The number i of the object is stored as the identifier (S427), and the procedure goes to S431.

When the object i is in the non-display condition at present at S424, the erasing vector Di of the stored object i is read (S428). Then, it is judged (S429) whether or not an angle formed by the average movement vector X and the erasing vector Di thus read is the predetermined value (160 degrees) or more. When the angle is the predetermined value or more, the object i is put in the display condition and the condition data of he object executive table 12 is changed from the "non-display" to the "display" and also, the object display unit 11 is controlled, so as to resume the displaying process of the object i of the display 22 (S430). Then, the number i of the object, returned to the display condition at the present position, is stored as the identifier (S427). The procedure goes to S431.

When the point position is not in the area of the object i at S423, and when the angle is smaller than the predetermined value at S429, the procedure directly goes to S431.

The i is increased by 1 (S431), and the procedure of the aforementioned S422 through S430 is effected about the object given a numeral 2. Thereafter, the i is also increased by 1 (S431). Likewise, the procedure of the S422 through S430 is conducted until the i exceeds Nc (S422:NO) while increasing the i by 1. Objects among all the objects which satisfy (YES at both S423 and S424) the conditions are erased. The objects among all the objects which satisfy (at S423 and S429, YES and at S424, NO) the conditions are stored and re-displayed.

When the i exceeds Nc (S422:NO), the i is set again into 1 (S432). The following procedure is conducted about the object given No. 1. It is judged (S433) whether or not the value of the i is Nc or lower. When it is lower, it is judged whether or not the object i is stored at the present point position as the display change object (the object changed from the display condition to the non-display condition or the object changed from the non-display condition to the display condition) (S434), referring to the identifier. When the object i is not stored, it is judged (S435) whether or not the point position m number before the present point position is in the area of the object i, referring to the object executive table 12. When it is in the area thereof, it is judged (S436) whether or not the object i is not in the display condition at present. When the condition is the non-display condition, the erasing vector Di of the object i is read (S437). Then, it is judged (S438) whether or not the angle formed by the average movement vector X and the read erasing vector Di is the given value (160 degrees) or more. When the angle is the predetermined value or more, the object i is placed in the display condition, and the condition data of the object executive table 12 is changed from the "non-display" to the "display". Also, the object display unit 11 is controlled to resume the display of the object i in the display 22, and the procedure goes to S440. When the object i is stored as the display change object at S434, when the point position m number before the present point position at S435 is not in the area of the object i, when the object i is in the display condition at S436, and when the angle is smaller than the predetermined value at S438, the procedure goes directly to W 440.

The i is increased by 1 (S440), and the procedure of the aforementioned S433 through S439 is effected about the object given a numeral 2. Thereafter, the i is also increased by 1 (S440). Likewise, the procedure of the S433 through S439 is conducted until the i exceeds Nc (S433:NO) while increasing the i by 1. Objects among all the objects which satisfy (NO at S433 and S436, and YES at S435 and S438) the conditions are restored and displayed again. When the i exceeds Nc (S433:NO), the procedure is completed. It is returned to the main routine of FIG. 89, and the condition changed to the event waiting condition (S390).

The aforementioned operations can be summarized as follows. According to the position information and the up/down information of the pen 26, the n number of point sequence information including the present point position is stored as in the above described embodiment 36. The average movement vector is calculated and renewed when the down condition of the m number of portions including the present point position continues. When the present position of the pen 26 is in the area of the object (B point of FIGS. 85 and 86), if the object is displayed, it is placed in the non-display condition and the average movement vector is stored as the erasing vector of the object. When the object is in the non-display condition, the average movement vector is compared with the erasing vector. When the angle formed by the two vectors is the predetermined value or more, the object is displayed again. At this time, to avoid the overlapping with the later processing operation, the identifier of the object related to the changes in the display/non-display operation at the present point position is stored temporarily.

Although the C point and its neighboring points of FIGS. 85 and 86 are within the area of the object in the non-display condition, the movement vector cannot be calculated because the number of point positions does not reach m in the example 85 of FIG. 85 which shows the state immediately after the down operation of the pen 26 is conducted. In the example of FIG. 86, the movement vector can be calculated, but the angle formed by the vector AB and the movement vector at the erasing operation does not become large enough. Although the D point of FIGS. 85 and 86 is beyond the area of the object which is in the non-display condition, the vector CD larger in the angle formed by the vector AB and the movement vector at the erasing time is calculated. Thus, it is judged whether or not the point (C point) m number before the present point (D point) is within the area of the object which is in the non-display condition at present. When it is within the area thereof, the average movement vector and the erasing vector are compared, and it is judged whether or not the re-displaying process is effected based on the comparison result.

In such a restoring process, even when the erasing mode is set, the erased object can be displayed again by changing the moving direction of the pen after erasing an object and the object erased before can be restored immediately without rewriting it.

Embodiment 38

Erasing and Restoring of Objects (twenty second invention)

In the embodiment 38, the object erased by the user is managed as the non-display condition and its contents are preserved in the object executive table 12. The time period in which the object is managed in the non-display condition is restricted to a predetermined time period, and contents of the object in the non-display condition are deleted from the object executive table 12 unless the restoring process is not conducted by the user within the predetermined time after the erasing process. When the restoring process is conducted by the user within the predetermined time, the object is managed as the displaying condition in the object executive table 12 and is displayed again on the screen.

The above described embodiments 36 and 37 are effective for the editing process of objects, because the object once erased can be restored immediately. In such a method, however, the volume of the object executive table 12 can not be reduced if the object is erased, and the storing capacity of the system is consumed large. It is considered wasteful to preserve the contents by managing all the erased objects as the non-display condition in the object executive table 12. In most cases the timing at which the user desires to restore an erased object is immediately after the erasing operation conducted by the user. The restoring process of the object can be effected within the predetermined time immediately after the erasing processing operation. When the time passes beyond the predetermined time period, it is considered that the user approved the erased condition and the contents of the object are deleted from the object executive table 12.

Figure 92:
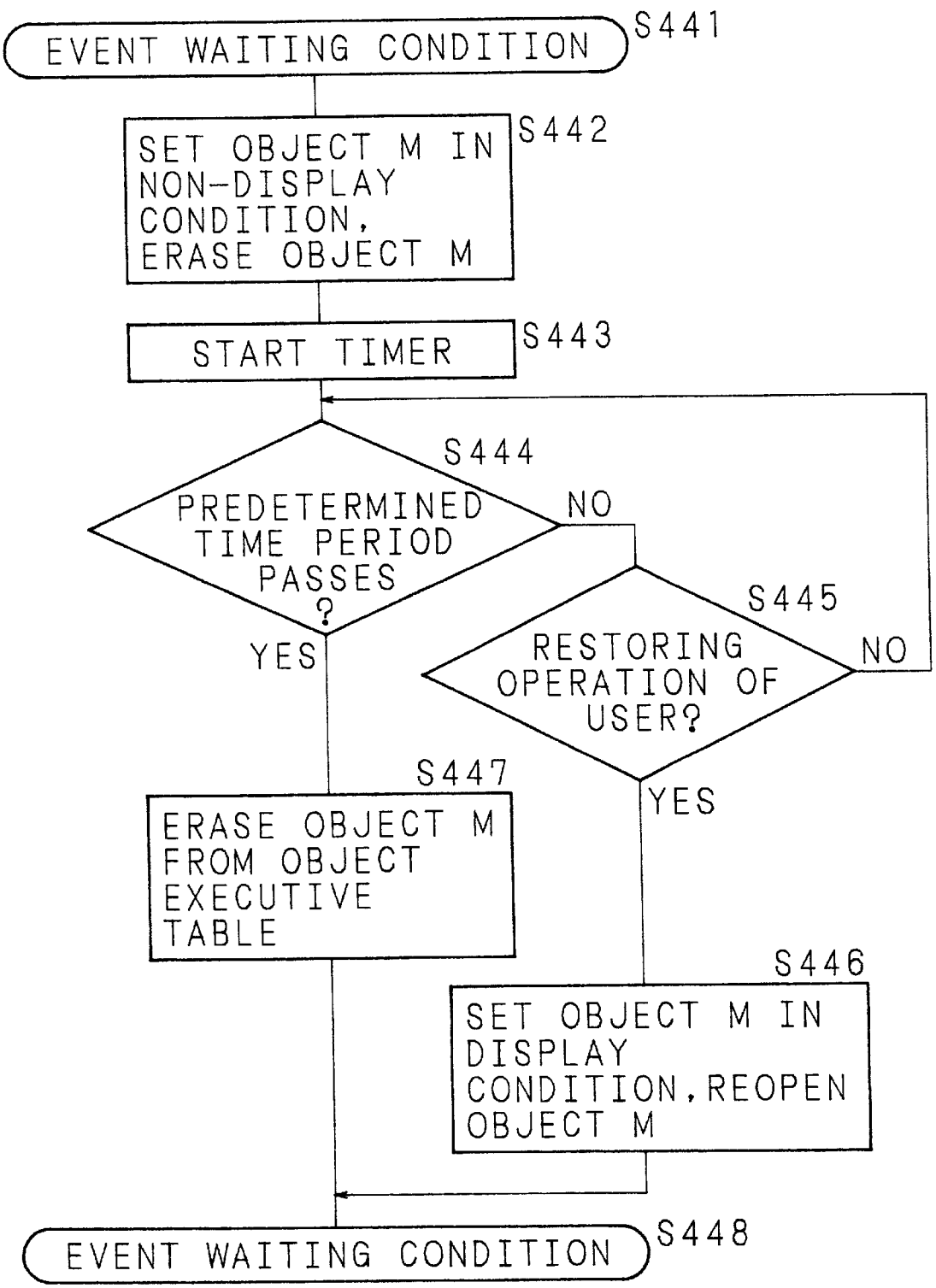
FIG. 92 is a flow chart showing a procedure for an object erasing and restoring process (embodiment 38)

FIG. 92 is a flow chart showing the processing procedure for the embodiment 38. When the user conducts the erasing operation with respect to a certain object M in the event waiting condition (S441), the object M in the object executive table 12 is set in the non-display condition, and the object M is erased from the screen by controlling the object display unit 11 (S442). The timer in the object operation executive unit 14 is started (S443), and it is judged whether or not the predetermined time (for example 10 seconds) has passed (S444). When the predetermined time period has not passed, it is judged (S445) whether or not the user has conducted a restoring operation with respect to the object M. When the restoring operation has been conducted, the object M in the object executive table 12 is set in the display condition. The object M is displayed again on the screen (S446) by the controlling operation of the object display unit 11 and the condition changes into the event waiting condition (S448). When the restoring operation is not conducted, the procedure goes back to S444. When the predetermined time passes without the restoring operation conducted at S444, the object M is completely deleted from the object executive table 12 including the contents (S447), the condition changes into the event waiting condition (S448).

In such an embodiment 38, an efficient restoring process capable of a restoring processing operation only within the predetermined time period after the erasing is effected, and both effects of the immediate restoring of the object erased by mistake and the controlling of the consumption of the system storing capacity can be realized with compatibility.

Embodiment 39

Erasing and Restoring of Objects (twenty-third invention)

In the embodiment 39, as in the above described embodiment 38, the erased object is managed by the object executive table 12 as the non-display condition within the predetermined time period after the erasing process. To inform the user of the non-display condition being set within the predetermined period time, the object is displayed in a manner (in a color lighter than the normal color) different from the normal display condition.

Figure 93C:
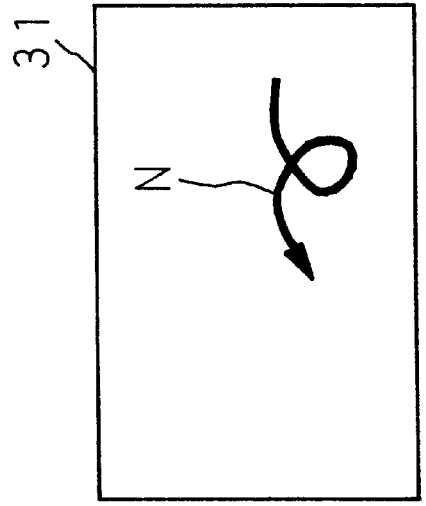
FIGS. 93A through 93D are explanatory diagrams showing examples of displaying and operating of objects in an object erasing and restoring process (embodiment 39)
Figure 93D:
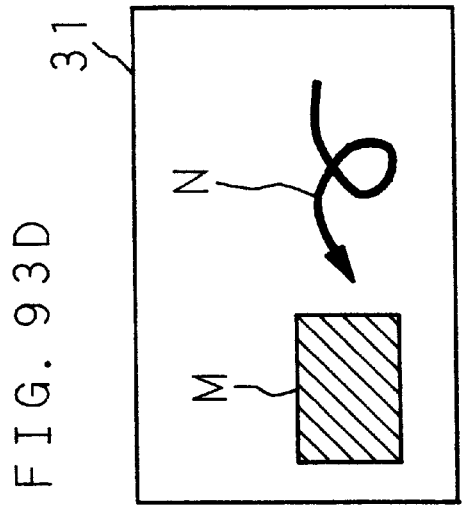
Figure 93B:
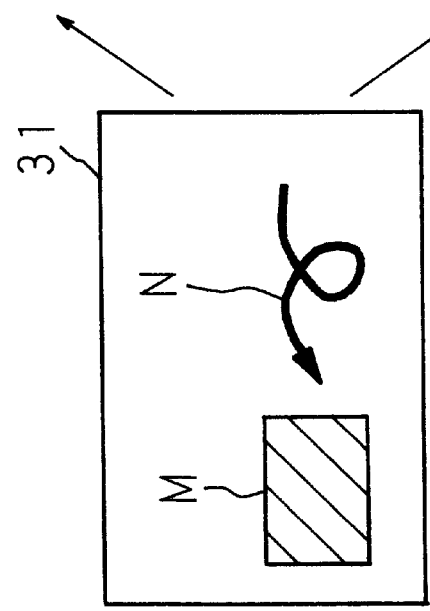
Figure 93A:
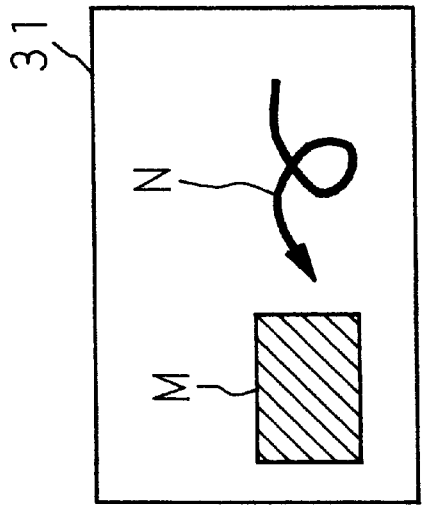

FIGS. 93A through 93D are explanatory diagrams showing examples of displaying and operating of objects in the erasing and restoring process of the objects for the embodiment 39. As shown in FIG. 93A, the closed loop colored object M and the arrow marked object N exist within the display area 31 of the display 22. The user conducts the erasing operation with respect to the object M, and the object M is display in a lighter color as shown in FIG. 93B. When the restoring operation by the user is not conducted with respect to the object M within the predetermined time period after the erasing operation, the object M is erased completely after the predetermined time period as shown in FIG. 93C. On the other hand, when the restoring operation into the object M is conducted within the predetermined time period, the object M is displayed again in the original condition as shown in FIG. 93D.

Figure 94:
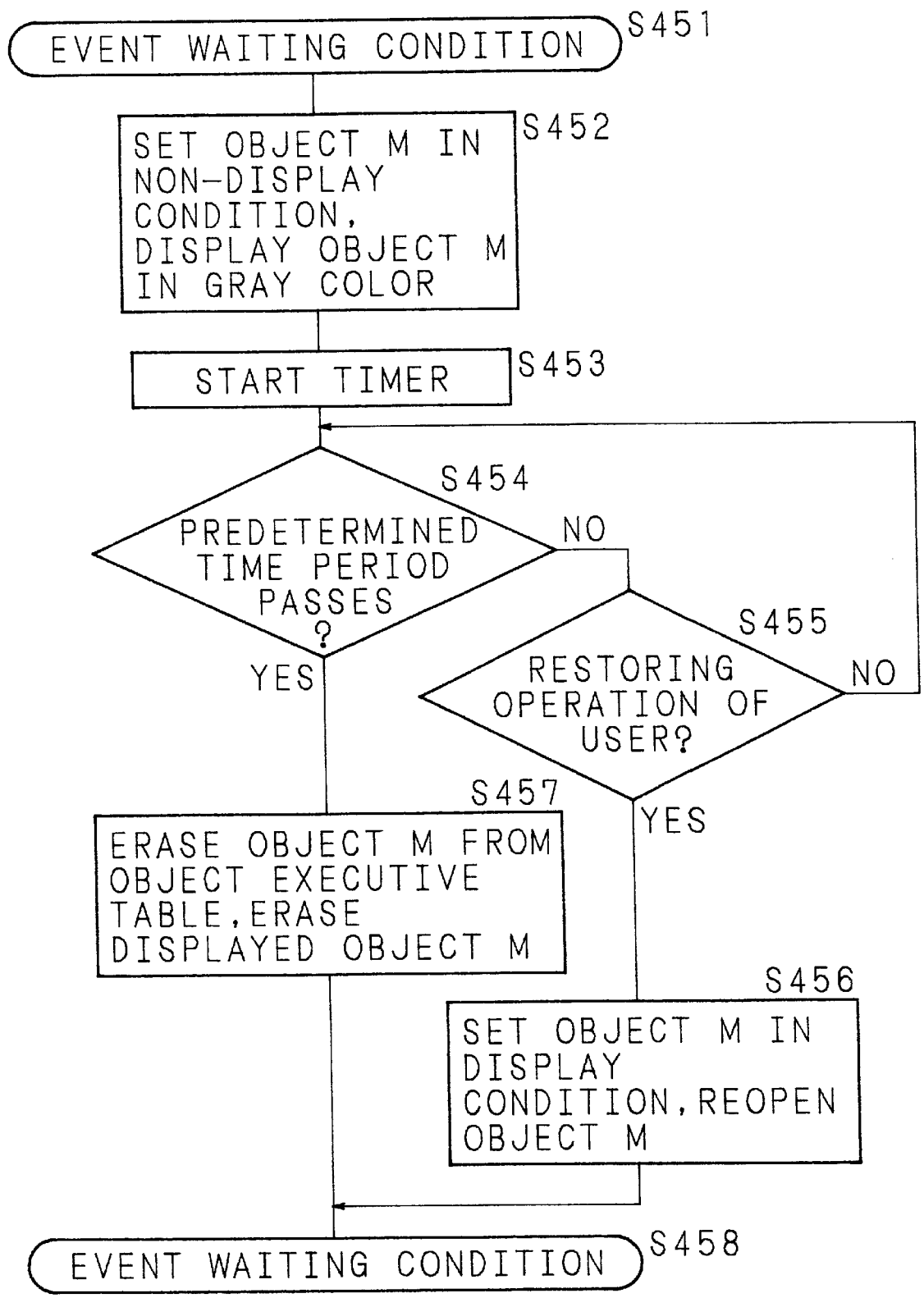
FIG. 94 is a flow chart showing a procedure for the erasing and restoring process (embodiment 39)

FIG. 94 is a flow chart showing the processing procedure for embodiment 39. When the erasing operation is effected from the user with respect to the object M displayed in black in the event waiting condition (S451), the object M in the object executive table 12 is set in the non-display condition and the object display unit 11 is controlled and is displayed in grey (S452). The timer within the object operation executive unit 14 is started (S453), and it is judged (S454) whether or not the predetermined time period (for example, 10 seconds) has passed. When the predetermined time period has not passed, it is judged (S455) whether or as not the user has conducted the restoring operation with respect to the object M. When the restoring operation has been conducted, the object M of the object executive table 12 is set in the display condition. The object M is displayed in a black color again (S456) by the controlling operation of the object display unit 11, and the condition changes into the event waiting condition (S458). When the restoring operation has not been conducted, the procedure goes back to S454. When the predetermined time period has passed without the restoring operation being conducted at S454, the object M is erased completely from the object executive table 12 including the contents. The object M displayed in a gray color is erased (S457), and the condition becomes the event waiting condition (S458).

In such an erasing and restoring process of an object, the object managed in the non-display condition is displayed in a lighter color. Therefore, the user can know through the display condition that the erased object is in the non-display condition and the object is erased completely after the predetermined time period passes.

Embodiment 40

Erasing and Restoring of Objects (twenty-third invention)

In the embodiment 40, the erased object is managed in the object executive table 12 as the non-display condition within the predetermined time period after the erasing operation as in the above described embodiment 38. To inform the user of the non-display condition being set within the predetermined time period, the displaying operation is conducted in a manner (displayed in dotted line) different from the normal displaying condition (displayed in solid line).

Figure 95C:
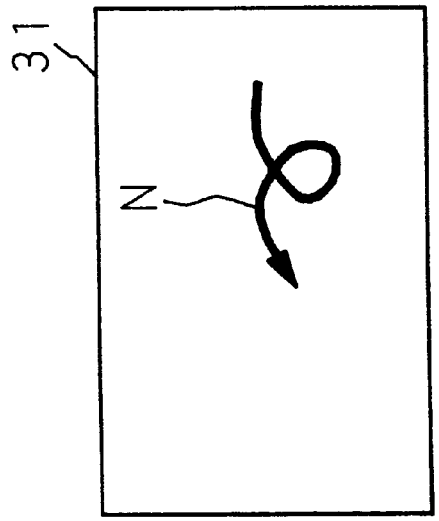
FIGS. 95A through 95D are explanatory diagrams showing examples of displaying and operating of objects in an object erasing and restoring process (embodiment 40)
Figure 95D:
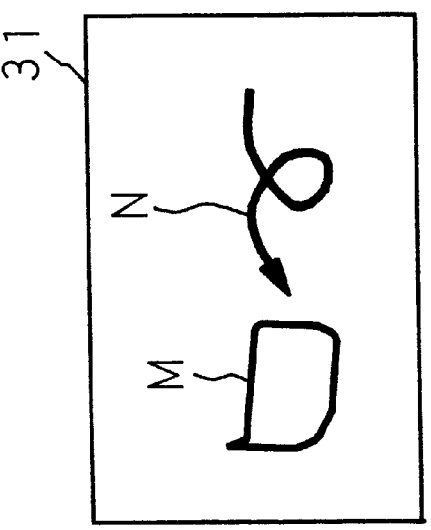
Figure 95B:
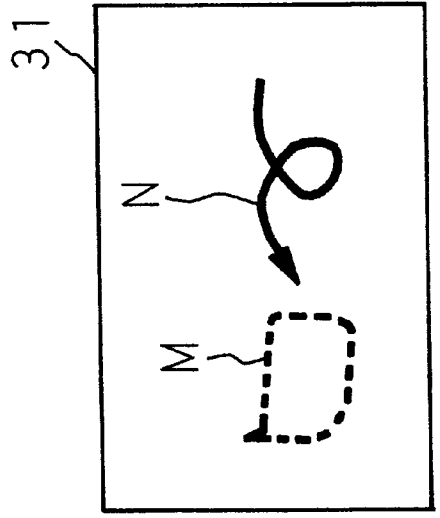
Figure 95A:
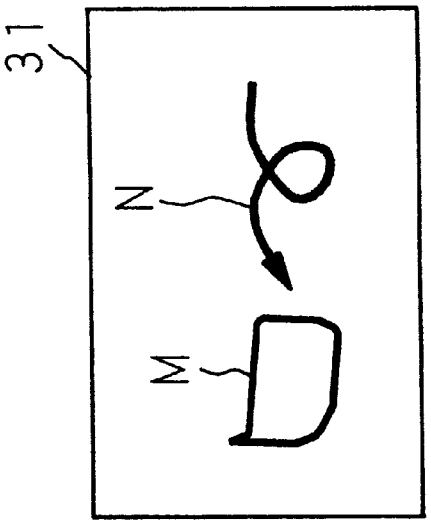

FIGS. 95A through 95D are explanatory diagrams for showing examples of displaying and operating of objects in the erasing and restoring process of the objects for embodiment 40. As shown in FIG. 95A, the closed loop colored object M and the arrow marked object N displayed in solid line exist within the display area 31 of the display 22. The user conducts the erasing operation with respect to the object M, the object M is displayed in dotted line as shown FIG. 95B. When the restoring operation by the user is not conducted with respect to the object M within the predetermined time period after the erasing operation, the object M is erased completely as shown in FIG. 95C after the predetermined time period. On the other hand, when the restoring operation is conducted with respect to the object M within the predetermined time period, the object M is displayed again in the original condition as shown in FIG. 95D.

Figure 96:
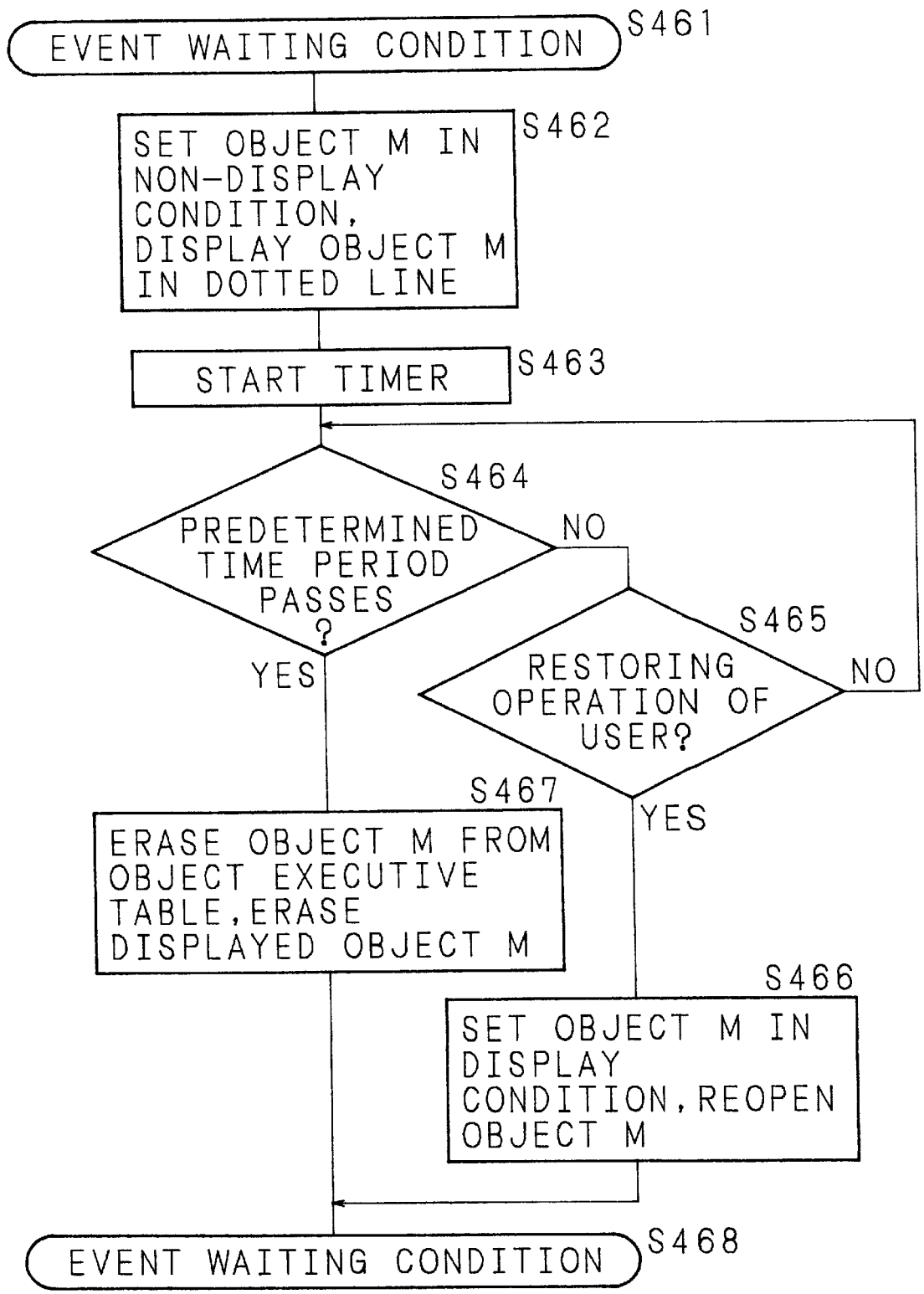
FIG. 96 is a flow chart showing a procedure for the erasing and restoring process (embodiment 40)

FIG. 96 is a flow chart showing the processing procedure for embodiment 40. When the erasing operation is effected from the user with respect to the object M displayed in solid line in the event waiting condition (S461), the object M in the object executive table 12 is set in the non-displaying condition and the object display unit 11 is controlled, so as to display the object M in dotted line (S462). The timer within the object operation executive unit 14 is started (S463), and it is judged (S464) whether or not the predetermined time period (for example, 10 seconds) has passed. When the predetermined time period has not passed, it is judged (S465) whether or not the user has conducted the restoring operation with respect to the object M. When the restoring operation has been conducted, the object M in the object executive table 12 is set in the display condition. The object M is displayed again in solid line (S466) by the controlling operation of the object display unit 11, and the condition changes into the event waiting condition (S468). When the restoring operation has not been conducted, the procedure goes back to S464. When the predetermined time period has been passed without the restoring operation being conducted at S464, the object M is deleted completely from the object executive table 12 including the contents. The object M displayed in dotted line is erased (S467), and the condition changes into the event waiting condition (S468).

In such an erasing and restoring process of an object, the object managed in the non-display condition is displayed in the dotted line. Therefore, the user can know through the display condition that the erased object is in the non-display condition and the object is erased completely after the predetermined time period passes.

In the configuration shown in FIG. 4, a case for realizing the system of the invention by one set of personal computer unit is described. The system of the invention can be realized also in the communication network such as LAN or the like where a plurality of personal computer units are connected through the communication line.

Figure 97:
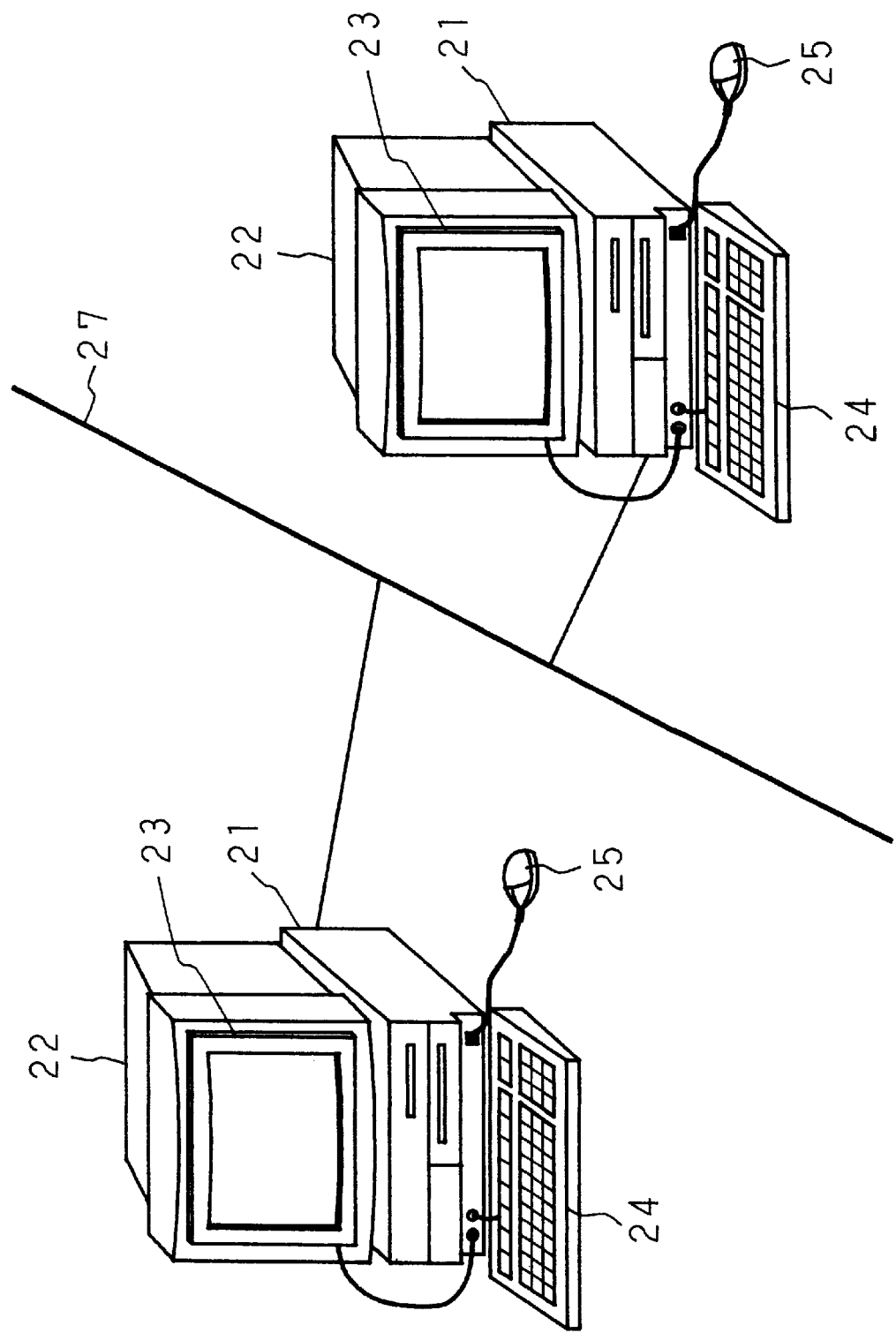
FIG. 97 is a schematic view showing another basic configuration of the object editing system of the invention.

FIG. 97 is a schematic diagram showing the basic construction of a system in such a case. In FIG. 97, the same numerals are given to the corresponding parts as those in FIG. 4, and the description of them is omitted. Both the personal computer units receive and transmit the data through the communication ine 27. In such a construction example, the editing process such as associating of objects, the canceling and renewing of an association, connecting, separating and erasing can be conducted with the mouse 25 of the other personal computer unit with respect to the objects displayed on the display 22 of one personal computer unit.

In the invention as described above, the editing process such as association of a plurality of objects, canceling and renewing operations among a plurality of objects, connection of a plurality objects, separating and erasing or the like of objects can be effected easily, about the objects of character strings and diagrams displayed by the simple direct operation of the user with respect to the displayed objects and the operation can be conducted with natural human consciousness.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within metes and bounds of the claims, or equivalence of such metes and bounds thereof are therefore intended to be embraced by the claims.

I claim:

1. An object editing method of associating a plurality of objects by the operation of an input apparatus, comprising:
   moving a first object;
   selecting a second object within a predetermined time period from the completion of the moving operation with respect to the first object;
   moving the second object with the moving vector being made the same as the vector of the moving operation; and
   associating the second object with the first object by the selecting operation with respect to the second object.

2. An object editing method of associating a plurality of objects by the operation of an input apparatus, comprising:
   moving a first object;
   moving a second object within a predetermined time period from the completion of the moving operation with respect to the first object; and
   associating the second object with the first object by the moving operation with respect to the second object.

3. An object editing method of associating a plurality of objects by the operation of an input apparatus, comprising:
   selecting a first object;
   selecting a second object within a predetermined time period from the completion of the selecting operation with respect to the first object; and
   associating the second object with the first object by the selecting operation with respect to the second object.

4. An object editing method of associating a plurality of objects by the operation of an input apparatus, comprising:
   selecting a first object;
   moving a second object within a predetermined time period from the completion of the selecting operation with respect to the first object; and
   associating the second object with the first object by the moving operation with respect to the second object.

5. An object editing method of canceling the association among a plurality of objects by the operation of an input apparatus, comprising:
   displaying a segment for connecting the objects to show the association thereof when the objects are associated with each other; and
   canceling the association by the operation of crossing the segment within a predetermined time period after the associating operation.

6. An object editing method of canceling the association among a plurality of objects by the operation of an input apparatus, comprising:
   selecting a second object having the association with a first object;
   displaying a segment for connecting the first and second objects to show the association thereof by the selecting operation with respect to the second object; and
   canceling the association by the operation of crossing the segment within a predetermined time period after the selecting operation.

7. An object editing method of canceling the association among a plurality of objects by the operation of an input apparatus, comprising:
   moving a second object having the association with a first object;
   moving the first object with the moving vector being made the same as the vector of the moving vector with respect to the second object;
   displaying a segment for connecting the first and second objects to show the association; and
   restoring the position of the first object by the operation of crossing the segment within a predetermined time period after the moving process of the first object, so as to cancel the association.

8. The object editing method of claim 5, wherein areas of objects related to the association are respectively colored to show the association, and the association is canceled by the selecting operation of the object within a predetermined time period after the coloring of the areas of the objects.

9. The object editing method of claim 5, wherein the association is shown by displaying frames each surrounding the area of an object related to the association, and the association is canceled by the selecting operation of the object within a predetermined time period after displaying the frames surrounding the areas of the objects.

10. The object editing method of claim 6, wherein areas of objects related to the association are respectively colored to show the association, and the association is canceled by the selecting operation of the object within a predetermined time period after the coloring of the areas of the objects.

11. The object editing method of claim 6, wherein the association is shown by displaying frames each surrounding the area of an object related to the association, and the association is canceled by the selecting operation of the object within a predetermined time period after displaying the frames surrounding the areas of the objects.

12. The object editing method of claim 7, wherein areas of objects related to the association are respectively colored to show the association, and the association is canceled by the selecting operation of the object within a predetermined time period after the coloring of the areas of the objects.

13. The object editing method of claim 7, wherein the association is shown by displaying frames each surrounding the area of an object related to the association, and the association is canceled by the selecting operation of the object within a predetermined time period after displaying the frames surrounding the areas of the objects.

14. An object editing method of renewing the associating information among a plurality of objects by the operation of an input apparatus, comprising:
   selecting a second object having the association with a first object; and
   renewing the associating information by the moving operation with respect to the second object within a predetermined time period after the selecting operation.

15. An object editing method of renewing the associating information among a plurality of objects by the operation of an input apparatus, comprising:
   selecting a second object having the association with a first object; and
   renewing the associating information by the moving operation with respect to the first object within a predetermined time period after the selecting operation.

16. An object editing method of renewing the associating information among a plurality of objects by the operation of an input apparatus, comprising:

moving a second object having the association with a first object;

moving the first object with the moving vector being made the same as the vector of the moving vector with respect to the second object; and renewing the associating information by the moving operation with respect to the first object within a predetermined time period after the moving process.

17. An object editing system, comprising:

a display device displaying a plurality of objects;

a receiving device receiving a moving operation and a selecting operation with respect to the object;

a clocking device clocking the elapsed time from the completion of the moving operation;

a judging device judging whether or not a selecting operation with respect to a second object exists within a predetermined time period from the completion of the moving operation of a first object; and a moving device moving the second object with the moving vector being made the same as the vector of the moving operation, when the selecting operation is judged to exist by said judging device, for associating the second object with the first object.

18. An object editing system, comprising:

a display device displaying a plurality of objects;

a receiving device receiving a moving operation with respect to the object;

a clocking device clocking the elapsed time from the completion of the moving operation;

a judging device judging whether or not a moving operation with respect to a second object exists within a predetermined time period from the completion of the moving operation of a first object; and an associating device associating the second object with the first object when the moving operation is judged to exist by said judging device.

19. An object editing system, comprising:

a display device displaying a plurality of objects;

a receiving device receiving a selecting operation with respect to the object;

a clocking device clocking the elapsed time from the completion of the selecting operation;

a judging device judging whether or not a selecting operation with respect to a second object exists within a predetermined time period from the completion of the selecting operation of a first object; and an associating device associating the second object with the first object when the selecting operation is judged to exist by said judging device.

20. An object editing system, comprising:

a display device displaying a plurality of objects;

a receiving device receiving a selecting operation and a moving operation with respect to the object;

a clocking device clocking the elapsed time from the completion of the selecting operation;

a judging device judging whether or not a moving operation with respect to a second object exists within a predetermined time period from the completion of the selecting operation of a first object; and an associating device associating the second object with the first object when the moving operation is judged to exist by said judging device.

21. An object editing system, comprising:

a display device displaying a plurality of objects;

said display device displaying a segment for connecting the objects to show the association when the association among the objects is caused, a receiving device receiving an operation of crossing the segment;

a clocking device clocking the elapsed time from the association caused;

a judging device judging whether or not an operation of crossing the segment exists within a predetermined time period from the association caused; and a canceling device canceling the association when the crossing operation is judged to exist by said judging device.

22. An object editing system, comprising:

a display device displaying a plurality of objects;

a receiving device receiving a selecting operation with respect to the object;

said display device displaying a segment for connecting first and second objects to show the association when the second object having the association with the first object is selected;

said receiving device receiving an operation of crossing the segment;

a clocking device clocking the elapsed time from the completion of the selecting operation;

a judging device judging whether or not an operation of crossing the segment exists within a predetermined time period from the completion of the selecting operation; and a canceling device canceling the association when the crossing operation is judged to exist by said judging device.

23. An object editing system, comprising:

a display device displaying a plurality of objects;

a receiving device receiving the moving operation with respect to the object;

said receiving device receiving the moving operation of a second object having the association with a first object and conducting a moving process of the first object with the moving vector being made the same as the vector of the moving operation;

said display device displaying a segment for connecting the first and second objects to show the association between the objects after the moving process;

said receiving device receiving an operation of crossing the segment;

a clocking device clocking the elapsed time from the completion of the moving process;

a judging device judging whether or not an operation of crossing the segment exists within a predetermined time period from the completion of the moving process; and a restoring device restoring the position of the first object and canceling the association when the crossing operation is judged to exist by said judging device.

24. An object editing system, comprising: means for displaying a plurality of objects;

a receiving device receiving a selecting operation and a moving operation with respect to the object;

a clocking device clocking the elapsed time from the completion of the selecting operation;

a judging device judging whether or not a moving operation with respect to a second object exists within a predetermined time period from the completion of the selecting operation of the second object having the association with a first object; and a renewing device renewing the associating information when the moving operation is judged to exist by said judging device.

25. An object editing system, comprising:

a display device displaying a plurality of objects;

a receiving device receiving a selecting operation and a moving operation with respect to the object;

a clocking device clocking the elapsed time from the completion of the selecting operation;

a judging device judging whether or not a moving operation with respect to a first object exists within a predetermined time period from the completion of the selecting operation of a second object having the association with the first object; and a renewing device renewing the associating information when the moving operation is judged to exist by said judging device.

26. An object editing system, comprising:

a displaying device displaying a plurality of objects;

a receiving device receiving a moving operation with respect to the object;

said receiving device receiving the moving operation of a second object having the association with a first object and conducting a moving process of the first object with the moving vector being made the same as the vector of the moving operation;

a clocking device clocking the elapsed time from the completion of the moving process;

a judging device judging whether or not a moving operation with respect to the first object exists within a predetermined time period from the completion of the moving process; and a renewing device renewing the associating information when the moving operation is judged to exist by said judging device.

27. A computer memory product storing a computer program for associating a plurality of objects by the operation of an input apparatus, said computer program comprising:

receiving a moving operation with respect to a first object;

receiving a selecting operation with respect to a second object within a predetermined time period from the completion of the moving operation with respect to the first object;

conducting a second moving operation with respect to the second object with the moving vector being made the same as the vector of the moving operation; and associating the second object with the first object by receiving the selecting operation with respect to the second object.

28. A computer memory product storing a computer program or associating a plurality of objects by the operation of an input apparatus, said computer program comprising:

receiving a moving operation with respect to a first object;

receiving a moving operation with respect to a second object within a predetermined time period from the completion of the moving operation with respect to the first object; and associating the second object with the first object by receiving the moving operation with respect to the second object.

29. A computer memory product storing a computer program for associating a plurality of objects by the operation of an input apparatus, said computer program comprising:

receiving a selecting operation with respect to a first object;

receiving a selecting operation with respect to a second object within a predetermined time period from the completion of the selecting operation with respect to the first object; and associating the second object with the first object by receiving the selecting operation with respect to the second object.

30. A computer memory product storing a computer program associating a plurality of objects by the operation of an input apparatus, said computer program comprising:

receiving a selecting operation with respect to a first object;

receiving a moving operation with respect to a second object within a predetermined time period from the completion of the selecting operation with respect to the first object; and associating the second object with the first object by receiving the moving operation with respect to the second object.

31. A computer memory product storing a computer program for canceling the association among a plurality of objects by the operation of an input apparatus, said computer program comprising:

displaying a segment for connecting the objects to show the association thereof when the objects are associated with each other;

receiving an operation of crossing the segment within a predetermined time period after the associating operation; and canceling the association by receiving the crossing operation.

32. A computer memory product storing a computer program for canceling the association among a plurality of objects by the operation of an input apparatus, said computer program comprising:

receiving a selecting operation of a second object having the association with a first object;

displaying a segment for connecting the first and second objects to show the association by the selecting operation with respect to the second object;

receiving an operation of crossing the segment within a predetermined time period after the selecting operation; and canceling the association by receiving the crossing operation.

33. A computer memory product storing a computer program for canceling the association among a plurality of objects by the operation of an input apparatus, said computer program comprising the steps of:

receiving a moving operation of a second object having the association with a first object;

conducting a moving operation of the first object with the moving vector being made the same as the moving vector with respect to the second object;

displaying a segment for connecting the first and second objects to show the association;

receiving an operation of crossing the segment within a predetermined time period after the moving operation; and receiving the crossing operation to restore the position of the first object and to cancel the association.

34. A computer memory product storing a computer program for renewing the associating information among a plurality of objects by the operation of an input apparatus, said computer program comprising:

receiving a selecting operation of a second object having the association with a first object;

receiving a moving operation of the second object within a predetermined time period after the selecting operation; and renewing the associating information by receiving the moving operation of the second object.

35. A computer memory product storing a computer program for renewing the associating information among a plurality of objects by the operation of an input apparatus, said computer program comprising:

receiving a selecting operation of a second object having the association with a first object;

receiving a moving operation of the first object within a predetermined time period after the selecting operation; and renewing the associating information by receiving the moving operation of the first object.

36. A computer memory product storing a computer program for renewing the associating information among a plurality of objects by the operation of an input apparatus, said computer program comprising the steps of:

receiving a moving operation of a second object having the association with a first object;

conducting a moving operation of the first object with the moving vector being made the same as the vector of the moving operation with respect to the second object;

receiving a moving operation or the first object within a predetermined time period after the receiving of the moving operation; and renewing the associating information by receiving the moving operation of the first object.

37. A computer memory product having computer readable program code for associating a plurality of objects by the operation of an input apparatus, said computer readable program code comprising:

causing the computer to receive a moving operation with respect to a first object;

causing the computer to receive a selecting operation with respect to a second object within a predetermined time period from the completion of the moving operation with respect to the first object;

causing the computer to conduct the moving display with respect to the second object with the moving vector being made the same as the vector of the moving operation; and causing the computer to associate the second object with the first object by receiving the selecting operation with respect to the second object.

38. A computer memory product having computer readable program code for associating a plurality of objects by the operation of an input apparatus, said computer readable program code comprising:

causing the computer to receive a moving operation with respect to a first object;

causing the computer to receive a moving operation with respect to a second object within a predetermined time period from the completion of the moving operation with respect to the first object; and causing the computer to associate the second object with the first object by receiving the moving operation with respect to the second object.

39. A computer memory product having computer readable program code for associating a plurality of objects by the operation of an input apparatus, said computer readable program code comprising:

causing the computer to receive a selecting operation with respect to a first object;

causing the computer to receive a selecting operation with respect to a second object within a predetermined time period from the completion of the selecting operation with respect to the first object; and causing the computer to associate the second object with the first object by receiving the selecting operation with respect to the second object.

40. A computer memory product having computer readable program code for associating a plurality of objects by the operation of an input apparatus, said computer readable program code comprising:

causing the computer to receive a selecting operation with respect to a first object;

causing the computer to receive a moving operation with respect to a second object within a predetermined time period from the completion of the selecting operation with respect to the first object; and causing the computer to associate the second object with the first object by receiving of the moving operation with respect to the second object.

41. A computer memory product having computer readable program code for canceling the association among a plurality of objects by the operation of an input apparatus, said computer readable program code comprising:

causing the computer to display a segment for connecting the objects to show the association thereof when the objects are associated with each other;

causing the computer to receive an operation of crossing the segment within a predetermined time period after the associating operation; and causing the computer to cancel the association by receiving the crossing operation.

42. A computer memory product having computer readable program code for canceling the association among a plurality of objects by the operation of an input apparatus, said computer readable program code comprising:

causing the computer to receive a selecting operation of a second object having the association with a fist object;

causing the computer to display a segment for connecting the first and second objects to show the association by the selecting operation with respect to the second object;

causing the computer to receive an operation of crossing the segment within a predetermined time period after the selecting operation; and causing the computer to cancel the association by receiving the crossing operation.

43. A computer memory product having computer readable program code means for canceling the association among a plurality of objects by the operation of an input apparatus, said computer readable program code means comprising:

program code means for causing the computer to receive moving operation of a second object having the association with a first object;

program code means for causing the computer to conduct a moving operation of the first object with the moving vector being made the same as the moving vector with respect to the second object;

program code means for causing the computer to display a segment for connecting the first and second objects to show the association;

program code means for causing the computer to receive an operation of crossing the segment within a predetermined time period after the moving operation; and causing the computer to restore the position of the first object and cancel the association by receiving the crossing operation.

44. A computer memory product having computer readable program code for renewing the associating information among a plurality of objects by the operation of an input apparatus, said computer readable program code comprising:

causing the computer to receive a selecting operation of a second object having the association with a first object;

causing the computer to receive a moving operation of the second object within a predetermined time period after the selecting operation; and causing the computer to renew the associating information by receiving the moving operation of the second object.

45. A computer memory product having computer readable program code for renewing the associating information among a plurality of objects by the operation of an input apparatus, said computer readable program code comprising:

causing the computer to receive a selecting operation of a second object having the association with a first object;

causing the computer to receive a moving operation of the first object within a predetermined time period after the selecting operation; and causing the computer to renew the associating information by receiving the moving operation of the first object.

46. A computer memory product having computer readable program code for renewing the associating information among a plurality of objects by the operation of an input apparatus, said computer readable program code comprising:

program code means for causing the computer to receive a moving operation of a second object having the association with a first object;

program code means for causing the computer to conduct a moving operation of the first object with the moving vector being made the same as the vector of the moving operation with respect to the second object;

program code means for causing the computer to receive a moving operation of the first object within a predetermined time period after the receiving of the moving operation; and program code means for causing the computer to renew the associating information by receiving the moving operation of the first object.

* * * * *

UNITED STATES PATENT AND TRADEMARK OFFICE
CERTIFICATE OF CORRECTION

PATENT NO.: 6,020,895
DATED : February 1, 2000
INVENTOR(S): Toshihiro AZAMI

It is certified that [an/error[s]] appears in the above-identified patent and that said Letters Patent is hereby corrected as shown below:

Title page item;
 [30] Foreign Application Priority Data change "May 28, 1996" to --June 28, 1996--.

[56] References Cited change "Gerlach" to --Gerlach, Jr.--.

Column 59, claim 36, line 10, change "or" to --of--.

Column 61, claim 43, line 19, before "causing" insert --program code means for--.

Signed and Sealed this

Twenty-eighth Day of November, 2000

Attest:

Q. TODD DICKINSON

Attesting Officer     Director of Patents and Trademarks